(12) United States Patent
Liu et al.

(10) Patent No.: US 11,252,404 B2
(45) Date of Patent: Feb. 15, 2022

(54) HARMONIZED LOCAL ILLUMINATION COMPENSATION AND MODIFIED INTER PREDICTION CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/221,093

(22) Filed: Apr. 2, 2021

(65) Prior Publication Data
US 2021/0227209 A1 Jul. 22, 2021

Related U.S. Application Data

(63) Continuation of application No. PCT/IB2019/059048, filed on Oct. 23, 2019.

(30) Foreign Application Priority Data

| Oct. 23, 2018 | (WO) | PCT/CN2018/111436 |
| Jan. 15, 2019 | (WO) | PCT/CN2019/071759 |
| Jan. 17, 2019 | (WO) | PCT/CN2019/072154 |

(51) Int. Cl.
*H04N 19/105* (2014.01)
*H04N 19/119* (2014.01)
(Continued)

(52) U.S. Cl.
CPC ........ *H04N 19/105* (2014.11); *H04N 19/119* (2014.11); *H04N 19/176* (2014.11);
(Continued)

(58) Field of Classification Search
CPC .. H04N 19/105; H04N 19/119; H04N 19/176; H04N 19/186; H04N 19/436;
(Continued)

(56) References Cited

U.S. PATENT DOCUMENTS

| 10,631,002 B2 | 4/2020 | Li et al. |
| 10,652,571 B2 | 5/2020 | Hu et al. |

(Continued)

FOREIGN PATENT DOCUMENTS

| CN | 107113425 A | 8/2017 |
| CN | 107147911 A | 9/2017 |

(Continued)

OTHER PUBLICATIONS

Akula et al. "Description of SDR, HDR and 360 degrees Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC29/WG 11, 10th Meeting, San Diego, US, Apr. 10-20, 2018, document JVET-J0024, 2018.

(Continued)

Primary Examiner — Richard T Torrente
(74) Attorney, Agent, or Firm — Perkins Coie LLP

(57) ABSTRACT

A video processing method is provided to include: determining to use a rule that specifies that at most a single coding tool from a set of coding tools is used for a conversion between a current block of a video comprising multiple pictures and a coded representation of the video, and performing the conversion based on the rule. The set of coding tools includes coding tools that modify a reconstructed block (Continued)

of the current block generated from motion information from the coded representation or an inter prediction signal generated for the current block during the conversion.

20 Claims, 49 Drawing Sheets

(51) Int. Cl.
  *H04N 19/176* (2014.01)
  *H04N 19/436* (2014.01)
  *H04N 19/70* (2014.01)
  *H04N 19/186* (2014.01)
  *H04N 19/52* (2014.01)
  *H04N 19/55* (2014.01)
  *H04N 19/96* (2014.01)

(52) U.S. Cl.
  CPC ......... *H04N 19/186* (2014.11); *H04N 19/436* (2014.11); *H04N 19/52* (2014.11); *H04N 19/55* (2014.11); *H04N 19/70* (2014.11); *H04N 19/96* (2014.11)

(58) Field of Classification Search
  CPC ........ H04N 19/52; H04N 19/55; H04N 19/70; H04N 19/96; H04N 19/147; H04N 19/182; H04N 19/583; H04N 19/80
  See application file for complete search history.

(56) References Cited

U.S. PATENT DOCUMENTS

| | | | |
|---|---|---|---|
| 10,708,605 | B2 | 7/2020 | He et al. |
| 10,715,810 | B2 | 7/2020 | Zhang et al. |
| 10,880,570 | B2 | 12/2020 | Chuang et al. |
| 2014/0072043 | A1 | 3/2014 | Tourapis et al. |
| 2014/0241437 | A1 | 8/2014 | Seregin et al. |
| 2016/0234510 | A1 | 8/2016 | Lin et al. |
| 2016/0366416 | A1 | 12/2016 | Liu et al. |
| 2017/0339405 | A1 | 11/2017 | Wang et al. |
| 2018/0063531 | A1 | 3/2018 | Hu et al. |
| 2018/0098079 | A1 | 4/2018 | Hu et al. |
| 2018/0098087 | A1* | 4/2018 | Li ..................... H04N 19/159 |
| 2018/0176592 | A1 | 6/2018 | Lim et al. |
| 2018/0184117 | A1 | 6/2018 | Chen et al. |
| 2018/0184127 | A1* | 6/2018 | Zhang ................. H04N 19/124 |
| 2018/0288425 | A1 | 10/2018 | Panusopone et al. |
| 2019/0215522 | A1 | 7/2019 | Zhang et al. |
| 2019/0230350 | A1 | 7/2019 | Chen et al. |
| 2019/0230376 | A1 | 7/2019 | Hu et al. |
| 2019/0238882 | A1 | 8/2019 | Park et al. |
| 2019/0320203 | A1 | 10/2019 | Chiang et al. |
| 2020/0112741 | A1 | 4/2020 | Han et al. |
| 2020/0186818 | A1 | 6/2020 | Li et al. |
| 2020/0204807 | A1 | 6/2020 | Ye |
| 2020/0213586 | A1 | 7/2020 | Han et al. |
| 2020/0336738 | A1 | 10/2020 | Xiu et al. |
| 2020/0344482 | A1 | 10/2020 | Zhang et al. |
| 2021/0211657 | A1* | 7/2021 | Ikonin .................. H04N 19/184 |
| 2021/0235073 | A1 | 7/2021 | Liu et al. |
| 2021/0235074 | A1 | 7/2021 | Liu et al. |
| 2021/0235092 | A1 | 7/2021 | Liu et al. |
| 2021/0235109 | A1 | 7/2021 | Liu et al. |
| 2021/0235110 | A1 | 7/2021 | Liu et al. |
| 2021/0243465 | A1 | 8/2021 | Chen et al. |
| 2021/0266587 | A1 | 8/2021 | Liu et al. |
| 2021/0344909 | A1 | 11/2021 | Liu et al. |

FOREIGN PATENT DOCUMENTS

| | | |
|---|---|---|
| CN | 108293137 A | 7/2018 |
| WO | 2017197146 A1 | 11/2017 |
| WO | 2018056709 A1 | 3/2018 |
| WO | 2018056763 A1 | 3/2018 |
| WO | 2018062892 A1 | 4/2018 |
| WO | 2018123444 A1 | 7/2018 |
| WO | 2018132043 A1 | 7/2018 |
| WO | 2018205954 A1 | 11/2018 |
| WO | 2019001685 A1 | 1/2019 |
| WO | 2019002171 A1 | 1/2019 |
| WO | 2019006363 A1 | 1/2019 |
| WO | 2019007697 A1 | 1/2019 |
| WO | 2019010267 A1 | 1/2019 |
| WO | 2019210829 A1 | 11/2019 |
| WO | 2020060843 A1 | 3/2020 |

OTHER PUBLICATIONS

Andersson et al. "Combined Intra Inter Prediction Coding Mode," ITU—Telecommunications Standardization Sector Study Group 16 Question 6 Video Coding Experts Group (VCEG), 30th Meeting, Hangzhou China, Oct. 20-27, 2006, document VCEG-AD11, 2006.
Athanasios et al. "Multiple Reference Motion Compensation: A Tutorial Introduction and Survey," Foundations and Trends in Signal Processing, 2008, Now Publishers, Hanover, Mass., USA, 2(4):247-364.
Bordes et al. "AHG13—Weighted Prediction vs Generalized Bi-Prediction with Fade Sequences," Joint Video Experts Team (JVET0 of ITU-T SG 16 WP 3 and ISO/IEC JTC 1/SC 29/WG 11, 12th Meeting, Macao, CN, Oct. 3-12, 2018, document JVET-L0201, 2018.
Bordes et al. "CE10-Related: Pipeline Reduction for LIC and GBI," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0115, 2019.
Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Chen et al. "Generalized Bi-Prediction Method for Future Video Coding," 2016 Picture Coding Symposium (PCS), IEEE, Dec. 4, 2016, pp. 1-5.
Chen et al. "Algorithm Description of Joint Exploration Test Model 7 (JEM 7)," Joint Video Exploration Team (JVET) of ITU-T SG 16 WP 3 and iSO/IEC JTC 1/SC 29/WG 11 7th Meeting, Torino, IT, Jul. 13-21, 2017, document JVET-G1001, 2017.
Chen et al. "AHG5: Reducing VVC Worst-Case Memory Bandwidth by Restricting Bi-Directional 4×4 Inter Cus/Sub-Blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.
Chen et al. "CE4-Related: Modified History-based MVP to Support Parallel Processing," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0106, 2018.
Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337, 2018.
Hashimoto et al. "Non-CE4: Weighted Prediction with BDOF and Bi-Prediction with CU Weights Harmonization," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0067, 2019.

(56) References Cited

OTHER PUBLICATIONS

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2018.

Hsu et al. "Description of SDR Video Coding Technology Proposal by MediaTek," Joint Video Experts Team (JVET) of ITU-T SG 16 WP 3 and ISO/IEC JTC 1/SC 29/WG 11 10th Meeting, San Diego, US, Apr. 10-20, 2018, document JVET-J0018, 2018.

Hsu et al. "Description of Core Experiment 10: Combined and Multi-Hypothesis Prediction," Joint Video Experts Team (JVET0 of ITU-T SG 16 WP 3 and ISO/IEC JTC 1/SC 29/WG 11, 12th Meeting, Macao, CN, Oct. 3-12, 2018, document JVET-L1030, 2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Li et al. "An Efficient Four-Parameter Affine Motion Model for Video Coding," IEEE Transactions on Circuits and Systems for Video Technology, Aug. 2018, 28(8):1934-1948.

Li et al. "CE4-Related: Affine Merge Mode with Prediction Offsets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Rasch et al. "CE10: Uniform Directional Diffusion Filters for Video Coding," Joint Video Experts Team (JVET) of ITU-T SG 16 WP 3 and ISO/IEC JTC 1/Sc 29/WG 11, 12th Meeting, Macao, CN, Oct. 3-12, 2018, document JVET-L0157, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Rusanovskyy et al. "CEM: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0406, 2018.

Seregin et al. "On Intra Block Copy Bitstream Constraints," Joint Collaborative Team on Video Coding (JCT-VC) of ITU-T SG 16 WP 3 and ISO/IEC JTC 1/SC 29/WG 11 21st Meeting, Warsaw, PL, Jun. 19-26, 2015, document JCTVC-U0118, 2015.

Seregin et al. "CE4-3.1a and CE4-3.1b: Unidirectional Local Illumination Compensation with Affine Prediction," Joint Video Experts Team (JVET) of ITU-T SG 16 WP 3 and ISO/IEC JTC 1/SC 29/WG 11, 15th Meeting, Gothenburg, SE Jul. 3-12, 2019, document JVET-O066, 2019.

Skrupin et al. "AHG17: On VVC HLS," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0101, 2019.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.

Tamse et al. "CE4.7.1 and CE4.7.2—Non Temporal Illumination Compensation in JVET-K1024," Joint Video Experts Team (JVET) of ITU-T SG 16 WP 3 and ISO/IEC JTC 1/SC 29/WG 11 12th Meeting, Macao, CN, Oct. 3-12, 2018. document JVET-K0056, 2018.

Toma et al. "Description of SDR Video Coding Technology Proposal by Panasonic," The Joint Video Exploration Team of ISO/IEC JTC1/SC 29/WG 11 and ITU-T SG 16, JVET Meeting, Apr. 10-20, 2018, document JVET-J0020, 2018.

Winken et al. "CE10:Multi-Hypothesis Inter Prediction (Tests 1.5-1.8)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0269, 2018.

Xu et al. "CE8-2.2: Current Picture Referencing Using Reference Index Signaling," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0076, 2018.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1024, 2018.

Ye et al. "AHG13: On Bi-Prediction with Weighted Averaging and Weighted Prediction," Joint Video Experts Team (JVET) of ITU-T SG 16 WP 3 and ISO/IEC JTC 1/SC 29/WG 11 13th Meething, Marrakech, MA, Jan. 9-18, 2019, JVET-M0111, 2019.

Zhang et al. "CE4.2.14: Planar Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document JVET-K0135, 2018.

Zhou et al. "JVET AHG Report: Implementation Studies (AHG16)," Joint Video Exploration Team (JVET) of ITU-T SG 16 WP 3 and ISO/IEC JTC 1/SC 29/WG 11, 13th Meeting, Marrakesh, MA, Jan. 9-18, 2019, document JVET-M0016, 2019.

International Search Report and Written Opinion from International Patent Application No. PCT/CN2020/072237 dated Apr. 13, 2020 (10 pages).

International Search Report and Written Opinion from International Patent Application No. PCT/CN2020/072241 dated Mar. 27, 2020 (10 pages).

International Search Report and Written Opinion from International Patent Application No. PCT/CN2020/072595 dated Apr. 7, 2020 (10 pages).

International Search Report and Written Opinion from International Patent Application No. PCT/CN2020/072596 dated Apr. 9, 2020 (10 pages).

International Search Report and Written Opinion from International Patent Application No. PCT/IB2019/059042 dated Feb. 11, 2020 (17 pages).

International Search Report and Written Opinion from International Patent Application No. PCT/IB2019/059047 dated Jan. 27, 2020 (16 pages).

International Search Report and Written Opinion from International Patent Application No. PCT/IB2019/059048 dated Mar. 17, 2020 (20 pages).

International Search Report and Written Opinion from International Patent Application No. PCT/IB2019/059049 dated Jan. 20, 2020 (19 pages).

Non-Final Office Action from U.S. Appl. No. 17/228,959 dated Jun. 11, 2020.

Non-Final Office Action from U.S. Appl. No. 17/228,935 dated Jun. 21, 2021.

High Efficiency Video Coding, Series H: Audiovisual and Multimedia Systems, Infrastructure of Audiovisual Services—Coding of Moving Video, ITU-T Telecommunication Standardization Sector of ITU, H.265, Apr. 2013.

Non-Final Office Action from U.S. Appl. No. 17/230,064 dated Dec. 22, 2021.

* cited by examiner

Original Merge candidate list

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

Merge candidate list after adding combined candidates

| Merge_idx | L0 | L1 |
|---|---|---|
| 0 | mvL0_A,ref0 | combine |
| 1 | | mvL1_B,ref0 |
| 2 | mvL0_A,ref0 | mvL1_B,ref0 |
| 3 | | |
| 4 | | |

HARMONIZED LOCAL ILLUMINATION COMPENSATION AND MODIFIED INTER PREDICTION CODING

THE CROSS REFERENCE TO RELATED APPLICATIONS

This application is a continuation of International Application No. PCT/IB2019/059048, filed on Oct. 23, 2019, which claims the priority to and benefits of International Patent Application No. PCT/CN2018/111436, filed on Oct. 23, 2018, and PCT/CN2019/071759, filed on Jan. 15, 2019, and PCT/CN2019/072154, filed on Jan. 17, 2019. All the aforementioned patent applications are hereby incorporated by reference in their entireties.

TECHNICAL FIELD

The present patent document relates to the field of video processing.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

The present document provides techniques for incorporating local illumination compensation in embodiments of video encoders or decoders.

In one example aspect, a video processing method is disclosed. The video processing method comprises: determining, based on a position rule, whether a local illumination compensation (LIC) tool is enabled for a conversion between a current block in a video region of a video and a coded representation of the video, and performing the conversion based on the position rule. The position rule specifies that the LIC tool is enabled for blocks on boundaries of the video region and disabled for blocks inside the video region and the LIC tool includes using a linear model of illumination changes in the current block during the conversion.

In another example aspect, a video processing method is disclosed. The video processing method comprises: determining, a procedure for deriving local illumination compensation parameters used for a conversion between a current video block of a video region or a video and a coded representation of the video based on a position rule of the current video block in the video region; and performing the conversion based on the determining.

In another example aspect, a video processing method is provided. The video processing method comprises: determining, for a conversion between a current block in a video region of a video and a coded representation of the video, local illumination compensation (LIC) parameters for a LIC operation using at least some samples of neighboring blocks of the current block; and performing the conversion using the determined LIC parameters, wherein the LIC operation includes using a linear model of illumination changes in the current block during the conversion.

In another example aspect, a video processing method is provided. The video processing method comprises: performing a conversion between a current block in a video region of a video and a coded representation of the video, wherein the video is represented as video frames comprising video blocks, and a local illumination compensation (LIC) tool is enabled for video blocks that use a geometric prediction structure including a triangular prediction mode, wherein the LIC tool includes using a linear model of illumination changes in the current block during the conversion.

In another example aspect, a video processing method is provided. The video processing method comprises: performing a conversion between a current block in a video region of a video and a coded representation of the video, wherein the video is represented as video frames comprising video blocks, and a local illumination compensation (LIC) operation is performed for less than all pixels of the current block, wherein the LIC operation includes using a linear model of illumination changes in the current block during the conversion.

In another example aspect, a video processing method is provided. The video processing method comprises: determining that a local illumination compensation (LIC) operation is to be performed; dividing a current block into video processing data units (VPDUs) based on the determination that the LIC operation is to be performed; and performing the LIC operation in sequence or in parallel for the VPDUs, wherein the LIC operation includes using a linear model of illumination changes in the current block during the conversion.

In one example aspect, a video processing method is disclosed. The video processing method comprises: determining to use a rule that specifies that at most a single coding tool from a set of coding tools is used for a conversion between a current block of a video comprising multiple pictures and a coded representation of the video, and performing the conversion based on the rule. The set of coding tools include coding tools that modify a reconstructed block of the current block generated from motion information from the coded representation or an inter prediction signal generated for the current block during the conversion.

In another example aspect, a video processing method is disclosed. The video processing method comprises: determining, for a conversion between a current block of a video and a coded representation of the video, that both local illumination compensation (LIC) and combined inter-intra prediction (CIIP) coding tools are enabled for the conversion of the current block; and performing the conversion based on the determining.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 7 shows an example of combined bi-predictive merge candidate

FIG. 19 shows an example of motion vector storage implementation.

DETAILED DESCRIPTION

Figure 1:
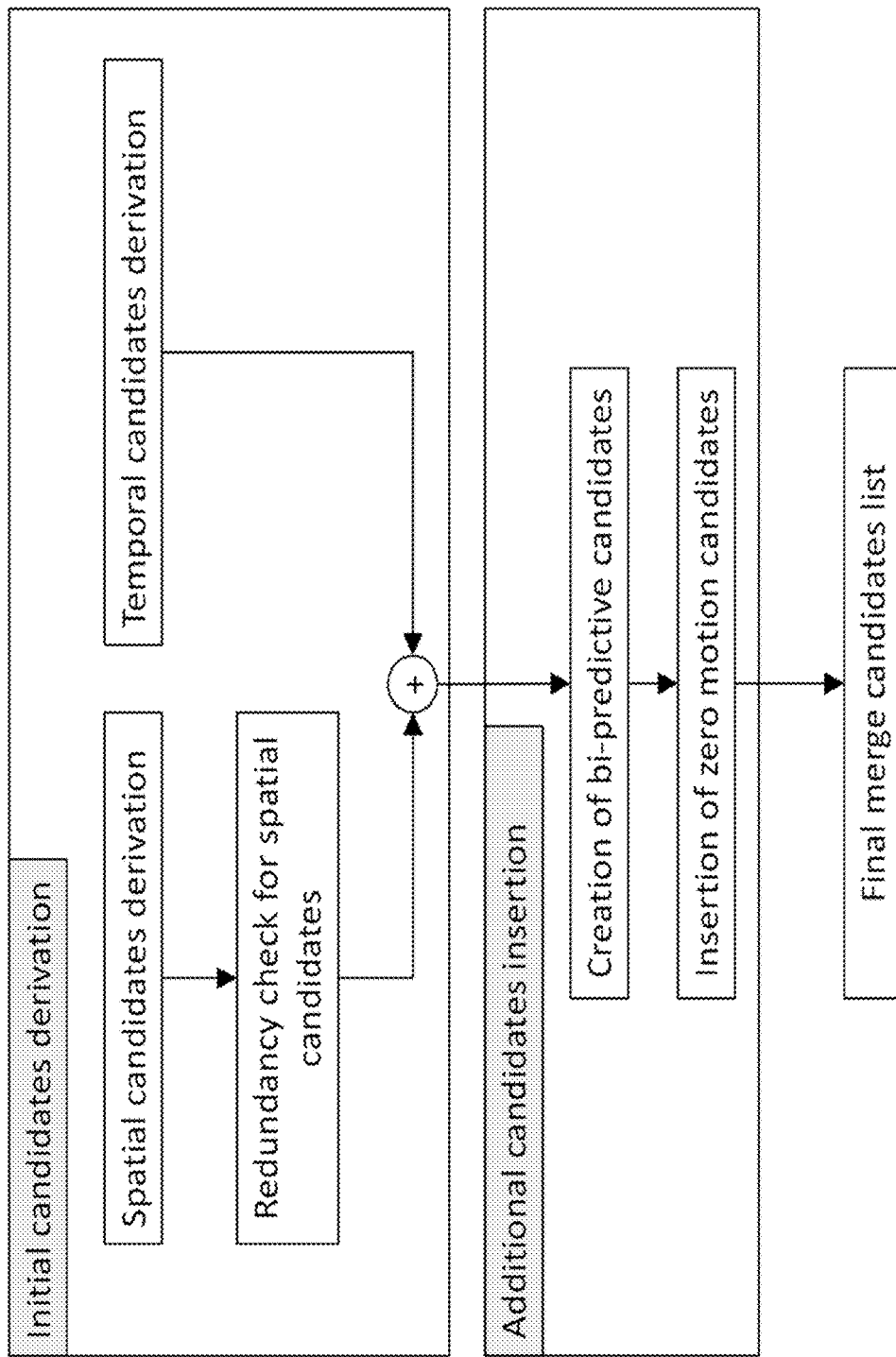
FIG. 1 shows an example of a derivation process for merge candidates list construction.

The present document provides several techniques that can be embodied into digital video encoders and decoders. Section headings are used in the present document for clarity of understanding and do not limit scope of the techniques and embodiments disclosed in each section only to that section.

1. Summary

This patent document is related to video coding technologies. Specifically, it is related to local illumination compensation (LIC) in video coding. It may be applied to the existing video coding standard like HEVC, or the standard (Versatile Video Coding) to be finalized. It may be also applicable to future video coding standards or video codec.

2. Examples of Video Coding/Decoding Technologies

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at: http://phenix.it-sudparis.eu/jvet/doc_end_user/documents/11_Ljubljana/wg11/JVET-K1001-v7.zip The latest reference software of VVC, named VTM, could be found at: https://vcgit.hhi.fraunhoferde/jvet/VVCSoftware_VTM/tags/VTM-2.1

2.1. Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Merge Mode
2.1.1.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2. Spatial Candidates Derivation

Figure 2:
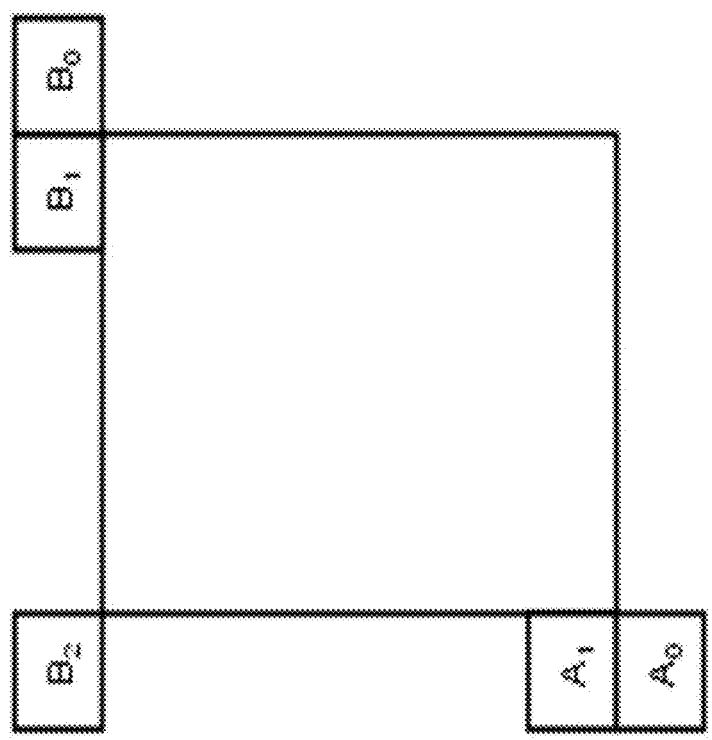
FIG. 2 shows example positions of spatial merge candidates.
Figure 3:
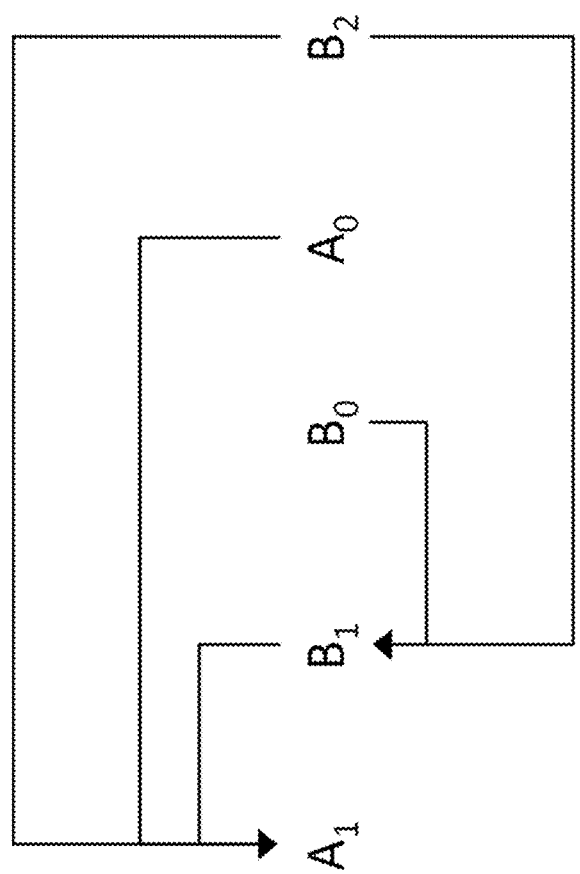
FIG. 3 shows examples of candidate pairs considered for redundancy check of spatial merge candidates.
Figure 4:
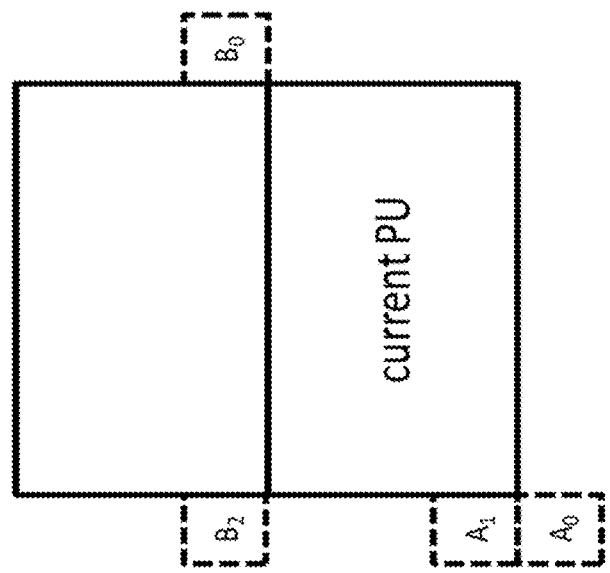
FIG. 4 shows example positions for the second PU of N×2N and 2N×N partitions.
Figure 4:
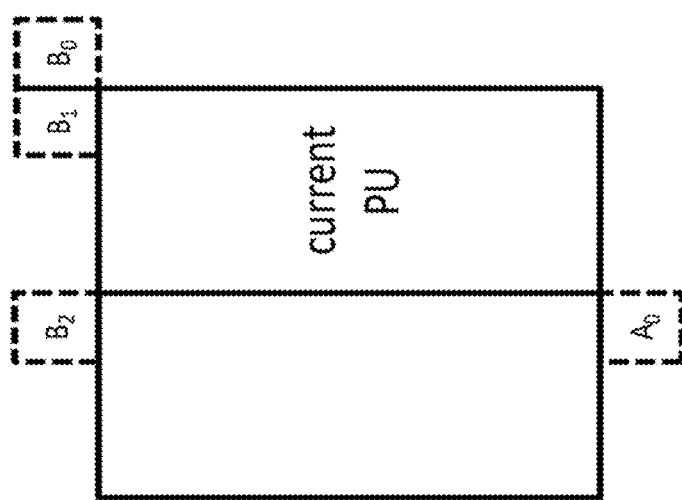

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. FIG. 3 shows examples of candidate pairs considered for redundancy check of spatial merge candidates. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position Bi is not considered when the current PU is partitioned as 2N×N.

2.1.1.3. Temporal Candidates Derivation

Figure 5:
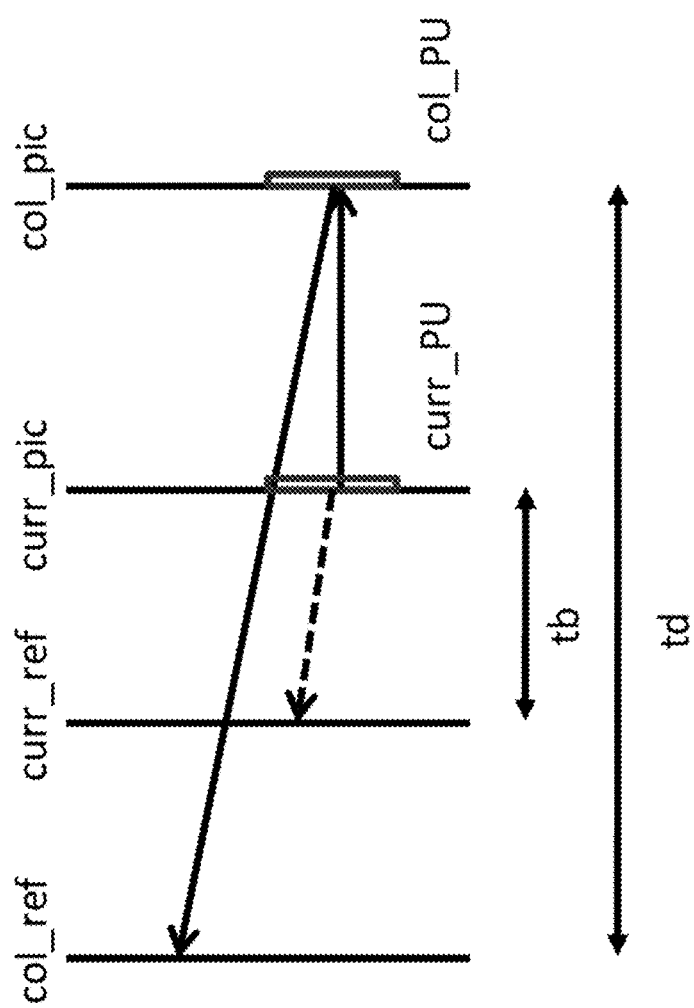
FIG. 5 is an Illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. FIG. 5 is an Illustration of motion vector scaling for temporal merge candidate. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
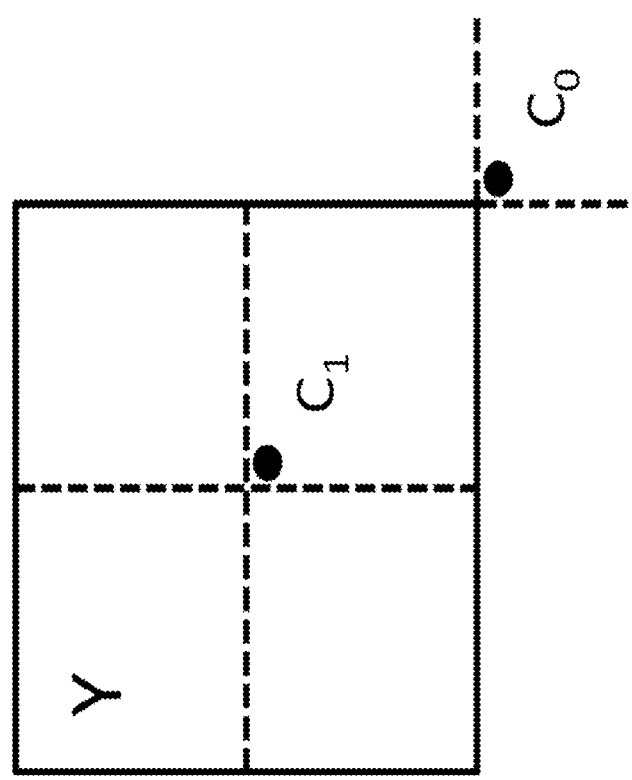
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.1.4. Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2. AMVP

Figure 8:
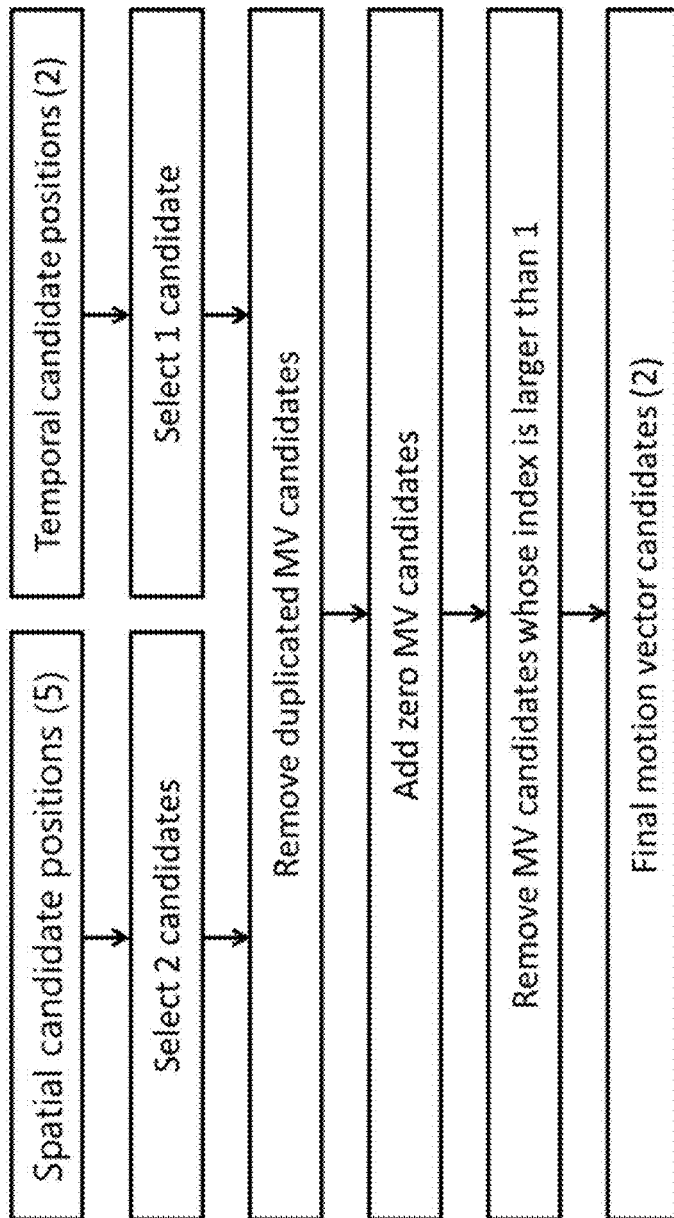
FIG. 8 shows an example of a derivation process for motion vector prediction candidates.

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1. Derivation of AMVP Candidates

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$ scaled $B_2$. For each side there are therefore four cases that can be used as motion vector candidate, with two cases not required to use spatial scaling, and two cases where spatial scaling is used. The four different cases are summarized as follows.

No spatial scaling
   (1) Same reference picture list, and same reference picture index (same POC)
   (2) Different reference picture list, but same reference picture (same POC)

Spatial scaling
   (3) Same reference picture list, but different reference picture (different POC)
   (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
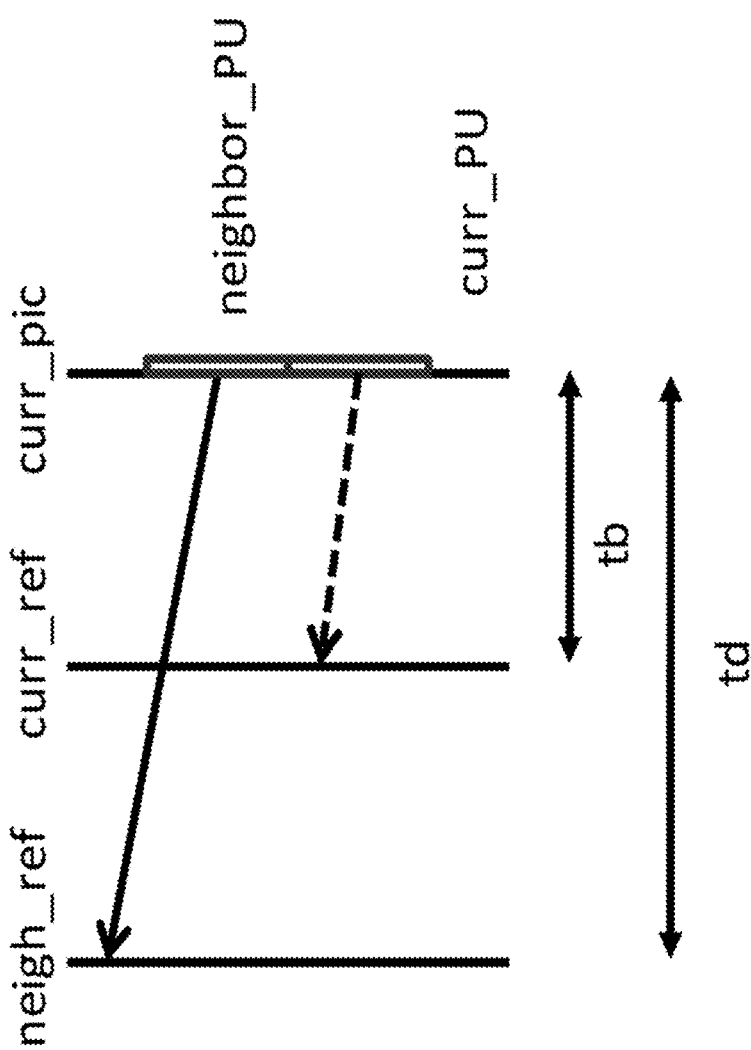
FIG. 9 is an example illustration of motion vector scaling for spatial motion vector candidate.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.2.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. New Inter Prediction Methods in JEM 2.2.1. Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighboring motion vector.

To preserve more accurate motion field for sub-CU motion prediction, the motion compression for the reference frames is currently disabled.

2.2.1.1. Alternative Temporal Motion Vector Prediction

Figure 10:
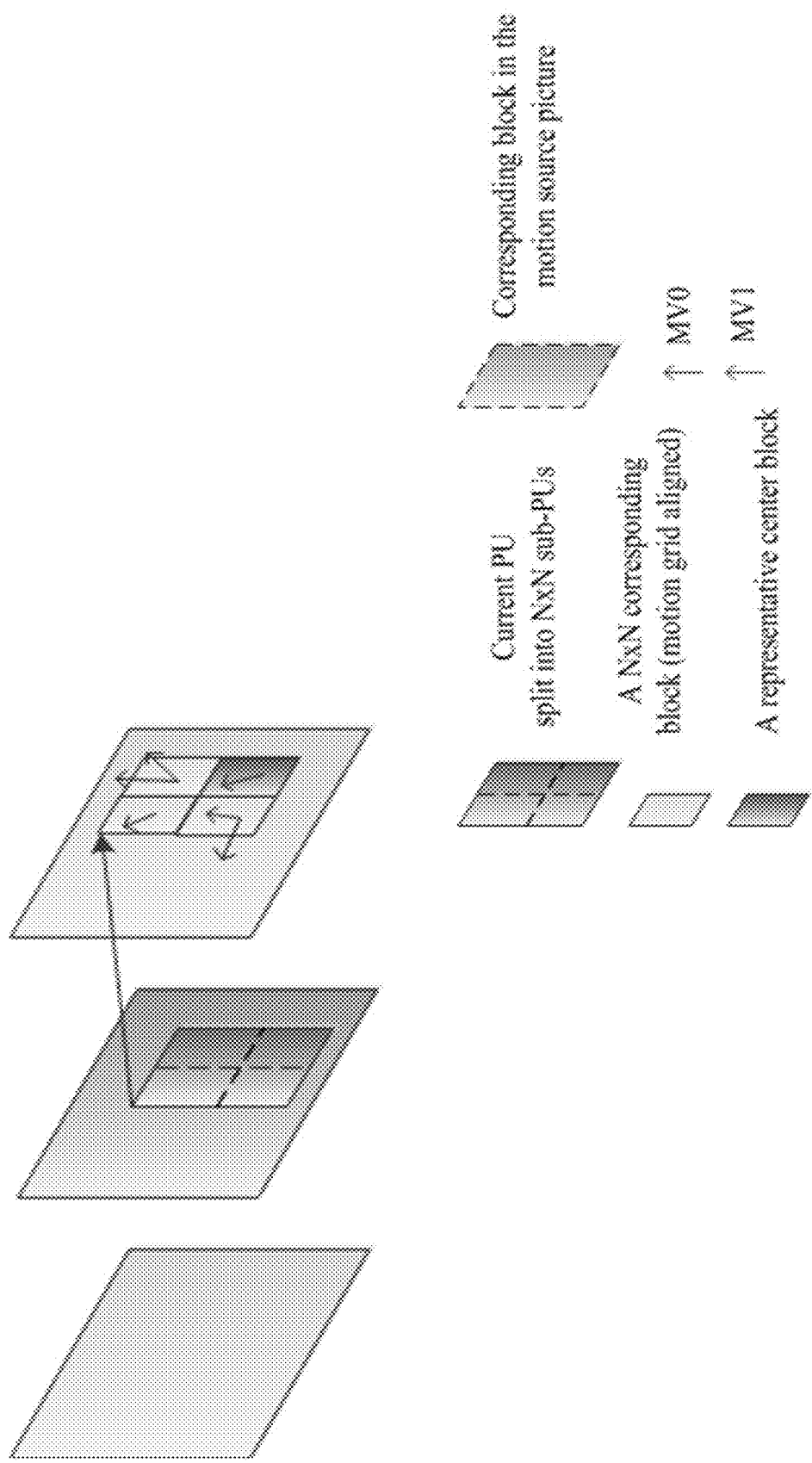
FIG. 10 illustrates an example of advanced temporal motion vector predictor (ATMVP) for a Coding Unit (CU).

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighboring blocks of the current CU. To avoid the repetitive scanning process of neighboring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.1.2. Spatial-Temporal Motion Vector Prediction

Figure 11:
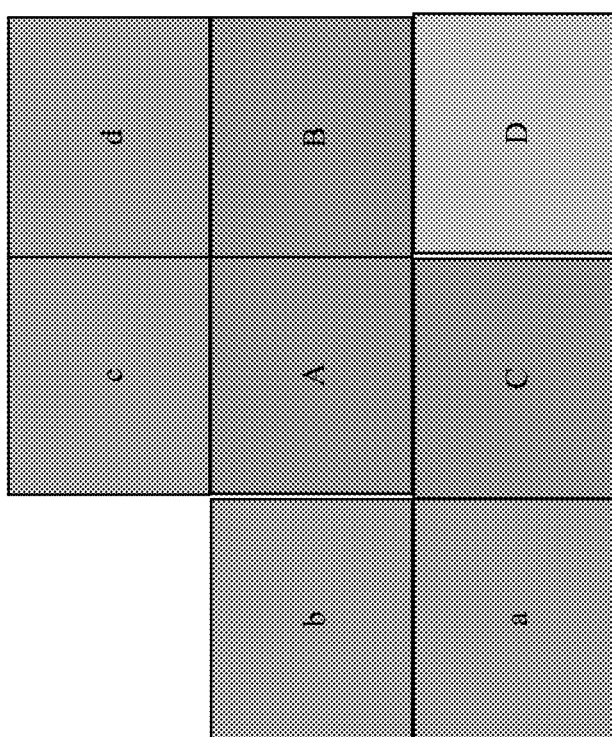
FIG. 11 shows an Example of one CU with four sub-blocks (A-D) and its neighboring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighboring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighboring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3. Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index are context coded by CABAC. While in HEVC, only the first bin is context coded and the remaining bins are context by-pass coded.

2.2.2. Pairwise Average Candidates

Pairwise average candidates are generated by averaging predefined pairs of candidates in the current merge candidate list, and the predefined pairs are defined as $\{(0, 1), (0, 2), (1, 2), (0, 3), (1, 3), (2, 3)\}$, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard.

The complexity analysis of pairwise average candidates is summarized in the Table 1. For the worst case of additional calculations for averaging (the last column in Table 1), 4 additions and 4 shifts are needed for each pair (MVx and MVy in L0 and L1), and 4 reference index comparisons are needed for each pair (refIdx0 is valid and refIdx1 is valid in L0 and L1). There are 6 pairs, leading to 24 additions, 24 shifts, and 24 reference index comparisons in total. The combined candidates in HEVC standard use 2 reference index comparisons for each pair (refIdx0 is valid in L0 and refIdx1 is valid in L1), and there are 12 pairs, leading to 24 reference index comparisons in total.

TABLE 1

Operation analysis for the pairwise average candidates

| Merge list size | Max number of potential candidates | Max number of candidate comparisons | Max number of MV scalings | Max number of temporal candidates | Addition al local buffer | Max number of memory access | Others |
|---|---|---|---|---|---|---|---|
| 6, 8, 10 | 6 | 0 | 0 | 0 | 0 | 0 | Replace HEVC combined candidates, |

TABLE 1-continued

Operation analysis for the pairwise average candidates

| Merge list size | Max number of potential candidates | Max number of candidate comparisons | Max number of MV scalings | Max number of temporal candidates | Addition al local buffer | Max number of memory access | Others |
|---|---|---|---|---|---|---|---|
| | | | | | | | need additional calculations for averaging |

2.2.3. Planar Motion Vector Prediction

In JVET-K0135, planar motion vector prediction is proposed.

Figure 12:
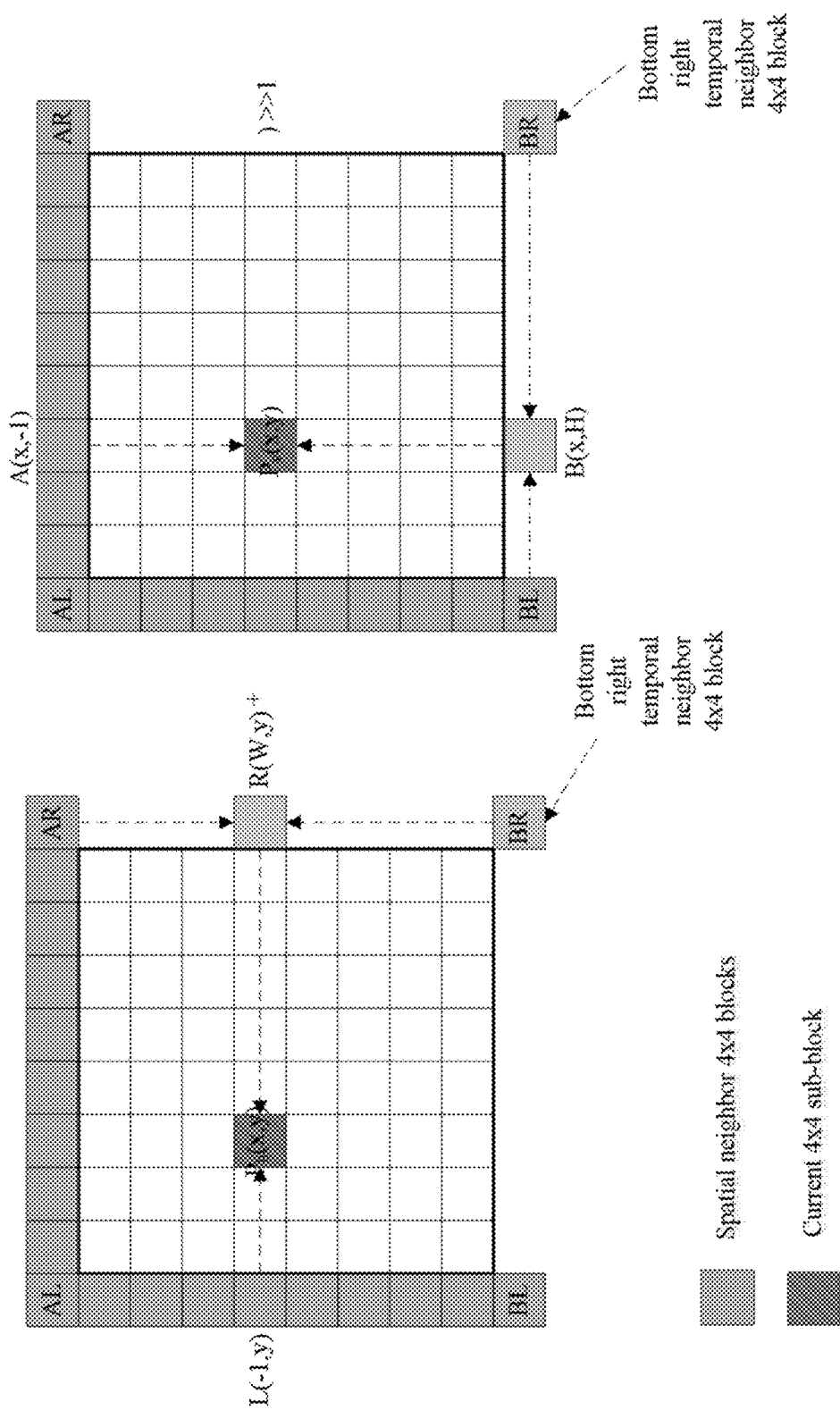
FIG. 12 shows an example of a planar motion vector prediction process.

To generate a smooth fine granularity motion field, FIG. 12 gives a brief description of the planar motion vector prediction process.

Planar motion vector prediction is achieved by averaging a horizontal and vertical linear interpolation on 4×4 block basis as follows.

$$P(x,y)=(H \times P_h(x,y)+W \times P_v(x,y)+H \times W)/(2 \times H \times W) \quad \text{Eq. (1)}$$

W and H denote the width and the height of the block. (x,y) is the coordinates of current sub-block relative to the above left corner sub-block. All the distances are denoted by the pixel distances divided by 4. P(x, y) is the motion vector of current sub-block.

The horizontal prediction $P_h(x, y)$ and the vertical prediction $P_v(x, y)$ for location (x,y) are calculated as follows:

$$P_h(x,y)=(W-1-x) \times L(-1,y)+(x+1) \times R(W,y) \quad \text{Eq. (2)}$$

$$P_v(x,y)=(H-1-y) \times A(x,-1)+(y+1) \times B(x,H) \quad \text{Eq. (3)}$$

where L(−1, y) and R(W, y) are the motion vectors of the 4×4 blocks to the left and right of the current block. A(x,−1) and B(x,H) are the motion vectors of the 4×4 blocks to the above and bottom of the current block.

The reference motion information of the left column and above row neighbour blocks are derived from the spatial neighbour blocks of current block.

The reference motion information of the right column and bottom row neighbour blocks are derived as follows.

1) Derive the motion information of the bottom right temporal neighbour 4×4 block
2) Compute the motion vectors of the right column neighbour 4×4 blocks, using the derived motion information of the bottom right neighbour 4×4 block along with the motion information of the above right neighbour 4×4 block, as described in Eq. (4).
3) Compute the motion vectors of the bottom row neighbour 4×4 blocks, using the derived motion information of the bottom right neighbour 4×4 block along with the motion information of the bottom left neighbour 4×4 block, as described in Eq. (5).

$$R(W,y)=((H-y-1) \times AR+(y+1) \times BR)/H \quad \text{Eq. (4)}$$

$$B(x,H)=((W-x-1) \times BL+(x+1) \times BR)/W \quad \text{Eq. (5)}$$

where AR is the motion vector of the above right spatial neighbour 4×4 block, BR is the motion vector of the bottom right temporal neighbour 4×4 block, and BL is the motion vector of the bottom left spatial neighbour 4×4 block.

The motion information obtained from the neighboring blocks for each list is scaled to the first reference picture for a given list.

2.2.4. Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 13:
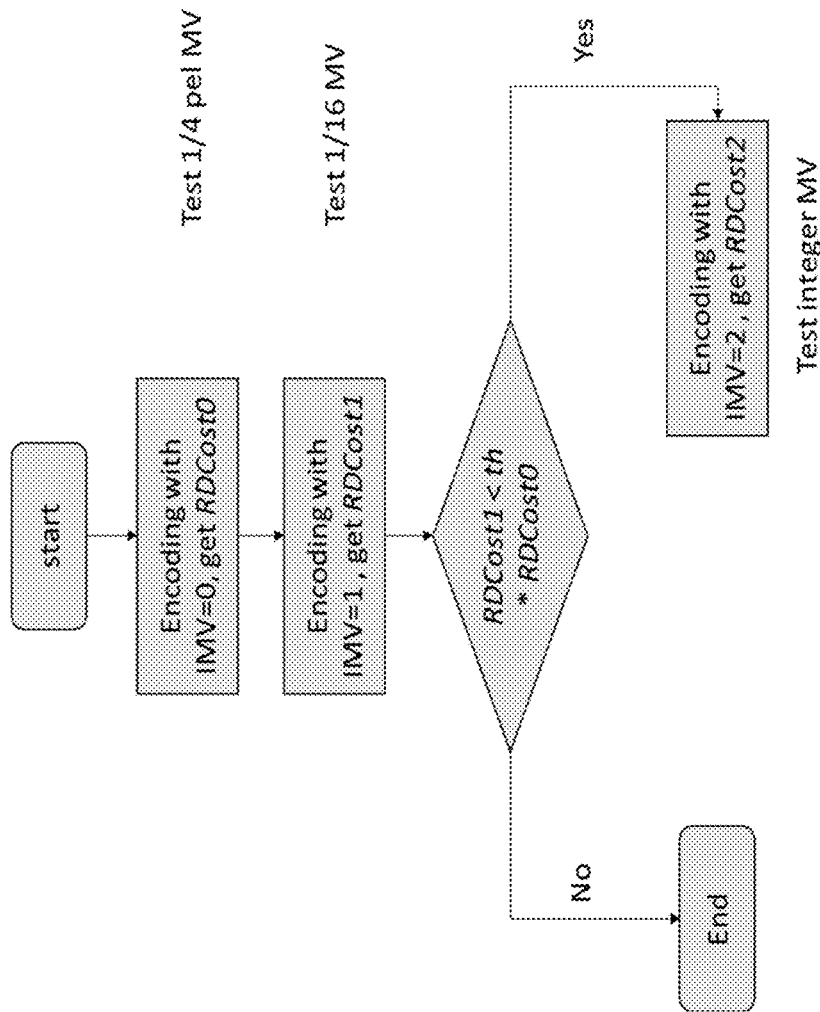
FIG. 13 is a flowchart of an example of encoding with different motion vector (MV) precision.

The encoding process is shown in FIG. 13. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.5. Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in section 2.2.2.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighboring 1/16 pel fractional positions.

2.2.6. Overlapped Block Motion Compensation

Figure 14:
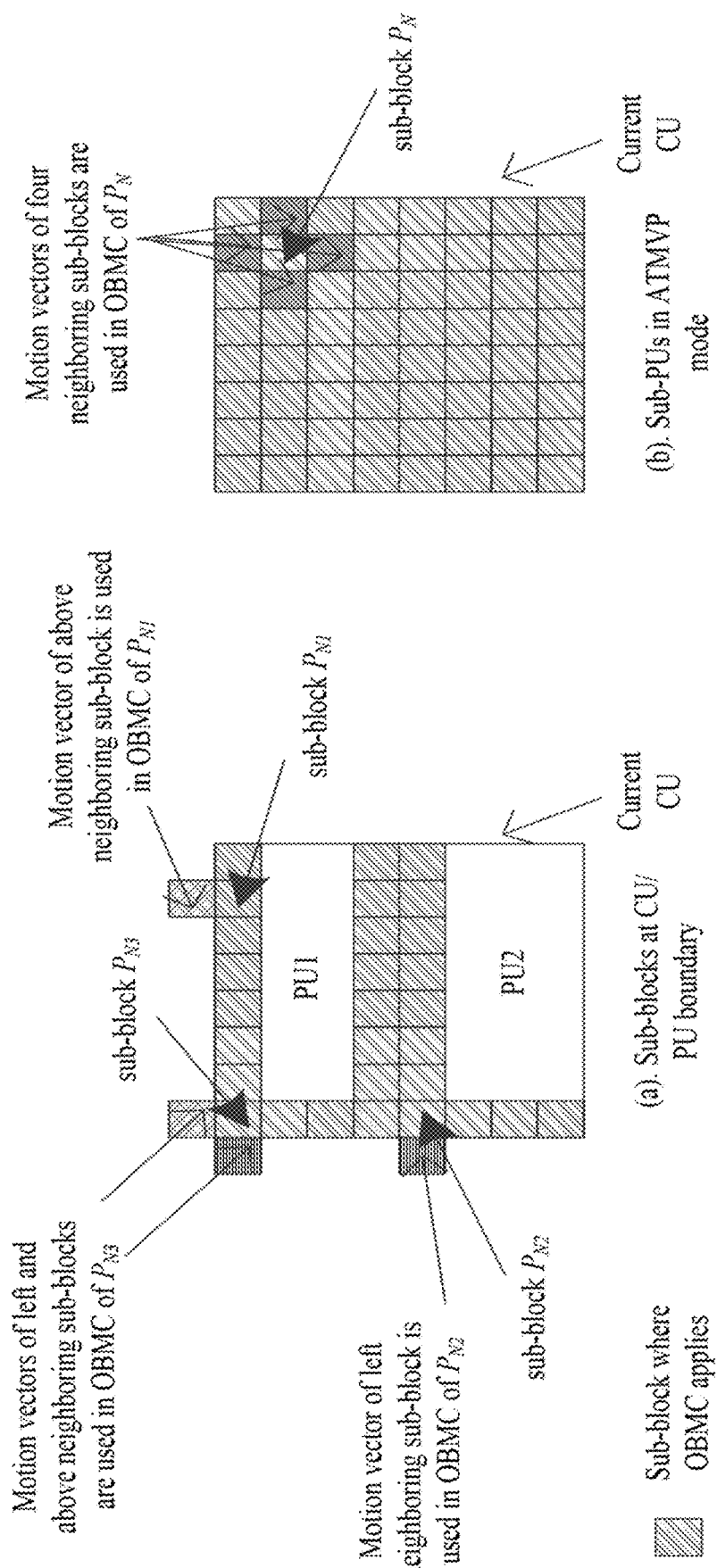
FIG. 14 is an example Illustration of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 14.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as $P_N$, with N indicating an index for the neighboring above, below, left and right sub-blocks and prediction block based on motion vectors of the current sub-block is denoted as $P_C$. When $P_N$ is based on the motion information of a neighboring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighboring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.2.7. Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 15:
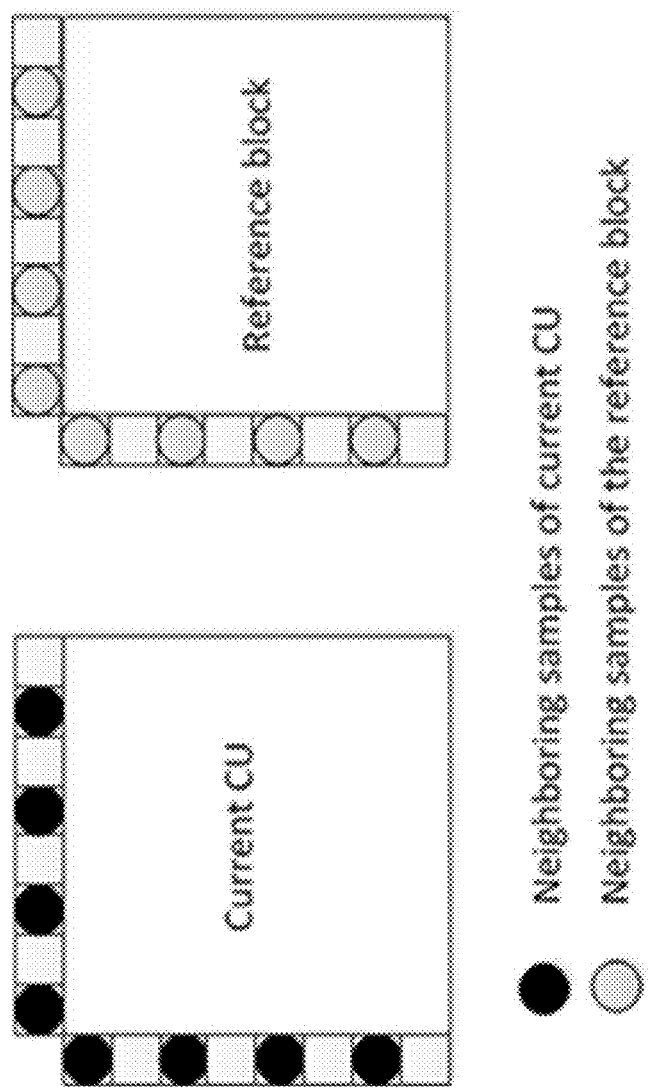
FIG. 15 shows an example of neighboring samples used for deriving IC parameters.

When LIC applies for a CU, a least square error method is employed to derive the parameters a and b by using the neighboring samples of the current CU and their corresponding reference samples. More specifically, as illustrated in FIG. 15, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM. LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.8. Hybrid Intra and Inter Prediction

In JVET-L0100, multi-hypothesis prediction is proposed, wherein hybrid intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Such method is also known as Combined intra-inter Prediction (CIIP).

2.2.9. Triangular Prediction Unit Mode

Figure 16:
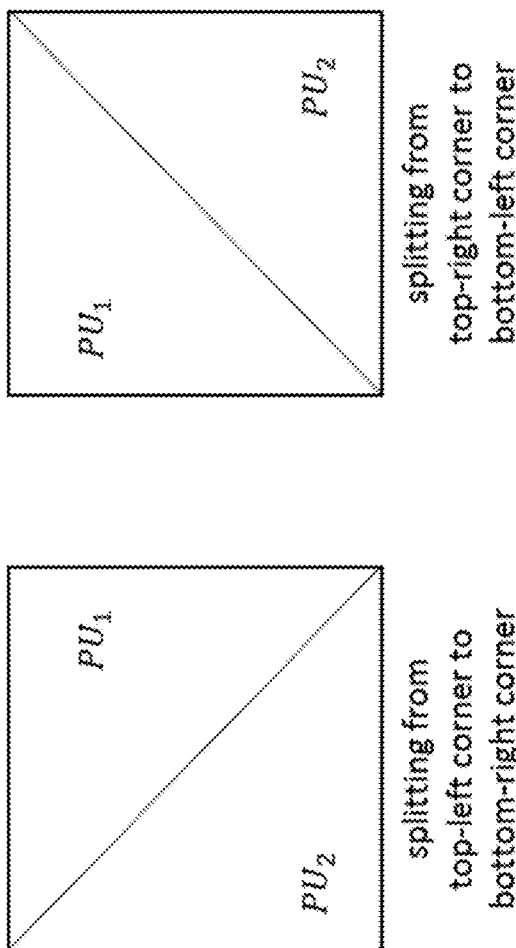
FIG. 16 is an illustration of splitting a coding unit (CU) into two triangular prediction units.

The concept of the triangular prediction unit mode is to introduce a new triangular partition for motion compensated prediction. As shown in FIG. 16, it splits a CU into two triangular prediction units (PUs), in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

Uni-Prediction Candidate List

Figure 17:
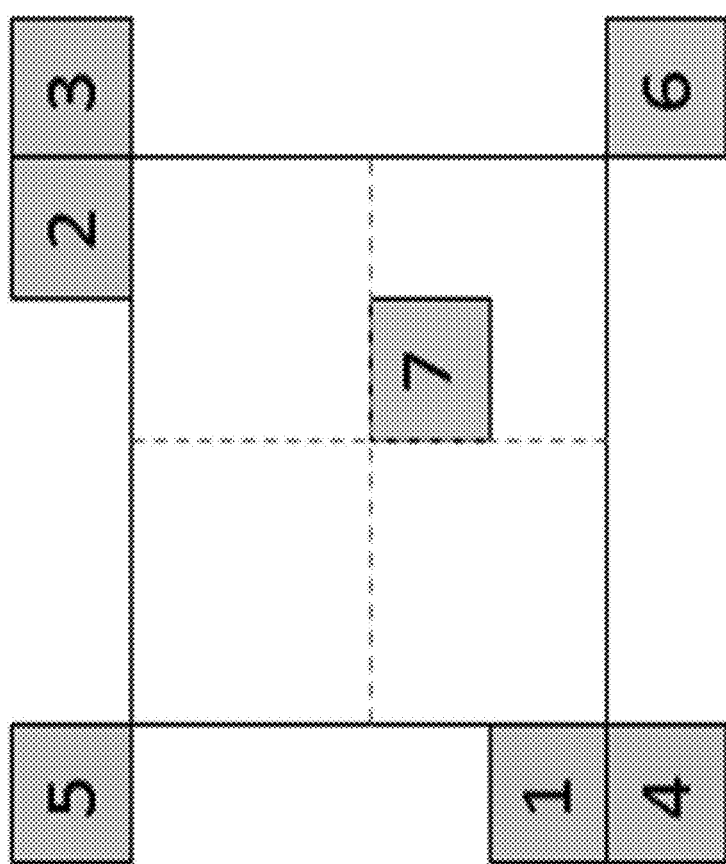
FIG. 17 shows an example of positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 17. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

Adaptive Weighting Process

After predicting each triangular prediction unit, an adaptive weighting process is applied to the diagonal edge between the two triangular prediction units to derive the final prediction for the whole CU. Two weighting factor groups are listed as follows:
  1$^{st}$ weighting factor group: {7/8, 6/8, 4/8, 2/8, 1/8} and {7/8, 4/8, 1/8} are used for the luminance and the chrominance samples, respectively;
  2$^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 18:
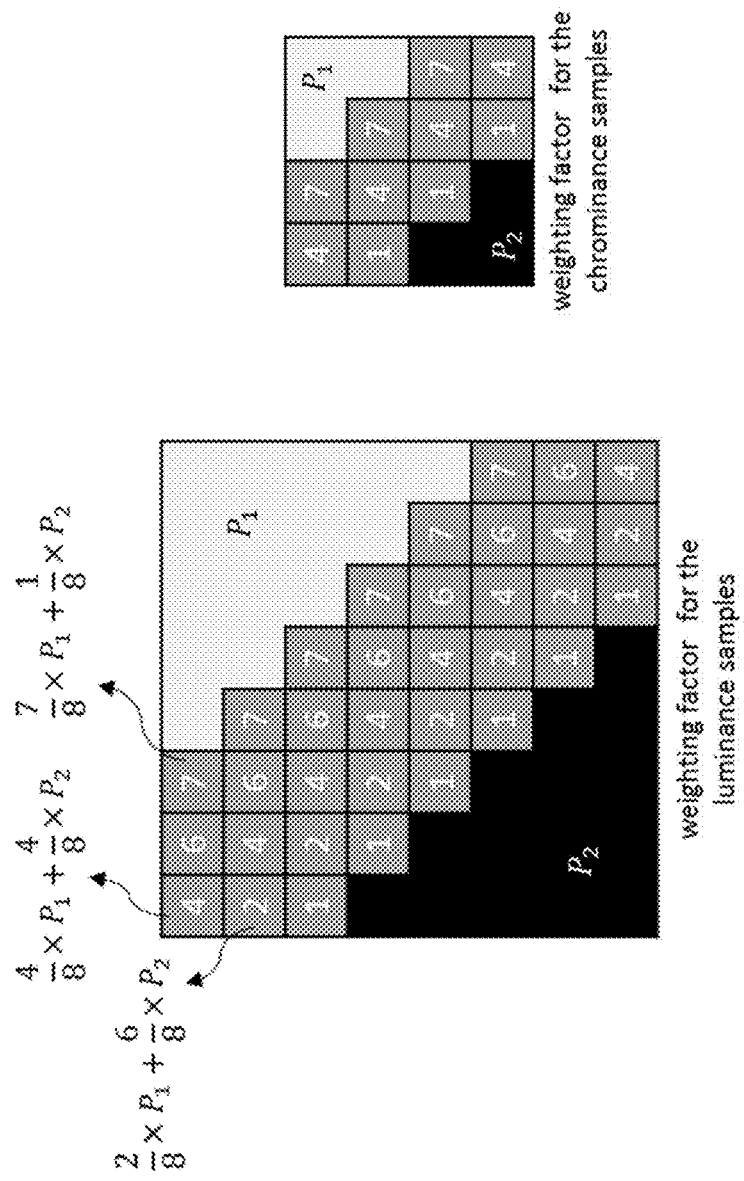
FIG. 18 shows an example in which a CU applies the $1^{st}$ weighting factor group.

One weighting factor group is selected based on the comparison of the motion vectors of two triangular prediction units. The 2$^{nd}$ weighting factor group is used when the reference pictures of the two triangular prediction units are different from each other or their motion vector difference is larger than 16 pixels. Otherwise, the 1$^{st}$ weighting factor group is used. An example is shown in FIG. 18.

Motion Vector Storage

Figure 19:
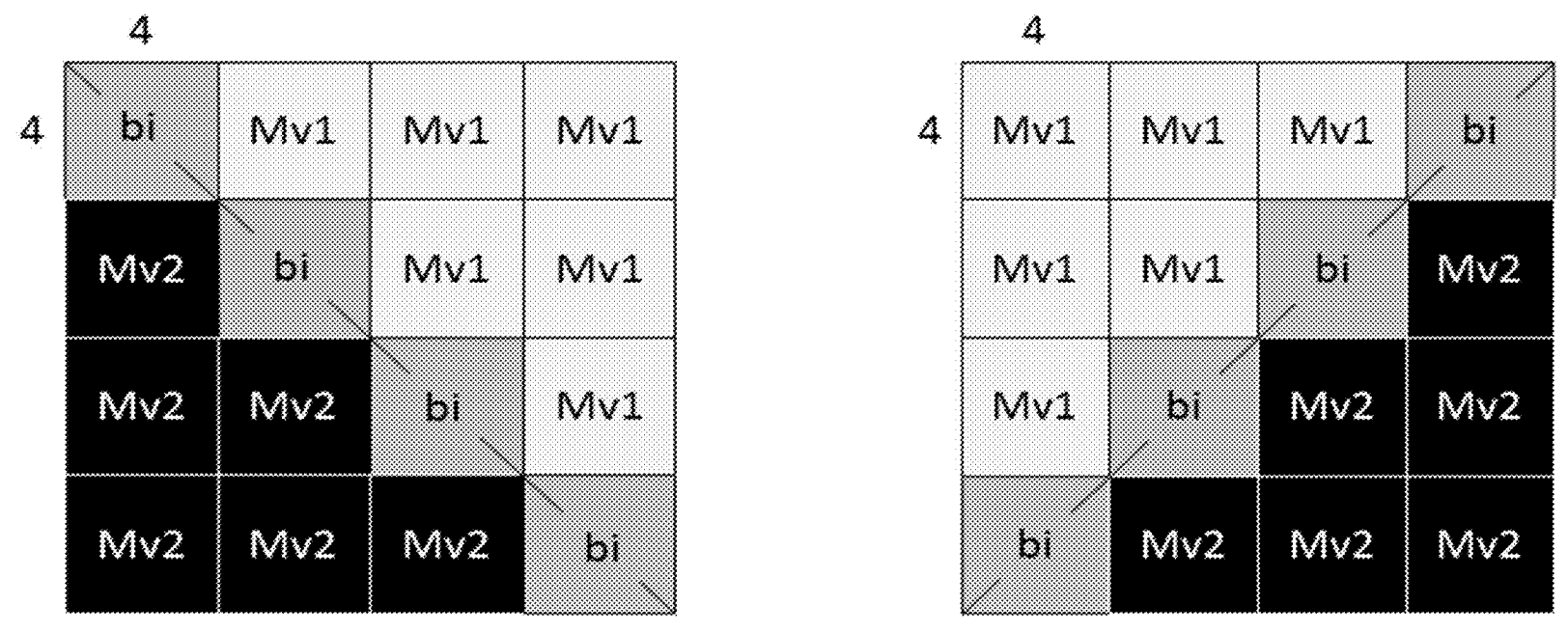

The motion vectors (Mv1 and Mv2 in FIG. 19) of the triangular prediction units are stored in 4×4 grids. For each 4×4 grid, either uni-prediction or bi-prediction motion vector is stored depending on the position of the 4×4 grid in the CU. As shown in FIG. 19, uni-prediction motion vector, either Mv1 or Mv2, is stored for the 4×4 grid located in the non-weighted area. On the other hand, a bi-prediction motion vector is stored for the 4×4 grid located in the weighted area. The bi-prediction motion vector is derived from Mv1 and Mv2 according to the following rules:
  1) In the case that Mv1 and Mv2 have motion vector from different directions (L0 or L1), Mv1 and Mv2 are simply combined to form the bi-prediction motion vector.
  2) In the case that both Mv1 and Mv2 are from the same L0 (or L1) direction,
    2.a) If the reference picture of Mv2 is the same as a picture in the L1 (or L0) reference picture list, Mv2 is scaled to the picture. Mv1 and the scaled Mv2 are combined to form the bi-prediction motion vector.
    2.b) If the reference picture of Mv1 is the same as a picture in the L1 (or L0) reference picture list, Mv1 is scaled to the picture. The scaled Mv1 and Mv2 are combined to form the bi-prediction motion vector.
    2.c) Otherwise, only Mv1 is stored for the weighted area.

2.2.10. Affine Motion Compensation Prediction

Figure 20:
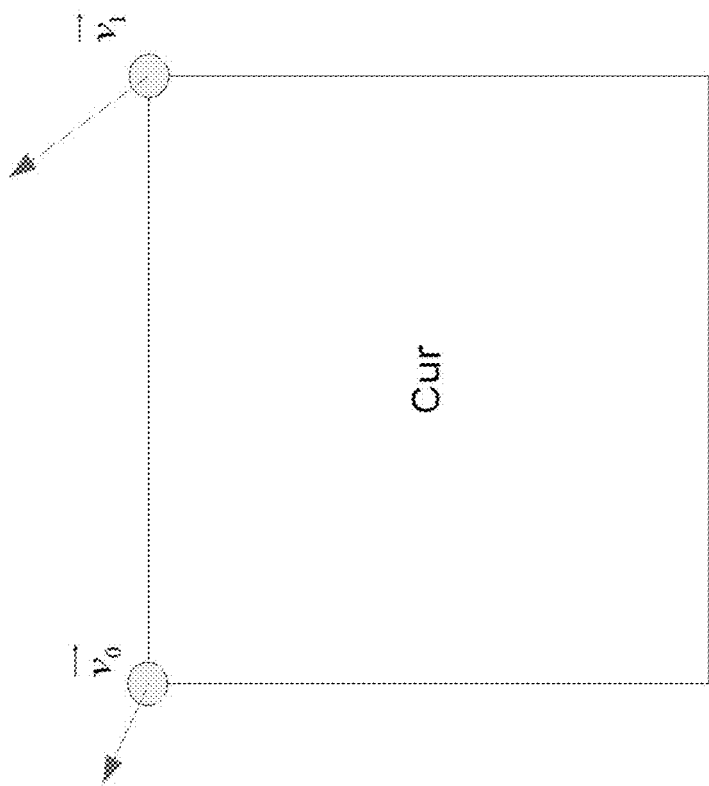
FIG. 20 shows an example of a simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown in FIG. 20, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (6)}$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Eq. (7), where MvPre is the motion vector fraction accuracy (1/16 in JEM), $(v_{2x}, v_{2y})$ is motion vector of the bottom-left control point, calculated according to Eq. (6).

$$\begin{cases} M = clip3\left(4, w, \frac{w \times MvPre}{\max(\text{abs}(v_{1x} - v_{0x}), \text{abs}(v_{1y} - v_{0y}))}\right) \\ N = clip3\left(4, h, \frac{h \times MvPre}{\max(\text{abs}(v_{2x} - v_{0x}), \text{abs}(v_{2y} - v_{0y}))}\right) \end{cases} \quad \text{Eq. (7)}$$

After derived by Eq. (7), M and N should be adjusted downward if necessary to make it a divisor of w and h, respectively.

Figure 21:
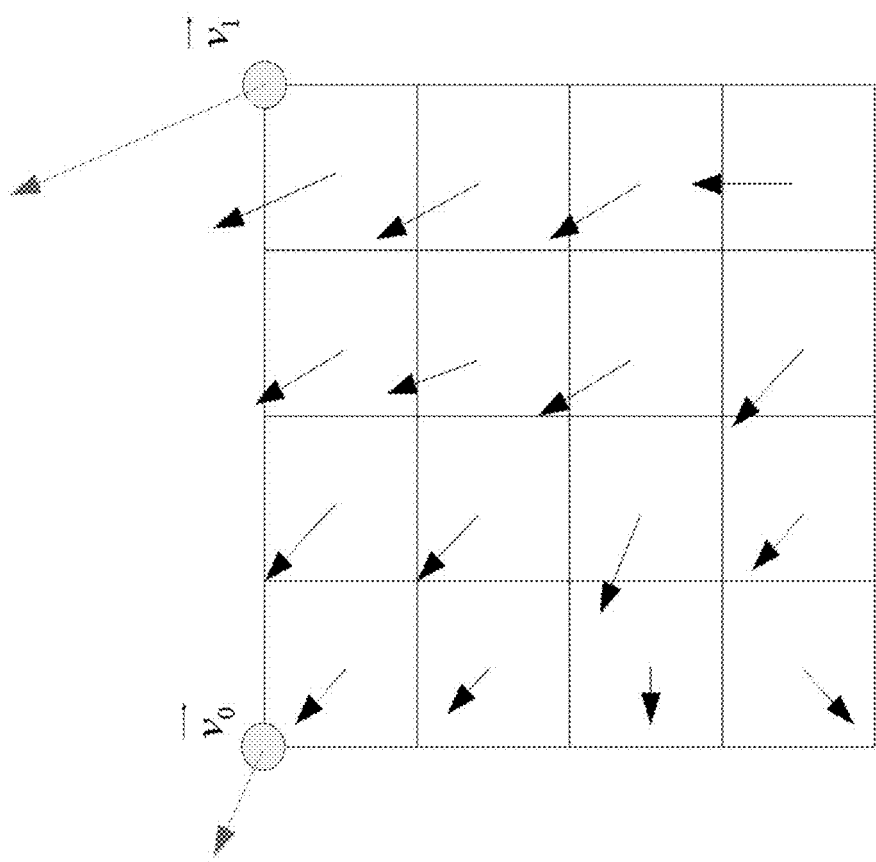
FIG. 21 shows an example of affine MVF per sub-block.

To derive motion vector of each M×N sub-block, the motion vector of the center sample of each sub-block, as shown in FIG. 21, is calculated according to Equation 1, and rounded to 1/16 fraction accuracy. Then the motion compensation interpolation filters mentioned in section 2.2.5 are applied to generate the prediction of each sub-block with derived motion vector.

After MCP, the high accuracy motion vector of each sub-block is rounded and saved as the same accuracy as the normal motion vector.

2.2.10.1. AF_INTER Mode

Figure 23:
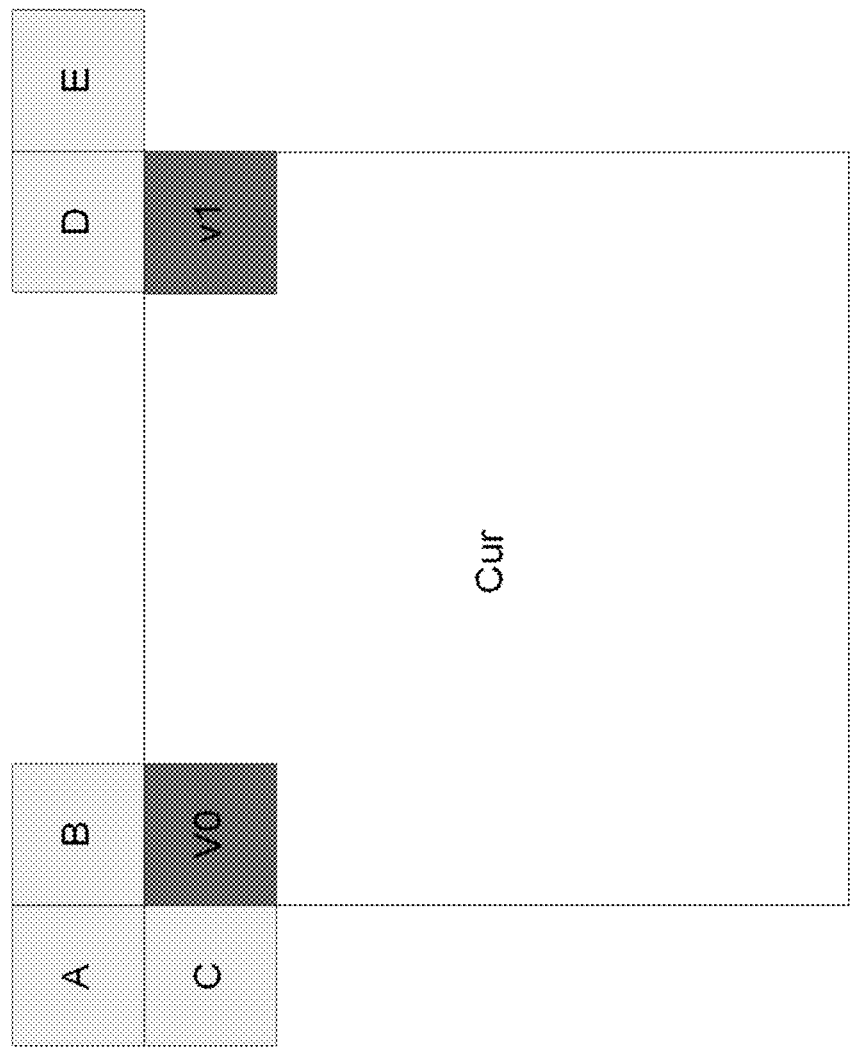
FIG. 23 shows an example of a Motion Vector Predictor (MV) for AF_INTER mode.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0,v_1) | v_0 = \{v_A, v_B, v_C\}, v_1 = \{v_D, v_E\}\}$ is constructed using the neighbour blocks. As shown in FIG. 23, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighboring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 22:
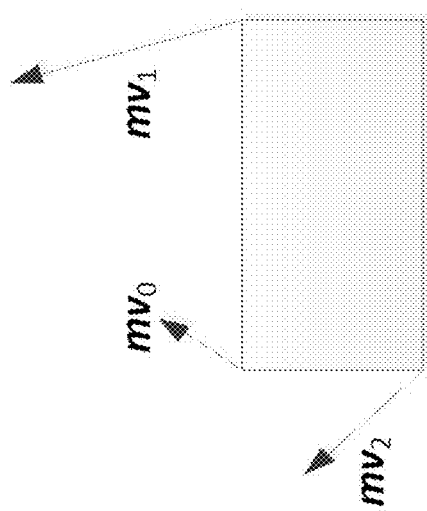
FIG. 22 shows examples of (a) 4-paramenter affine model (b) and 6-parameter affine model.
Figure 22:
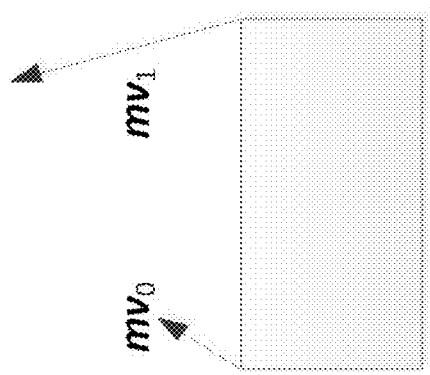

In AF_INTER mode, when 4/6 parameter affine mode is used, 2/3 control points are required, and therefore 2/3 MVD needs to be coded for these control points, as shown in FIG. 22. In JVET-K0337, it is proposed to derive the MV as follows, i.e., $mvd_1$ and $mvd_2$ are predicted from $mvd_0$.

$$mv_0 = \overline{mv}_0 + mvd_0 \qquad \text{Eq. (8)}$$

$$mv_1 = \overline{mv}_1 + mvd_1 + mvd_0 \qquad \text{Eq. (9)}$$

$$mv_2 = \overline{mv}_2 + mvd_2 + mvd_0 \qquad \text{Eq. (10)}$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 22. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.10.2. Fast Affine ME Algorithm in AF_INTER Mode

In affine mode, MV of 2 or 3 control points needs to be determined jointly. Directly searching the multiple MVs jointly is computationally complex. A fast affine ME algorithm is proposed and is adopted into VTM/BMS.

The fast affine ME algorithm is described for the 4-parameter affine model, and the idea can be extended to 6-parameter affine model.

$$\begin{cases} x' = ax + by + c \\ y' = -bx + ay + d \end{cases} \qquad \text{Eq. (11)}$$

$$\begin{cases} mv^h_{(x,y)} = x' - x = (a-1)x + by + c \\ mv^v_{(x,y)} = y' - y = -bx + (a-1)y + d \end{cases} \qquad \text{Eq. (12)}$$

Replace (a−1) with a', then the motion vector can be rewritten as:

$$\begin{cases} mv^h_{(x,y)} = x' - x = a'x + by + c \\ mv^v_{(x,y)} = y' - y = -bx + a'y + d \end{cases} \qquad \text{Eq. (13)}$$

Suppose motion vectors of the two controls points (0, 0) and (0, w) are known, from Equation (5) we can derive affine parameters, $$\begin{cases} c = mv^h_{(0,0)} \\ d = mv^v_{(0,0)} \end{cases} \qquad \text{Eq. (14)}$$

The motion vectors can be rewritten in vector form as:

$$MV(p) = A(P) * MV_C^T \qquad \text{Eq. (15)}$$

Wherein $$A(P) = \begin{bmatrix} 1 & x & 0 & y \\ 0 & y & 1 & -x \end{bmatrix} \qquad \text{Eq. (16)}$$

$$MV_C = [mv^h_{(0,0)} \, a \, mv^v_{(0,0)} b] \qquad \text{Eq. (17)}$$

P=(x, y) is the pixel position.

At encoder, MVD of AF_INTER are derived iteratively. Denote $MV^i(P)$ as the MV derived in the ith iteration for position P and denote $dMV_C^i$ as the delta updated for $MV_C$ in the ith iteration. Then in the (i+1)th iteration, $$\begin{aligned} MV^{i+1}(P) &= A(P) * \left((MV_C^i)^T + (dMV_C^i)^T\right) \\ &= A(P) * (MV_C^i)^T + A(P) * (dMV_C^i)^T \\ &= MV^i(P) + A(P) * (dMV_C^i)^T \end{aligned} \qquad \text{Eq. (18)}$$

Denote $Pic_{ref}$ as the reference picture and denote $Pic_{cur}$ as the current picture and denote $Q=P+MV^i(P)$. Suppose we use MSE as the matching criterion, then we need to minimize:

$$\min \sum_P (Pic_{cur}(P) - Pic_{ref}(P + MV^{i+1}(P)))^2 = \qquad \text{Eq. (19)}$$

$$\min \sum_P \left(Pic_{cur}(P) - Pic_{ref}\left(Q + A(P) * (dMV_C^i)^T\right)\right)^2$$

Suppose $(dMV_C^i)^T$ is small enough, we can rewrite $Pic_{ref}$ $(Q+A(P)*(dMV_C^i)^T)$ approximately as follows with 1 th order Taylor expansion.

$$Pic_{ref}(Q+A(P)*(dMV_C^i)^T) \approx Pic_{ref}(Q) + Pic'_{ref}(Q)*A(P)* (dMV_C^i)^T \qquad \text{Eq. (20)}$$

Wherein $$Pic'_{ref}(Q) = \left[\frac{dPic_{ref}(Q)}{dx} \frac{dPic_{ref}(Q)}{dy}\right].$$

Denote $E^{i+1}(P)=Pic_{cur}(P)-Pic_{ref}(Q)$, $$\min\sum_P \left(Pic_{cur}(P) - Pic_{ref}(Q) - Pic'_{ref}(Q)*A(P)*(dMV_c^i)^T\right)^2 = \quad \text{Eq. (21)}$$

$$\min\sum_P \left(E^{i+1}(P) - Pic'_{ref}(Q)*A(P)*(dMV_c^i)^T\right)^2$$

we can derive $dMV_c^i$ by setting the derivative of the error function to zero. Then can then calculate delta MV of the control points (0, 0) and (0, w) according to $A(P)*(dMV_c^i)^T$, $$dMV_{(0,0)}{}^h = dMV_c^i[0] \quad \text{Eq. (22)}$$

$$dMV_{(0,w)}{}^h = dMV_c^i[1]*w + dMV_c^i[2] \quad \text{Eq. (23)}$$

$$dMV_{(0,0)}{}^v = dMV_c^i[2] \quad \text{Eq. (1)}$$

$$dMV_{(0,w)}{}^v = -dMV_c^i[3]*w + dMV_c^i[2] \quad \text{Eq. (25)}$$

Suppose such MVD derivation process is iterated by n times, then the final MVD is calculated as follows, $$fdMV_{(0,0)}{}^h = \Sigma_{i=0}^{n-1} dMV_c^i[0] \quad \text{Eq. (2)}$$

$$fdMV_{(0,w)}{}^h = \Sigma_{i=0}^{n-1} dMV_c^i[1]*w + \Sigma_{i=0}^{n-1} dMV_c^i[0] \quad \text{Eq. (27)}$$

$$fdMV_{(0,0)}{}^v = \Sigma_{i=0}^{n-1} dMV_c^i[2] \quad \text{Eq. (3)}$$

$$fdMV_{(0,w)}{}^v = \Sigma_{i=0}^{n-1} -dMV_c^i[3]*w + \Sigma_{i=0}^{n-1} dMV_c^i[2] \quad \text{Eq. (29)}$$

With JVET-K0337, i.e., predicting delta MV of control point (0, w), denoted by $mvd_1$ from delta MV of control point (0, 0), denoted by $mvd_0$, now actually only $(\Sigma_{i=0}^{n-1} dMV_c^i[1]*w, -\Sigma_{i=0}^{n-1} dMV_c^i[3]*w)$ is encoded for $mvd_1$.

2.2.10.3. AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 24A, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

Figure 24B:
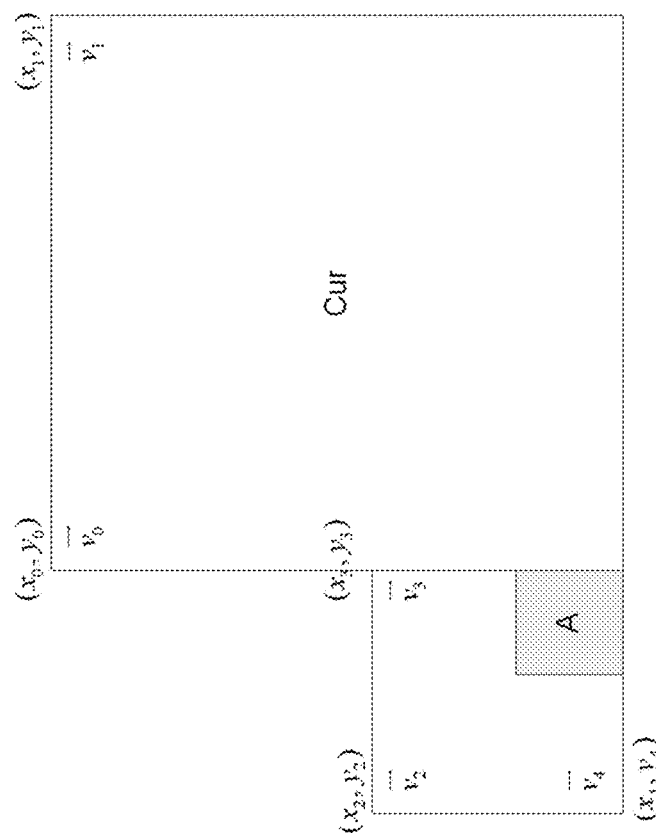
FIG. 24A-24B shows examples of candidates for AF_MERGE mode.
Figure 24A:
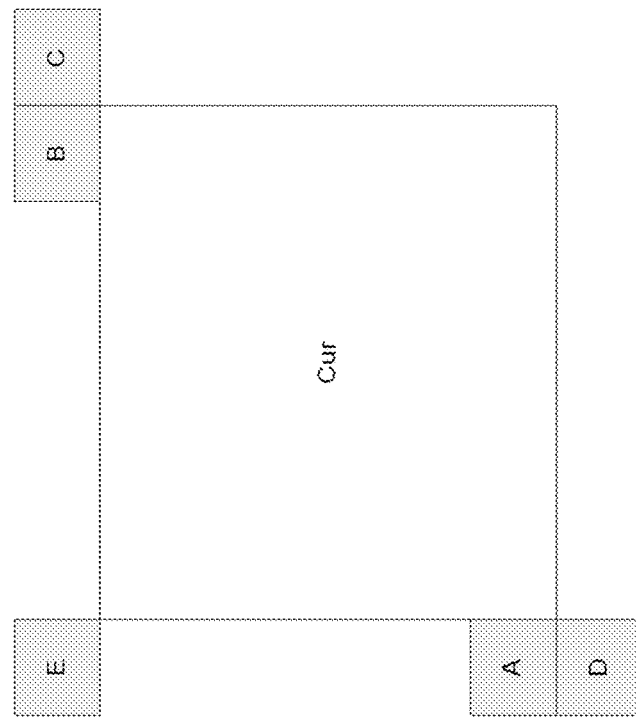

FIGS. 24A and 24B show examples of candidates for AF_MERGE

In JVET-L0366, which was planned to be adopted into VTM 3.0, an affine merge candidate list is constructed with following steps:

1) Insert Inherited Affine Candidates

Figure 25:
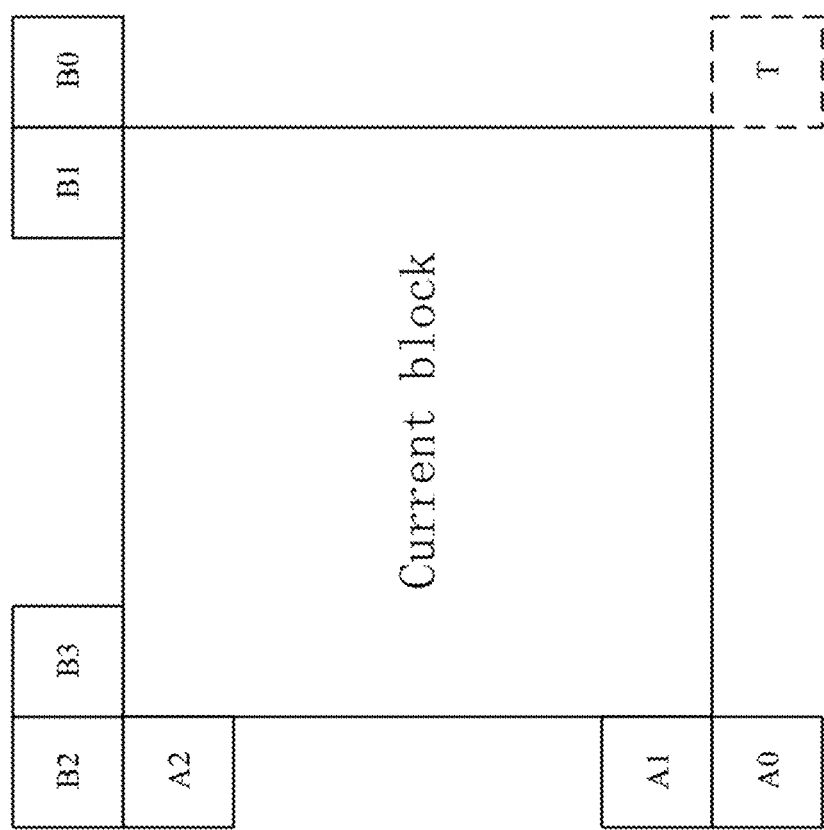
FIG. 25 shows candidate positions for affine merge mode.

Inherited affine candidate means that the candidate is derived from the affine motion model of its valid neighbor affine coded block. In the common base, as shown in FIG. 25, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 25. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

2.2.11. Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (30)}$$

Figure 26:
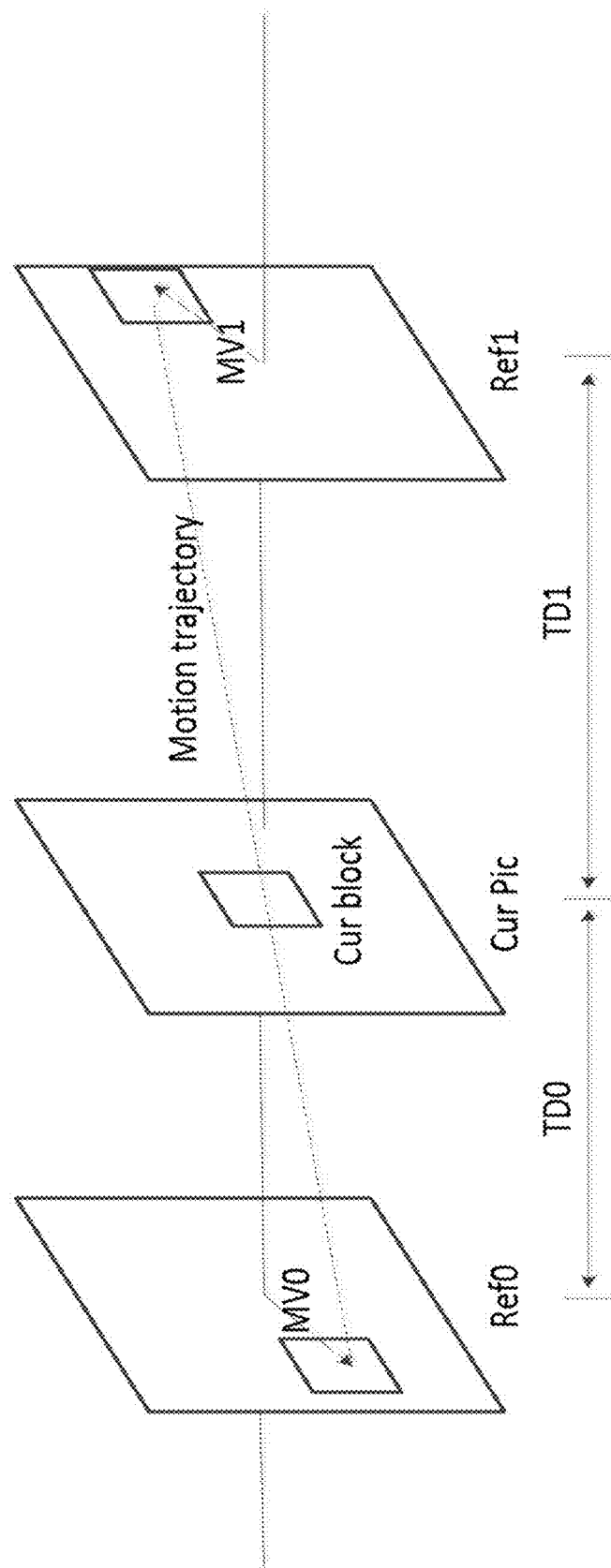
FIG. 26 shows example process for bilateral matching.

As shown in the FIG. 26, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 27:
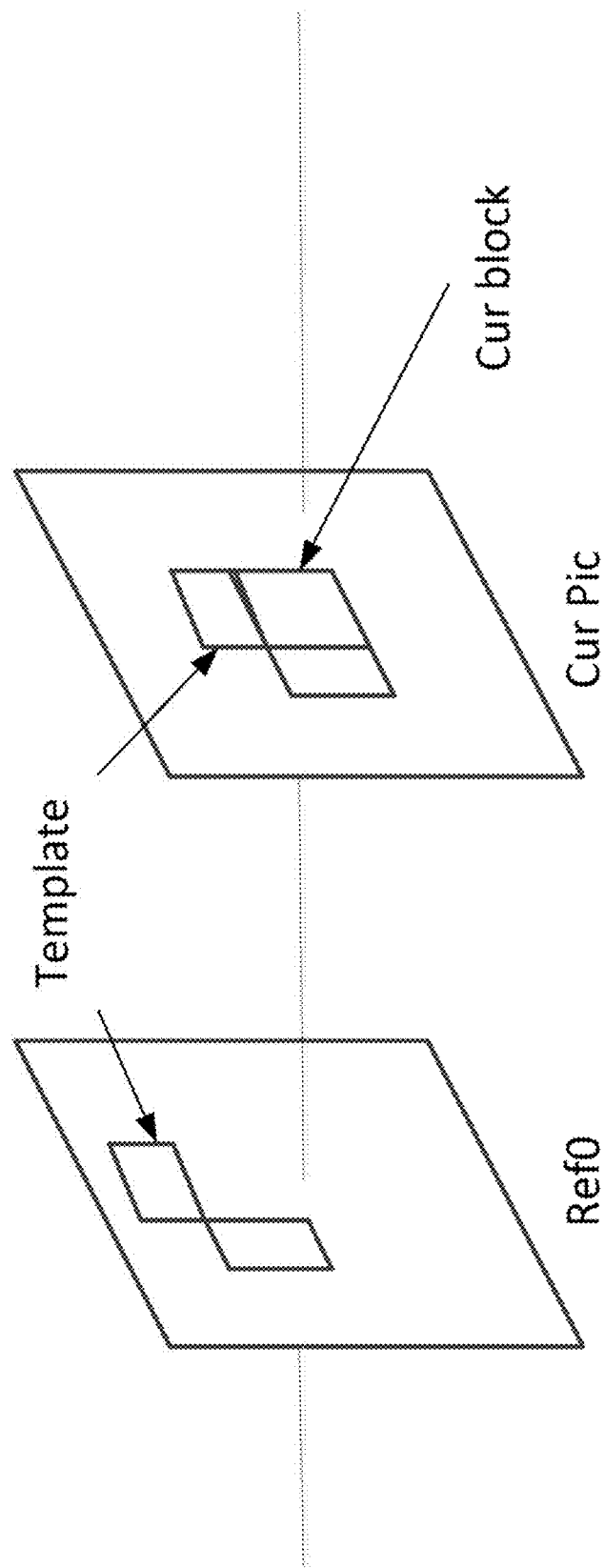
FIG. 27 shows example process of template matching.

As shown in FIG. 27, template matching is used to derive motion information of the current CU by finding the closest match between a template (top and/or left neighboring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.11.1. CU Level MV Candidate Set

The MV candidate set at CU level consists of:
(i) Original AMVP candidates if the current CU is in AMVP mode
(ii) all merge candidates,
(iii) several MVs in the interpolated MV field, which is introduced in section 2.2.11.3.
(iv) top and left neighboring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.11.2. Sub-CU Level MV Candidate Set

The MV candidate set at sub-CU level consists of:
(i) an MV determined from a CU-level search,
(ii) top, left, top-left and top-right neighboring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.11.3. Generation of Interpolated MV Field

Before coding a frame, interpolated motion field is generated for the whole picture based on unilateral ME. Then the motion field may be used later as CU level or sub-CU level MV candidates.

Figure 28:
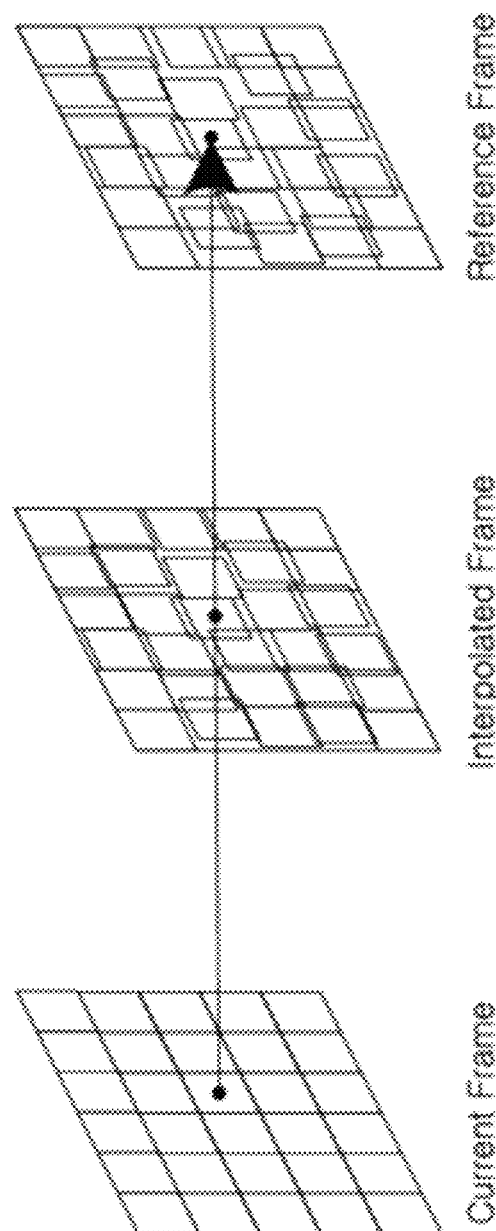
FIG. 28 illustrates an implementation of unilateral motion estimation (ME) in frame rate upconversion (FRUC).

First, the motion field of each reference pictures in both reference lists is traversed at 4×4 block level. For each 4×4 block, if the motion associated to the block passing through a 4×4 block in the current picture (as shown in FIG. 28) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.11.4. Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (31)}$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.11.5. MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.11.6. Selection of Prediction Direction in Template Matching FRUC Merge Mode In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi <=factor*min (cost0, cost1)
        bi-prediction is used;
        Otherwise, if cost0<=cost1
            uni-prediction from list0 is used;
        Otherwise,
            uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.12. Generalized Bi-Prediction

In conventional bi-prediction, the predictors from L0 and L1 are averaged to generate the final predictor using the equal weight 0.5. The predictor generation formula is shown as in Eq. (32)

$$P_{TraditionalBiPred} = (P_{L0} + P_{L1} + \text{RoundingOffset}) >> \text{shiftNum} \quad \text{Eq. (32)}$$

In Eq. (32), $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Eq. (32).

$$P_{GBi} = ((1-w_1) * P_{L0} + w_1 * P_{L1} + \text{RoundingOffset}_{GBi}) >> \text{shiftNum}_{GBi}, \quad \text{Eq. (33)}$$

In Eq. (33), $P_{GBi}$ is the final predictor of GBi. $(1-w_1)$ and $w_1$ are the selected GBI weights applied to the predictors of L0 and L1, respectively. RoundingOffset$_{GBi}$ and shiftNum$_{GBi}$ are used to normalize the final predictor in GBi.

The supported weights of $w_1$ is $\{-\frac{1}{4}, \frac{3}{8}, \frac{1}{2}, \frac{5}{8}, \frac{5}{4}\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.2.13. Multi-Hypothesis Inter Prediction

In the multi-hypothesis inter prediction mode, one or more additional prediction signals are signaled, in addition to the conventional uni/bi prediction signal. The resulting overall prediction signal is obtained by sample-wise weighted superposition. With the uni/bi prediction signal $p_{uni/bi}$ and the first additional inter prediction signal/hypothesis $h_3$, the resulting prediction signal $p_3$ is obtained as follows:

$$p_3 = (1-\alpha) p_{uni/bi} + \alpha h_3 \quad \text{Eq. (34)}$$

The changes to the prediction unit syntax structure are shown as bold text in the table below:

TABLE 2

| prediction_unit( x0, y0, nPbW, nPbH ) { | Descriptor |
|---|---|
| ... | |
|   if( ! cu_skip_flag[ x0 ][ y0 ]) { | |
|     i = 0 | |
|     readMore = 1 | |
|     while( i < MaxNumAdditionalHypotheses && readMore ) { | |
|       additional_hypothesis_flag[ x0 ][ y0 ][ i ] | ae(v) |
|       if( additional_hypothesis_flag[ x0 ][ y0 ][ i ] ) { | |
|         ref_idx_add_hyp[ x0 ][ y0 ][ i ] | ae(v) |
|         mvd_coding( x0, y0, 2+i ) | |

TABLE 2-continued

```
        mvp_add_hyp_flag[ x0 ][ y0 ][ i ]        ae(v)
        add_hyp_weight_idx[ x0 ][ y0 ][ i ]      ae(v)
      }
      readMore = additional_hypothesis_flag[ x0 ][ y0 ][ i ]
      i++
    }
  }
}
```

The weighting factor α is specified by the syntax element add_hyp_weight_idx, according to the following mapping:

TABLE 3

| add_hyp_weight_idx | α |
|---|---|
| 0 | ¼ |
| 1 | −⅛ |

Note that for the additional prediction signals, the concept of prediction list0/list1 is abolished, and instead one combined list is used. This combined list is generated by alternatingly inserting reference frames from list0 and list1 with increasing reference index, omitting reference frames which have already been inserted, such that double entries are avoided.

Analogously to above, more than one additional prediction signals can be used. The resulting overall prediction signal is accumulated iteratively with each additional prediction signal.

$$p_{n+1} = (1-\alpha_{n+1})p_n + \alpha_{n+1}h_{n+1} \qquad \text{Eq. (35)}$$

The resulting overall prediction signal is obtained as the last $p_n$ (i.e., the $p_n$ having the largest index n).

Note that also for inter prediction blocks using MERGE mode (but not SKIP mode), additional inter prediction signals can be specified. Further note, that in case of MERGE, not only the uni/bi prediction parameters, but also the additional prediction parameters of the selected merging candidate can be used for the current block.

2.2.14. Multi-Hypothesis Prediction for Uni-Prediction of AMVP Mode

When the multi-hypothesis prediction is applied to improve uni-prediction of AMVP mode, one flag is signaled to enable or disable multi-hypothesis prediction for inter_dir equal to 1 or 2, where 1, 2, and 3 represent list 0, list 1, and bi-prediction, respectively. Moreover, one more merge index is signaled when the flag is true. In this way, multi-hypothesis prediction turns uni-prediction into bi-prediction, where one motion is acquired using the original syntax elements in AMVP mode while the other is acquired using the merge scheme. The final prediction uses 1:1 weights to combine these two predictions as in bi-prediction. The merge candidate list is first derived from merge mode with sub-CU candidates (e.g., affine, alternative temporal motion vector prediction (ATMVP)) excluded. Next, it is separated into two individual lists, one for list 0 (L0) containing all L0 motions from the candidates, and the other for list 1 (L1) containing all L1 motions. After removing redundancy and filling vacancy, two merge lists are generated for L0 and L1 respectively. There are two constraints when applying multi-hypothesis prediction for improving AMVP mode. First, it is enabled for those CUs with the luma coding block (CB) area larger than or equal to 64. Second, it is only applied to L1 when in low delay B pictures.

2.2.15. Multi-Hypothesis Prediction for Skip/Merge Mode

When the multi-hypothesis prediction is applied to skip or merge mode, whether to enable multi-hypothesis prediction is explicitly signaled. An extra merge indexed prediction is selected in addition to the original one. Therefore, each candidate of multi-hypothesis prediction implies a pair of merge candidates, containing one for the $1^{st}$ merge indexed prediction and the other for the $2^{nd}$ merge indexed prediction. However, in each pair, the merge candidate for the $2^{nd}$ merge indexed prediction is implicitly derived as the succeeding merge candidate (i.e., the already signaled merge index plus one) without signaling any additional merge index. After removing redundancy by excluding those pairs, containing similar merge candidates and filling vacancy, the candidate list for multi-hypothesis prediction is formed. Then, motions from a pair of two merge candidates are acquired to generate the final prediction, where 5:3 weights are applied to the $1^{st}$ and $2^{nd}$ merge indexed predictions, respectively. Moreover, a merge or skip CU with multi-hypothesis prediction enabled can save the motion information of the additional hypotheses for reference of the following neighboring CUs in addition to the motion information of the existing hypotheses. Note that sub-CU candidates (e.g., affine, ATMVP) are excluded from the candidate list, and for low delay B pictures, multi-hypothesis prediction is not applied to skip mode. Moreover, when multi-hypothesis prediction is applied to merge or skip mode, for those CUs with CU width or CU height less than 16, or those CUs with both CU width and CU height equal to 16, bi-linear interpolation filter is used in motion compensation for multiple hypotheses. Therefore, the worst-case bandwidth (required access samples per sample) for each merge or skip CU with multi-hypothesis prediction enabled is calculated in Table 1 and each number is less than half of the worst-case bandwidth for each 4×4 CU with multi-hypothesis prediction disabled.

2.2.16. Ultimate Motion Vector Expression

Ultimate motion vector expression (UMVE) is presented. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction.

Figure 29:
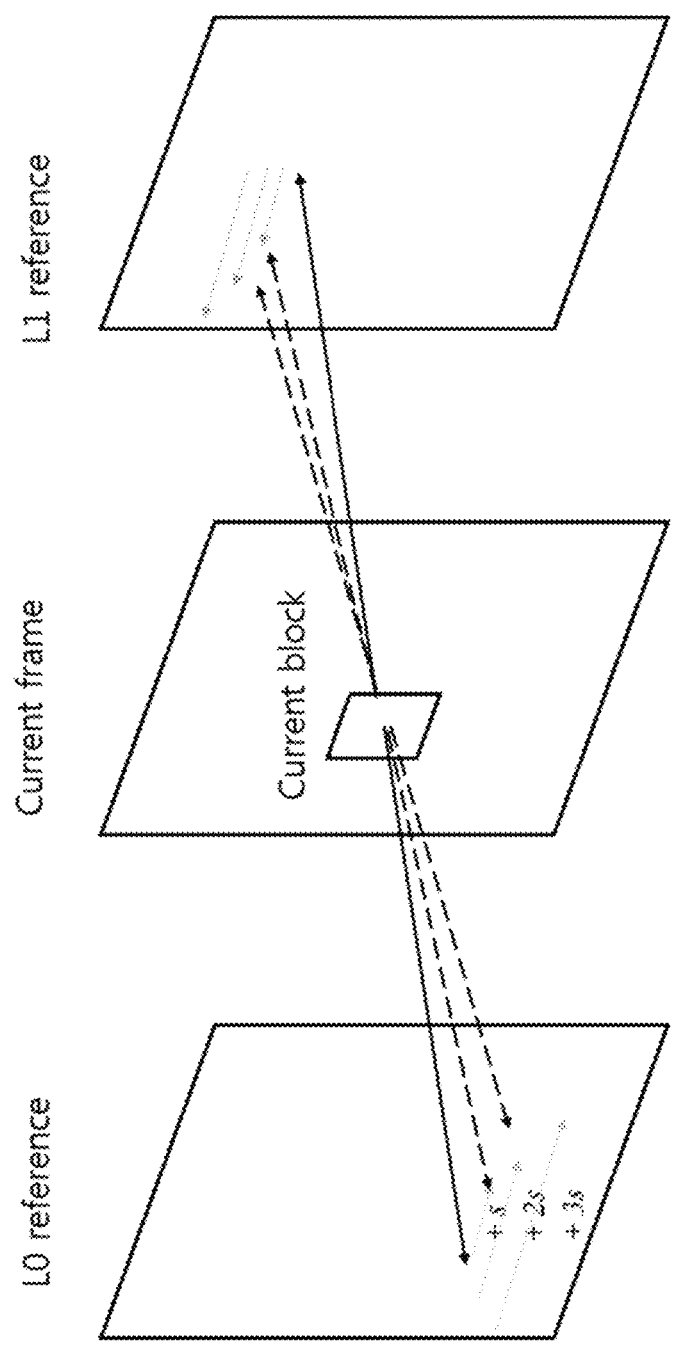
FIG. 29 illustrates an embodiment of an Ultimate Motion Vector Expression (UMVE) search process.

FIG. 29 shows an example of UMVE Search Process

Figure 30:
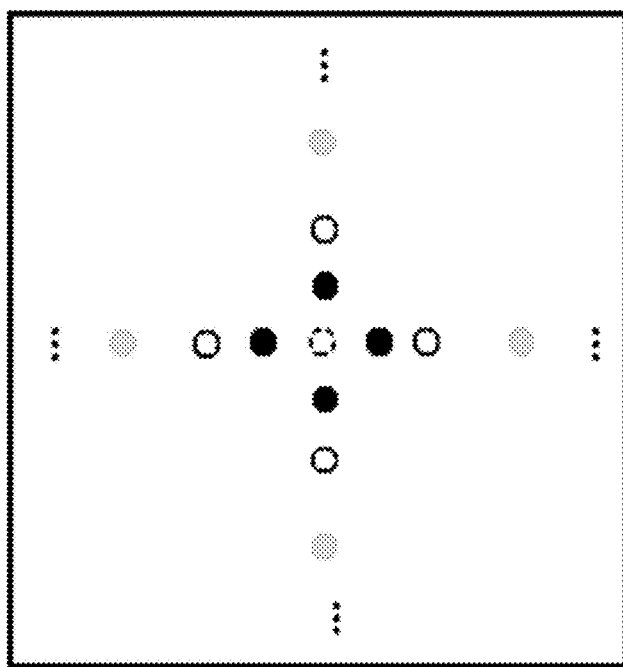
FIG. 30 shows examples of UMVE search points.
Figure 30:
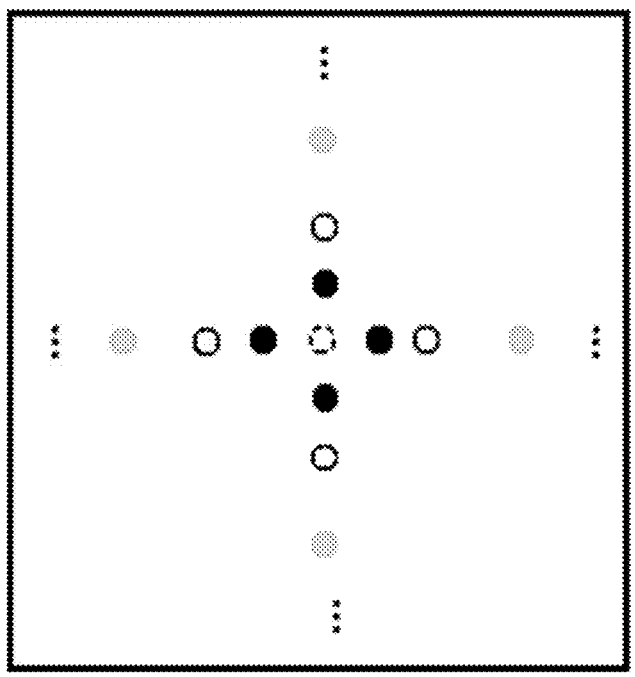

FIG. 30 shows examples of UMVE Search Points.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 4

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 5

| | Distance IDX | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 6

| | Direction IDX | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.2.17. Affine Merge Mode with Prediction Offsets

UMVE is extended to affine merge mode, which will be referred to as UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

A distance offset table with size of 5 is used as shown in the table below. Distance index is signaled to indicate which distance offset to use. The mapping of distance index and distance offset values is shown in FIG. 30.

TABLE 7

| | Distance offset table | | | | |
|---|---|---|---|---|---|
| Distance IDX | 0 | 1 | 2 | 3 | 4 |
| Distance-offset | ½-pel | 1-pel | 2-pel | 4-pel | 8-pel |

Figure 31:
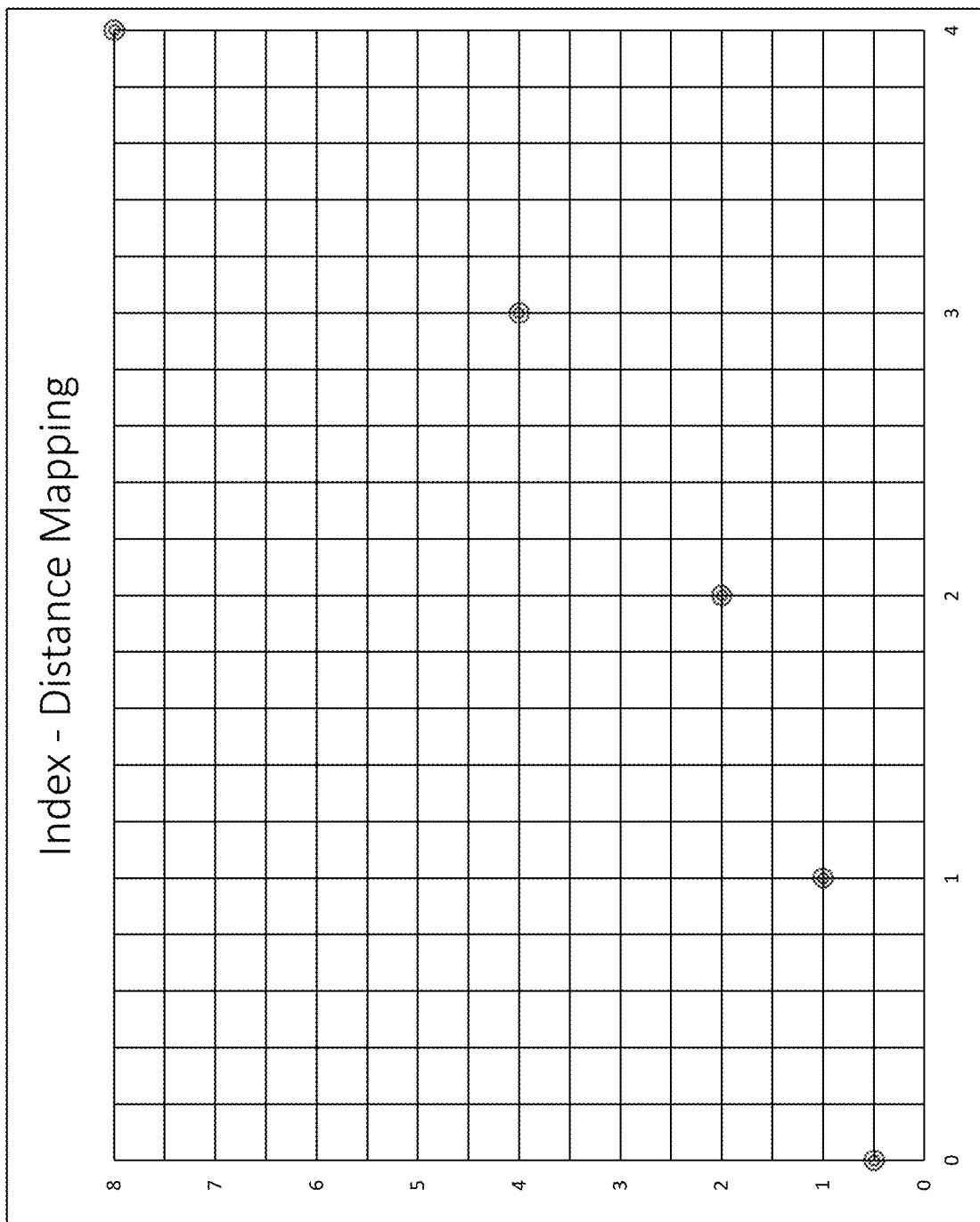
FIG. 31 shows an example of distance index and distance offset mapping.

FIG. 31 shows an example of distance index and distance offset mapping.

The direction index can represent four directions as shown below, where only x or y direction may have an MV difference, but not in both directions.

TABLE 8

| | Offset direction table | | | |
|---|---|---|---|---|
| Offset Direction IDX | 00 | 01 | 10 | 11 |
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP ($v_{px}$, $v_{py}$). When distance offset and direction index are signaled, the motion vectors of current block's corresponding control points will be calculated as below.

$$MV(v_x, v_y) = MV(v_{px}, v_{py}) + MV(x\text{-dir-factor}*\text{distance-offset}, y\text{-dir-factor}*\text{distance-offset}) \qquad \text{Eq. (36)}$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is $MVP_{L0}$ ($v_{0px}$, $v_{0py}$), and the motion vector of that control point on L1 is $MVP_{L1}$ ($v_{1px}$, $v_{1py}$). When distance offset and direction index are signaled, the motion vectors of current block's corresponding control points will be calculated as below.

$$MV_{L0}(v_{0x}, v_{0y}) = MVP_{L0}(v_{0px}, v_{0py}) + MV(x\text{-dir-factor}*\text{distance-offset}, y\text{-dir-factor}*\text{distance-offset}) \qquad \text{Eq. (37)}$$

$$MV_{L0}(v_{0x}, v_{0y}) = MVP_{L0}(v_{0px}, v_{0py}) + MV(x\text{-dir-factor}*\text{distance-offset}, y\text{-dir-factor}*\text{distance-offset}) \qquad \text{Eq. (38)}$$

2.2.18. Bi-Directional Optical Flow

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field ($v_x$, $v_y$) is given by an equation $$\partial I^{(k)}/\partial t + v_x \partial I^{(k)}/\partial x + v_y \partial I^{(k)}/\partial y = 0. \qquad \text{Eq. (4)}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \frac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (5)}$$

Here, $\tau_0$ and $\tau_1$ denote the distances to the reference frames as shown in FIG. 31. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1 \neq 0$) and the block motion vectors are proportional to the time distance (MVx$_0$/MVx$_1$=MVy$_0$/MVy$_1$=−$\tau_0/\tau_1$).

Figure 32:
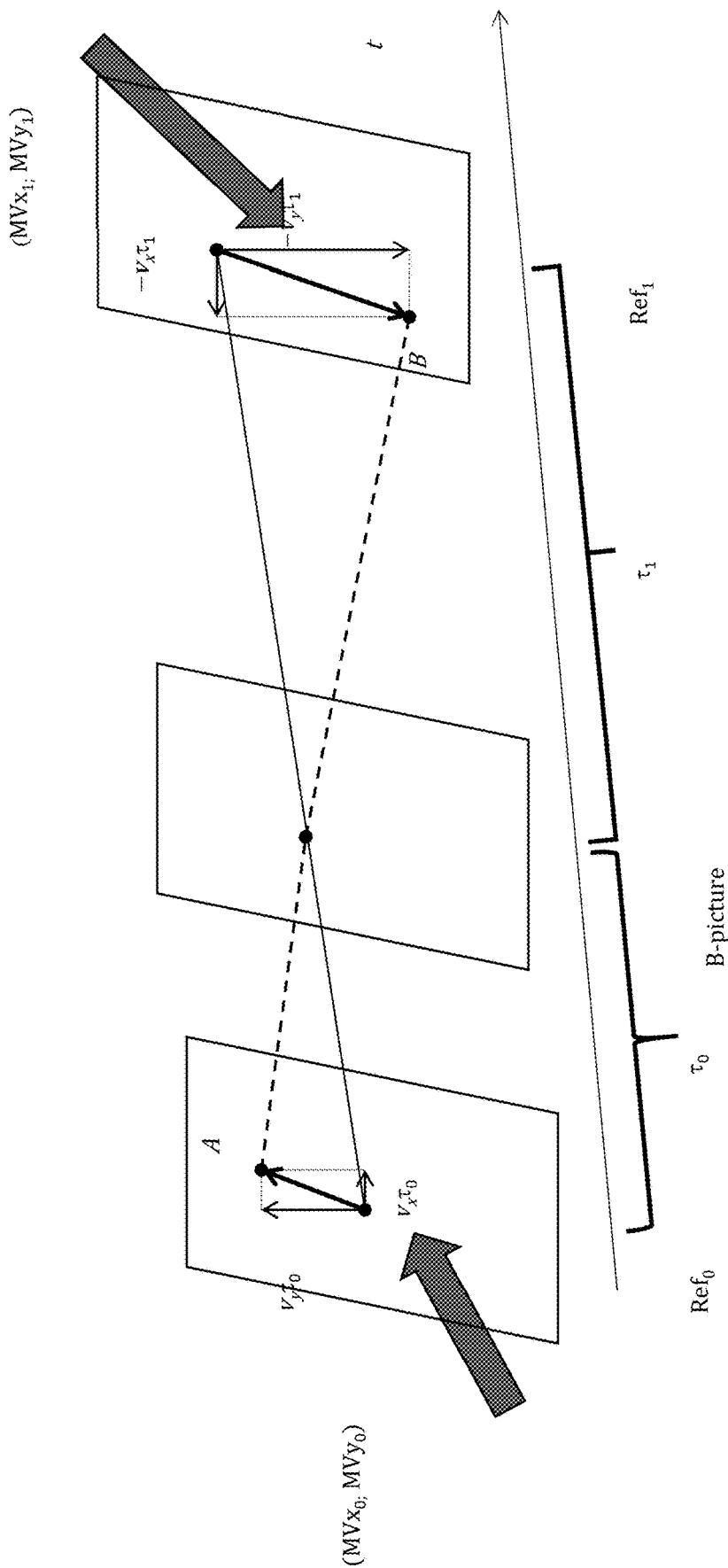
FIG. 32 shows an example of an optical flow trajectory.

The motion vector field ($v_x$, $v_y$) is determined by minimizing the difference Δ between values in points A and B (intersection of motion trajectory and reference frame planes on FIG. 32). Model uses only first linear term of a local Taylor expansion for Δ:

$$\Delta = (I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad \text{Eq. (41)}$$

All values in Eq. (41) depend on the sample location (i',j'), which was omitted from the notation so far. Assuming the motion is consistent in the local surrounding area, we minimize Δ inside the (2M+1)×(2M+1) square window f centered on the currently predicted point (i,j), where M is equal to 2:

$$(v_x, v_y) = \arg\min_{v_x, v_y} \sum_{[i',j'] \in \Omega} \Delta^2[i', j'] \quad \text{Eq. (42)}$$

For this optimization problem, the JEM uses a simplified approach making first a minimization in the vertical direction and then in the horizontal direction. This results in $$v_x = (s_1 + r) > m ? \text{clip3}\left(-\text{thBIO}, \text{thBIO}, -\frac{s_3}{(s_1+r)}\right) : 0 \quad \text{Eq. (43)}$$

$$v_y = (s_5 + r) > m ? \text{clip3}\left(-\text{thBIO}, \text{thBIO}, -\frac{s_6 - v_x s_2/2}{(s_5+r)}\right) : 0 \quad \text{Eq. (44)}$$

where, $$s_1 = \sum_{[i',j'] \in \Omega} (\tau_1 \partial I^{(1)}/\partial x + \tau_0 \partial I^{(0)}/\partial x)^2; \quad \text{Eq. (6)}$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Eq. (43) and Eq. (44).

$$r = 500 \cdot 4^{d-8} \quad \text{Eq. (46)}$$

$$m = 700 \cdot 4^{d-8} \quad \text{Eq. (47)}$$

Here d is bit depth of the video samples.

Figure 33B:
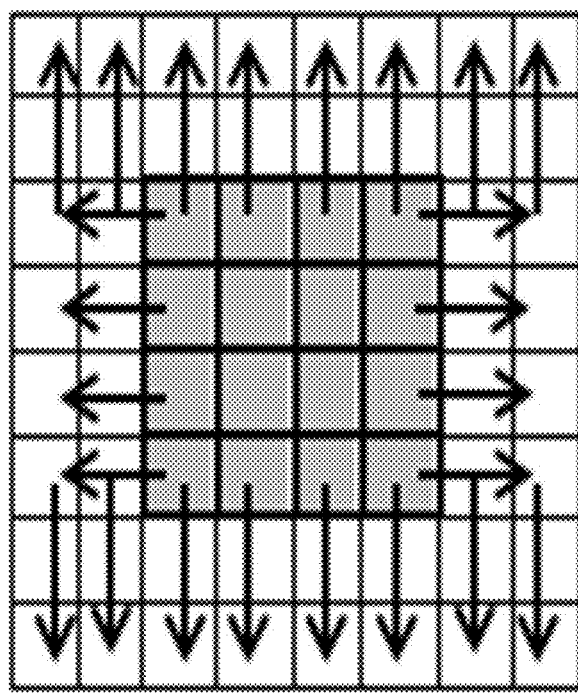
FIG. 33A-33B show examples of Bi-directional Optical flow (BIO) w/o block extension: a) access positions outside of the block; b) padding used in order to avoid extra memory access and calculation.
Figure 33A:
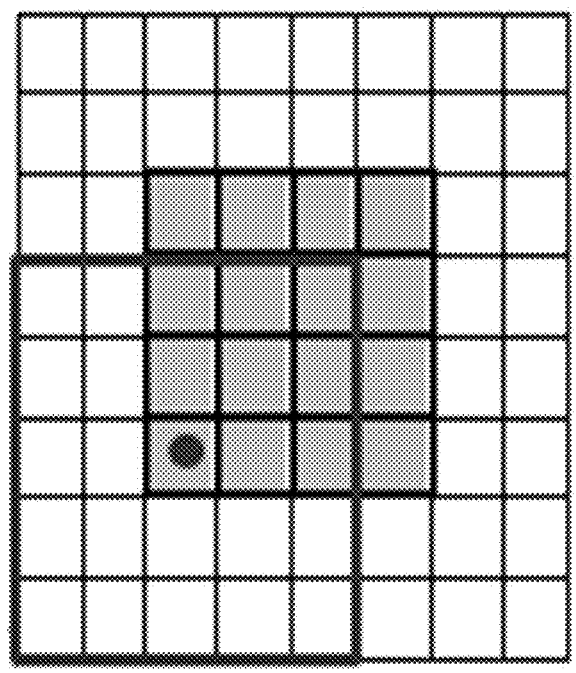

In order to keep the memory access for BIO the same as for regular bi-predictive motion compensation, all prediction and gradients values, $I^{(k)}, \partial I^{(k)}/\partial x, \partial I^{(k)}/\partial y$, are calculated only for positions inside the current block. In Equation 30, (2M+1)×(2M+1) square window f centered in currently predicted point on a boundary of predicted block needs to accesses positions outside of the block (as shown in FIG. 33A). In the JEM, values of $I^{(k)}, \partial I^{(k)}/\partial x, \partial I^{(k)}/\partial y$ outside of the block are set to be equal to the nearest available value inside the block. For example, this can be implemented as padding, as shown in FIG. 33B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 30 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j'] \in \Omega(x,y)} (\tau_1 \partial I^{(1)}/\partial x + \tau_0 \partial I^{(0)}/\partial x)^2; \quad \text{Eq. (48)}$$

$$s_{3,b_k} = \sum_{(x,y) \in b_k} \sum_{[i',j'] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j'] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j'] \in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Eq. (43) and Eq. (44) are replaced by (($s_{n,bk}$)>>4) to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18-d. In case of vertical gradient ∂I/∂y first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 9:9 shows the filters used for gradients calculation for different fractional positions of block motion vector in BIO. Table 10: 10 shows the interpolation filters used for prediction signal generation in BIO.

TABLE 9

Filters for gradients calculation in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 10

Interpolation filters for prediction signal generation in BIO

| Fractional pel position | Interpolation filter for prediction signal(BIOfilterS) |
|---|---|
| 0 | { 0, 0, 64, 0, 0, 0} |
| +1/16 | { 1, −3, 64, 4, −2, 0} |
| 1/8 | { 1, −6, 62, 9, −3, 1} |
| +3/16 | { 2, −8, 60, 14, −5, 1} |
| 1/4 | { 2, −9, 57, 19, −7, 2} |
| +5/16 | { 3, −10, 53, 24, −8, 2} |
| 3/8 | { 3, −11, 50, 29, −9, 2} |
| +7/16 | { 3, −11, 44, 35, −10, 3} |
| 1/2 | { 3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.19. Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 34:
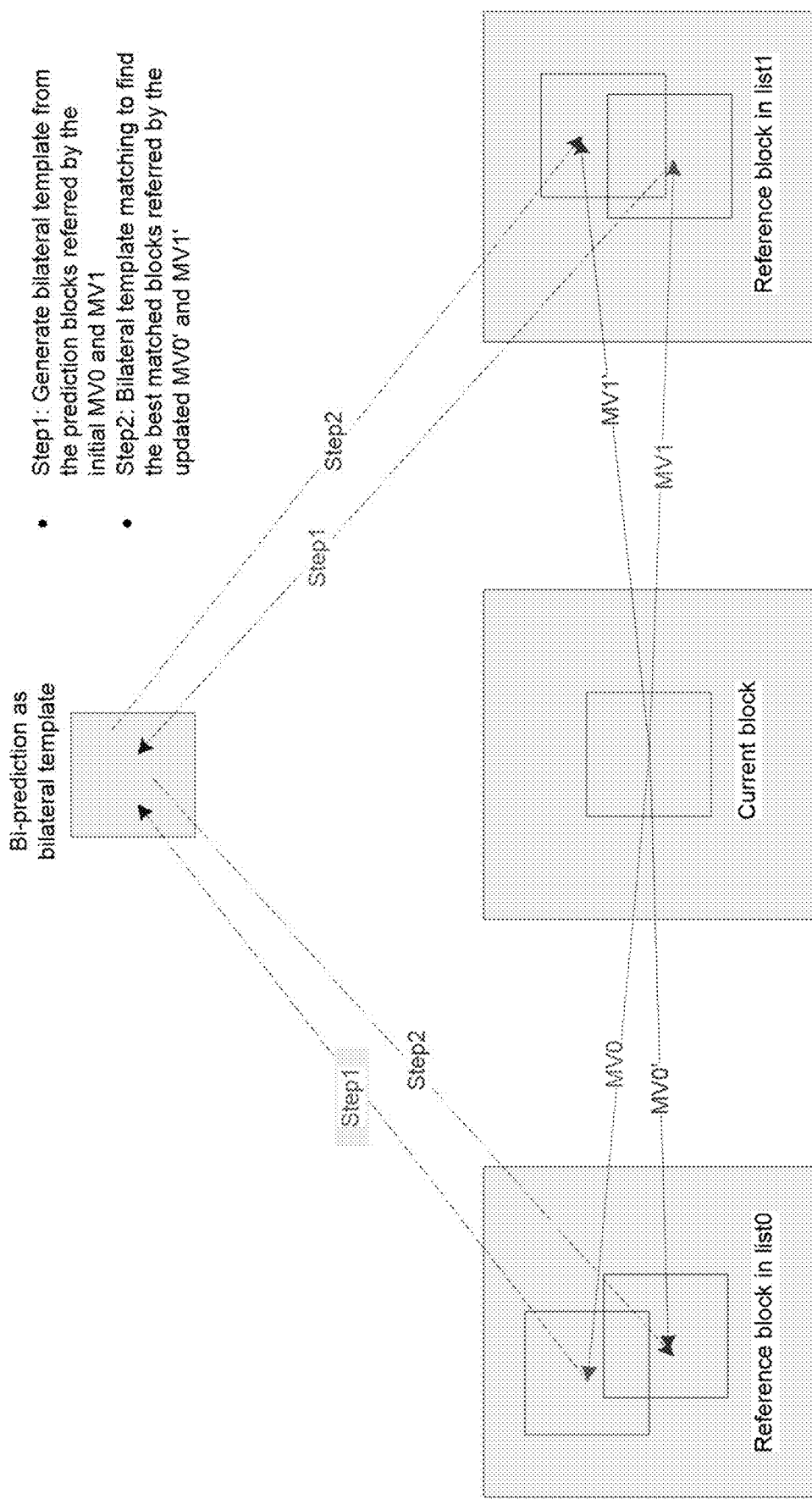
FIG. 34 illustrates an example of using Decoder-side motion vector refinement (DMVR) based on bilateral template matching.

In DMVR, a bilateral template is generated as the weighted combination (i.e. average) of the two prediction blocks, from the initial MV0 of list0 and MV1 of list1, respectively, as shown in FIG. 34. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1', as shown in FIG. 33, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Related Tools 3.1.1. Diffusion Filter

In JVET-L0157, diffusion filter is proposed, wherein the intra/inter prediction signal of the CU may be further modified by diffusion filters.

3.1.1.1. Uniform Diffusion Filter

The Uniform Diffusion Filter is realized by convolving the prediction signal with a fixed mask that is either given as $h^I$ or as $h^{IV}$, defined below. Besides the prediction signal itself, one line of reconstructed samples left and above of the block are used as an input for the filtered signal, where the use of these reconstructed samples can be avoided on inter blocks.

Let pred be the prediction signal on a given block obtained by intra or motion compensated prediction. In order to handle boundary points for the filters, the prediction signal needs to be extended to a prediction signal $pred_{ext}$. This extended prediction can be formed in two ways: Either, as an intermediate step, one line of reconstructed samples left and above the block are added to the prediction signal and then the resulting signal is mirrored in all directions. Or only the prediction signal itself is mirrored in all directions. The latter extension is used for inter blocks. In this case, only the prediction signal itself comprises the input for the extended prediction signal $pred_{ext}$.

If the filter $h^I$ is to be used, it is proposed to replace the prediction signal pred by $$h^I * \text{pred},$$

using the aforementioned boundary extension. Here, the filter mask $h^I$ is given as:

$$h' = (0.25)^4 \begin{pmatrix} 0 & 0 & 0 & 0 & 1 & 0 & 0 & 0 & 0 \\ 0 & 0 & 0 & 4 & 0 & 4 & 0 & 0 & 0 \\ 0 & 0 & 6 & 0 & 16 & 0 & 6 & 0 & 0 \\ 0 & 4 & 0 & 24 & 0 & 24 & 0 & 4 & 0 \\ 1 & 0 & 16 & 0 & 36 & 0 & 16 & 0 & 1 \\ 0 & 4 & 0 & 24 & 0 & 24 & 0 & 4 & 0 \\ 0 & 0 & 6 & 0 & 16 & 0 & 6 & 0 & 0 \\ 0 & 0 & 0 & 4 & 0 & 4 & 0 & 0 & 0 \\ 0 & 0 & 0 & 0 & 1 & 0 & 0 & 0 & 0 \end{pmatrix} \quad \text{Eq. (49)}$$

If the filter $h^{IV}$ is to be used, it is proposed to replace the prediction signal pred by $$h^{IV}*\text{pred}. \quad \text{Eq. (50)}$$

Here, the filter $h^{IV}$ is given as:

$$h^{IV} = h^I * h^I * h^I * h^I. \quad \text{Eq. (51)}$$

3.1.1.2. Directional Diffusion Filter

Instead of using signal adaptive diffusion filters, directional filters, a horizontal filter $h^{hor}$ and a vertical filter $h^{ver}$, are used which still have a fixed mask. More precisely, the uniform diffusion filtering corresponding to the mask $h^I$ of the previous section is simply restricted to be either applied only along the vertical or along the horizontal direction. The vertical filter is realized by applying the fixed filter mask $$h_{ver} = (0.5)^4 \begin{pmatrix} 1 \\ 0 \\ 4 \\ 0 \\ 6 \\ 0 \\ 4 \\ 0 \\ 1 \end{pmatrix} \quad \text{Eq. (52)}$$

to the prediction signal and the horizontal filter is realized by using the transposed mask $$h_{hor} = h_{ver}^t \quad \text{Eq. (53)}$$

3.1.2. Bilateral Filter

Bilateral filter is proposed in JVET-L0406, and it is always applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

Figure 35:
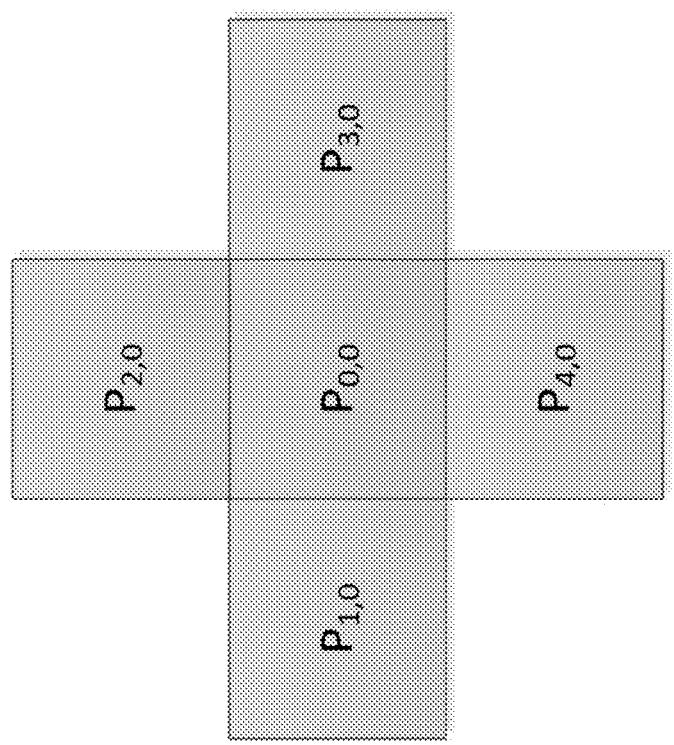
FIG. 35 shows an example of neighboring samples used in a bilateral filter.

The filtering process is defined as:

$$P'_{0,0} = P_{0,0} + \Sigma_{K=1}^{K} W_k(\text{abs}(P_{k,0}-P_{0,0}))\times(P_{k,0}-P_{0,0}), \quad \text{Eq. (54)}$$

where $P_{0,0}$ is the intensity of the current sample and $P'_{0,0}$ is the modified intensity of the current sample, $P_{k,0}$ and $W_k$ are the intensity and weighting parameter for the k-th neighboring sample, respectively. An example of one current sample and its four neighboring samples (i.e., K=4) is depicted in FIG. 35.

More specifically, the weight $W_k(x)$ associated with the k-th neighboring sample is defined as follows:

$$W_k(x) = \text{Distance}_k \times \text{Range}_k(x) \quad \text{Eq. (55)}$$

wherein $$\text{Distance}_k = e\left(-\frac{10000}{2\sigma_d^2}\right) \Big/ 1 + 4*e\left(-\frac{10000}{2\sigma_d^2}\right), \quad \text{Eq. (56)}$$

$$\text{Range}_k(x) = e\left(-\frac{x^2}{8*(QP-17)*(QP-17)}\right)$$

and $\sigma_d$ is dependent on the coded mode and coding block sizes. The described filtering process is applied to intra-coded blocks, and inter-coded blocks when TU is further split, to enable parallel processing.

To better capture statistical properties of video signal, and improve performance of the filter, weights function resulted from Eq. (55) are being adjusted by the $\sigma_d$ parameter, tabulated in Table as being dependent on coding mode and parameters of block partitioning (minimal size).

TABLE 11

Value of $\sigma_d$ for different block sizes and coding modes

| Min(block width, block height) | Intra mode | Inter mode |
|---|---|---|
| 4 | 82 | 62 |
| 8 | 72 | 52 |
| Other | 52 | 32 |

Figure 36:
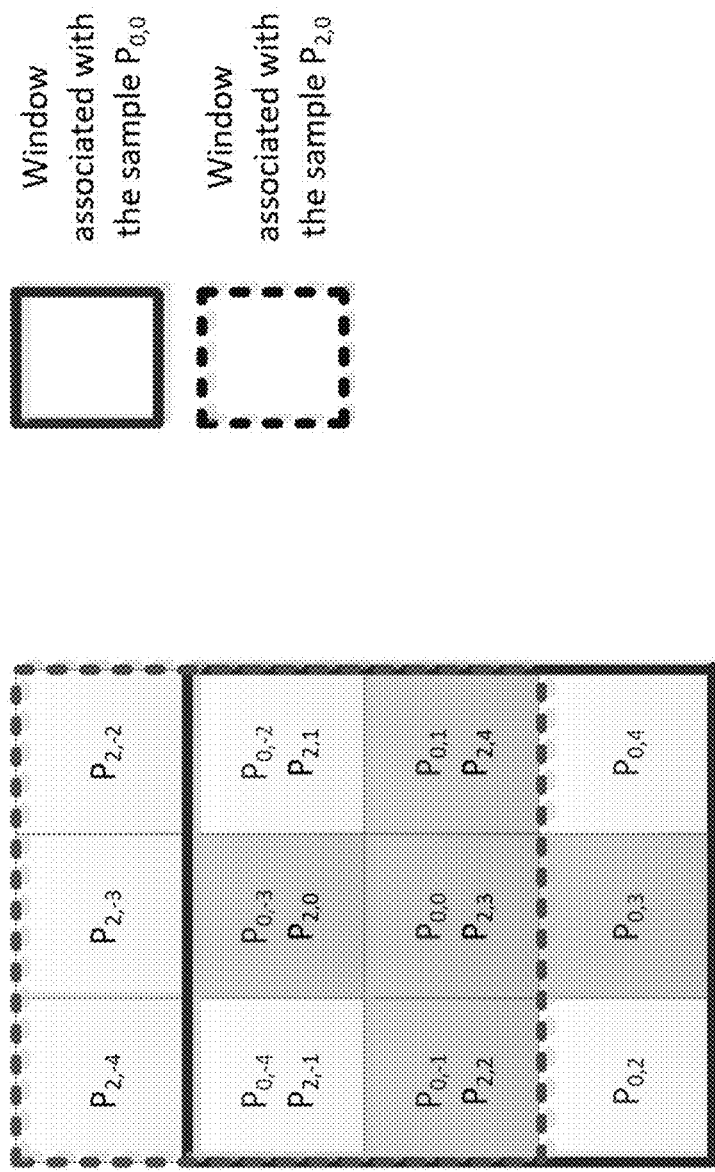
FIG. 36 shows an example of windows covering two samples used in weight calculation.

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P'_{0,0} = P_{0,0} + \sum_{k=1}^{N} W_k\left(\frac{1}{M}\sum_{m=-M/2}^{M/2} \text{abs}(P_{k,m} - P_{0,m})\right) \times (P_{k,0} - P_{0,0}) \quad \text{Eq. (57)}$$

wherein $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 36.

3.1.3. Intra Block Copy

Decoder Aspect:

In some aspects, the current (partially) decoded picture is considered as a reference picture. This current picture is put in the last position of reference picture list 0. Therefore, for a slice using the current picture as the only reference picture, its slice type is considered as a P slice. The bitstream syntax in this approach follows the same syntax structure for inter coding while the decoding process is unified with inter coding. The only outstanding difference is that the block vector (which is the motion vector pointing to the current picture) always uses integer-pel resolution.

Changes from block level CPR_flag approach are:

In encoder search for this mode, both block width and height are smaller than or equal to 16.

Enable chroma interpolation when luma block vector is an odd integer number.

Enable adaptive motion vector resolution (AMVR) for CPR mode when the SPS flag is on. In this case, when AMVR is used, a block vector can switch between 1-pel integer and 4-pel integer resolutions at block level.

Encoder Aspect:

The encoder performs RD check for blocks with either width or height no larger than 16. For non-merge mode, the block vector search is performed using hash-based search first. If there is no valid candidate found from hash search, block matching based local search will be performed.

In the hash-based search, hash key matching (32-bit CRC) between the current block and a reference block is extended to all allowed block sizes. The hash key calculation for every position in current picture is based on 4×4 blocks. For the current block of a larger size, a hash key matching to a reference block happens when all its 4×4 blocks match the hash keys in the corresponding reference locations. If multiple reference blocks are found to match the current block with the same hash key, the block vector costs of each candidates are calculated and the one with minimum cost is selected.

In block matching search, the search range is set to be 64 pixels to the left and on top of current block.

3.1.4. History Based Motion Vector Prediction

Figure 37:
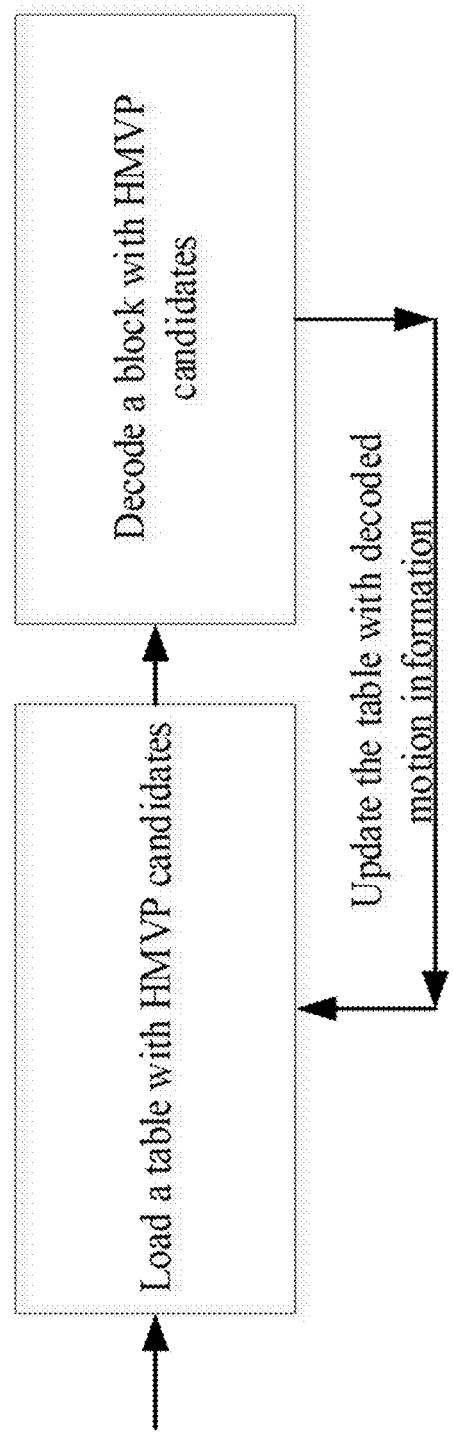
FIG. 37 shows an example of a decoding flow with the proposed history based motion vector prediction (HMVP) method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 37. In one example, the table size is set to be L (e.g., L=16 or 6, or 44), which indicates up to L HMVP candidates may be added to the table.

Figure 38:
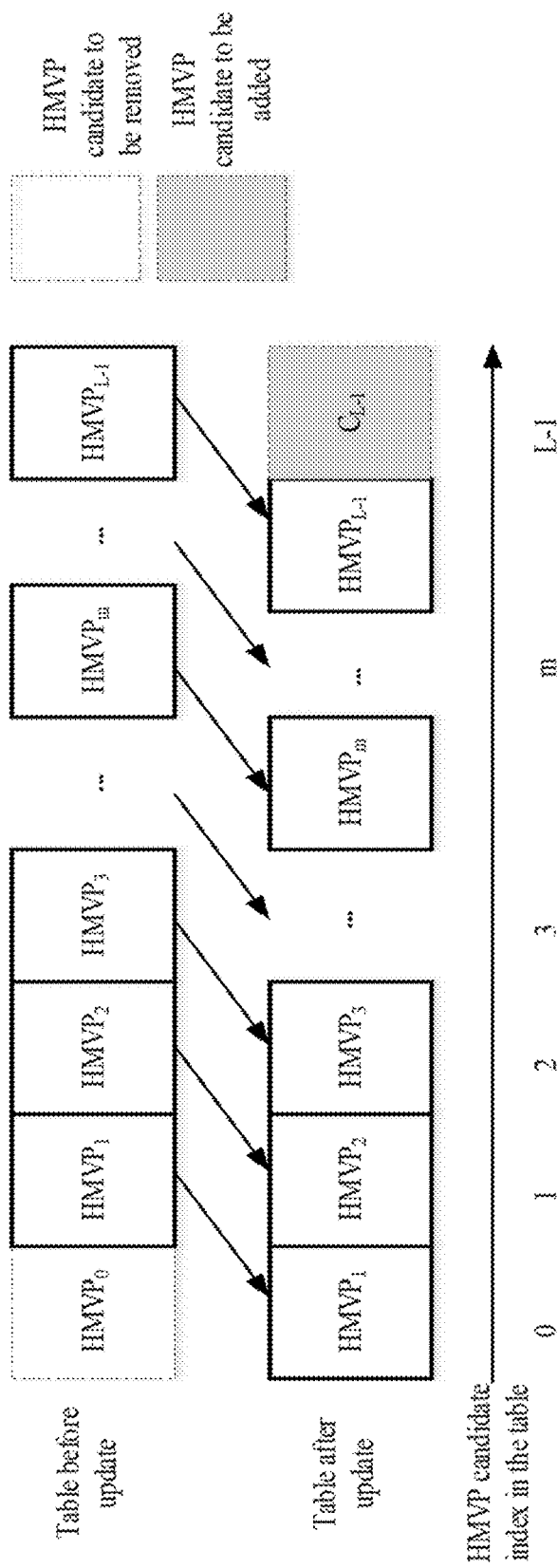
FIG. 38 shows an example of updating the table in the proposed HMVP method.

1) In one embodiment, if there are more than L HMVP candidates from the previously coded blocks, a First-In-First-Out (FIFO) rule is applied so that the table always contains the latest previously coded L motion candidates. FIG. 38 depicts an example wherein the FIFO rule is applied to remove a HMVP candidate and add a new one to the table used in the proposed method.
2) In another embodiment, whenever adding a new motion candidate (such as the current block is inter-coded and non-affine mode), a redundancy checking process is applied firstly to identify whether there are identical or similar motion candidates in LUTs.

3.2. JVET-M0101

3.2.1. Adding HEVC-Style Weighted Prediction

The following table show an example of syntax element. In order to implement the HEVC-style weighted prediction, the following syntax changes as shown in bold text can be made to PPS and slice header:

TABLE 12

| Example of syntax element | |
|---|---|
| pic_parameter_set_rbsp( ) { | Descriptor |
|   pps_pic_parameter_set_id | ue(v) |
|   pps_seq_parameter_set_id | ue(v) |
|   init_qp_minus26 | se(v) |
|   transform_skip_enabled_flag | u(1) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   deblocking_filter_control_present_flag | u(1) |
|   if( deblocking_filter_control_present_flag ) { | |

TABLE 12-continued

| Example of syntax element | |
|---|---|
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   rbsp_trailing_bits( ) | |
| } | |
| | |
| slice_header( ) { | Descriptor |
|   slice_pic_parameter_set_id | ue(v) |
|   slice_address | u(v) |
|   slice_type | ue(v) |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ) | |
|         slice_log2_diff_max_bt_min_qt_luma | ue(v) |
|         slice_log2_diff_max_tt_min_qt_luma | ue(v) |
|       } | |
|       if( slice_type = = I && qtbtt_dual_tree_intra_flag ) { | |
|         slice_log2_diff_min_qt_min_cb_chroma | ue(v) |
|         slice_max_mtt_hierarchy_depth_chroma | ue(v) |
|         if( slice_max_mtt_hierarchy_depth_chroma != 0 ) | |
|           slice_log2_diff_max_bt_min_qt_chroma | ue(v) |
|           slice_log2_diff_max_tt_min_qt_chroma | ue(v) |
|         } | |
|       } | |
|     } | |
|   } | |
|   if ( slice_type != I ) { | |
|     if( sps_temporal_mvp_enabled_flag ) | |
|       slice_temporal_mvp_enabled_flag | u(1) |
|     if( slice_type = = B ) | |
|       mvd_l1_zero_flag | u(1) |
|     if( slice_temporal_mvp_enabled_flag ) { | |
|       if( slice_type = = B) | |
|         collocated_from_l0_flag | u(1) |
|     } | |
|     if( ( weighted_pred_flag && slice_type = = P ) \|\| | |
|       ( weighted_bipred_flag && slice_type = = B ) ) | |
|       pred_weight_table( ) | |
|     six_minus_max_num_merge_cand | ue(v) |
|     if( sps_affine_enable_flag ) | |
|       five_minus_max_num_subblock_merge_cand | ue(v) |
|   } | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|   } | |
|   if( sps_sao_enabled_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) | |
|       alf_data( ) | |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |

TABLE 12-continued

| Example of syntax element | |
|---|---|
| slice_tc_offset_div2 | se(v) |
| } | |
| } | |
| byte_alignment( ) | |
| } | |

| Example of syntax element | |
|---|---|
| pred_weight_table( ) { | Descriptor |
|   luma_log2_weight_denom | ue(v) |
|   if( ChromaArrayType != 0 ) | |
|     delta_chroma_log2_weight_denom | se(v) |
|   for( i = 0; i <= num_ref_idx_l0_active_minus1; i++ ) | |
|     luma_weight_l0_flag[ i ] | u(1) |
|   if( ChromaArrayType != 0 ) | |
|     for( i = 0; i <= num_ref_idx_l0_active_minus1; i++ ) | |
|       chroma_weight_l0_flag[ i ] | u(1) |
|   for( i = 0; i <= num_ref_idx_l0_active_minus1; i++ ) { | |
|     if( luma_weight_l0_flag[ i ]) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type == B ) { | |
|     for( i = 0; i <= num_ref_idx_l1_active_minus1; i++ ) | |
|       luma_weight_l1_flag[ i ] | u(1) |
|     if( ChromaArrayType != 0 ) | |
|       for( i = 0; i <= num_ref_idx_l1_active_minus1; i++ ) | |
|         chroma_weight_l1_flag[ i ] | u(1) |
|     for( i =0; i <= num_ref_idx_l1_active_minusl; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j] | se(v) |
|         } | |
|     } | |
|   } | |
| } | |

3.2.2. Invoking (Bi-Prediction Bi-Prediction with Weighted Averaging (BWA), a.k.a GBI) and WP in a Mutually Exclusive Manner Though BWA and WP both apply weights to the motion compensated prediction signals, the specific operations are different. In the bi-prediction case, WP applies a linear weight and a constant offset to each of the prediction signals depending on the (weight, offset) parameters associated with the ref_idx that is used to generate the prediction signal. Whereas there are some range constraints on these (weight, offset) values, the allowed ranges are relatively large and there is no normalization constraint on the parameter values. WP parameters are signaled at the picture level (in slice headers). WP has been shown to provide very large coding gain for fading sequences, and is generally expected to be enabled for such content.

BWA uses a CU level index to indicate how to combine the two prediction signals in the case of bi-prediction. The BWA applies weighted averaging, i.e., the two weights add up to 1. BWA provides about 0.66% coding gain for the CTC RA configuration, but is much less effective than WP for the fading content (JVET-L0201).

Method #1:

The PPS syntax element weight_bipred_flag is checked to determine if the gbi_idx is signaled at the current CU. The syntax signaling is modified as follows in bold text:

TABLE 13

| Example of syntax element | |
|---|---|
| coding_unit( x0, y0, cbWidth, cbHeight, treeType ) { | Descriptor |
| ... | |
|   if( sps_gbi_enabled_flag && inter_pred_idc[ x0 ][ y0 ] == PRED_BI && | |
|     !weighted_bipred_flag && cbWidth * cbHeight >= 256) | |
|     gbi_idx[ x0 ][ y0 ] | ae(v) |
| ... | |
| } | |

The first alternative will disable BWA for all the reference pictures of the current slice, if the current slice refers to a PPS for which weighted_bipred_flag is set to 1.

Method #2:

BWA is disabled only if both of the reference pictures used in the bi-prediction have turned on weighted prediction, i.e., the (weight, offset) parameters of these reference pictures have non-default values. This allows the bi-predicted CUs that use reference pictures with default WP parameters (i.e. WP is not invoked for these CUs) to still be able to use BWA. The syntax signaling is modified as follows in bold text:

TABLE 14

| Example of syntax element | |
|---|---|
| coding_unit( x0, y0, cbWidth, cbHeight, treeType ) { | Descriptor |
| ... | |
|   if( sps_gbi_enabled_flag && inter_pred_idc[ x0 ][ y0 ] == PRED_BI && | |
|     luma_weight_l0_flag [ ref_idx_l0[ x0 ][ y0 ] ] == 0 && | |
|     chroma_weight_l0_flag [ ref_idx_l0[ x0 ][ y0 ] ] == 0 && | |
|     luma_weight_l1_flag [ ref_idx_l1[ x0 ][ y0 ] ] == 0 && | |
|     chroma_weight_l1_flag [ ref_idx_l1[ x0 ][ y0 ] ] == 0 && | |
|     cbWidth * cbHeight <= 256 ) | |
|     gbi_idx[ x0 ][ y0 ] | ae(v) |
| ... | |
| } | |

4. Problems

In LIC, two parameters including scaling parameter a and offset b need to be derived by using neighboring reconstructed pixels, which may cause latency issue.

Hybrid intra and inter prediction, diffusion filter, bilateral filter, OBMC and LIC need to further modify the inter prediction signal in different ways, and they all have latency issue.

5. Some Example Embodiments and Techniques

1. Examples below are provided to explain general concepts. These examples should not be interpreted in a narrow way. Furthermore, the examples below can be combined in any manner. It is proposed that LIC could only be performed for blocks located at CTU boundaries (called boundary blocks), and neighboring reconstructed samples out of the current CTU may be used for deriving LIC parameters. In this case, for those blocks that are not located CTU boundaries (called inner blocks), LIC is always disabled without being signaled.
   a. Selection of neighboring reconstructed samples outside current CTU may depend on the position of the block relative to the CTU covering the current block.

b. In one example, for blocks at the left boundary of a CTU, only left reconstructed neighboring samples of the CU may be used to derive the LIC parameters.
c. In one example, for blocks at the top boundary of a CTU, only above reconstructed neighboring samples of the block may be used to derive the LIC parameters.
d. In one example, for blocks at the top-left corner of a CTU, left and/or above reconstructed neighboring samples of the block may be used to derive the LIC parameters.
e. In one example, for blocks at the top-right corner of a CTU, top-right and/or above reconstructed neighboring samples of the block are used to derive the LIC parameters.
f. In one example, for blocks at the bottom-left corner of a CTU, bottom-left and/or left reconstructed neighboring samples of the block are used to derive the LIC parameters.

2. It is proposed that sets of LIC parameters may be derived for blocks located at CTU boundary only, and inner blocks of the CTU may inherit from one or multiple sets of these LIC parameter sets.
   a. In one example, a LIC parameter lookup table is maintained for each CTU, and each set of the derived LIC parameter is inserted into the LIC parameter table. Some method can be used to maintain the LIC parameter lookup table.
   b. Alternatively, such lookup table is maintained for each reference picture, and when deriving the LIC parameters, LIC parameters are derived for all reference pictures.
   c. In one example, such lookup table is emptied at the beginning of each CTU or CTU row or slice or tile or tile group or picture.
   d. In one example, for inner block coded with AMVP mode or affine inter mode, if LIC flag is true, the used set of LIC parameters is explicitly signaled. For example, an index is signaled to indicate which entry of the lookup table is used for each reference picture.
      i. In one example, for uni-predicted block, if there is no valid entry in the lookup table for the reference picture, the LIC flag shall be false.
      ii. In one example, for bi-predicted block, if there is no valid entry in the lookup table for any of the reference picture, the LIC flag shall be false.
      iii. In one example, for bi-predicted block, if there is valid entry in the lookup table for at least one of the reference pictures, the LIC flag can be true. One LIC parameter index is signaled for each reference picture with valid LIC parameters.
   e. In one example, more than one lookup tables are maintained.
      i. In one example, when encoding/decoding the current CTU, it only uses parameters from lookup tables generated by some previously encoded/decoded CTUs, and the lookup table generated by the current CTU is used for some following CTUs.
      ii. In one example, each lookup table may correspond to one reference picture/one reference picture list/a certain range of block sizes/a certain coded mode/a certain block shape, etc. al.
   f. In one example, if an inner block is coded with merge or affine merge mode, for spatial or/and temporal merge candidate, both LIC flag and LIC parameters are inherited from the corresponding neighboring block.
      i. Alternatively, the LIC flag is inherited and the LIC parameter may be signaled explicitly.
      ii. Alternatively, the LIC flag is signaled explicitly and the LIC parameter may be inherited.
      iii. Alternatively, both LIC flag and LIC parameter are signaled explicitly.
      iv. Alternatively, the differences between the LIP parameters of the block and the inherited parameters are signaled.
   g. In one example, for boundary block coded with AMVP mode or affine inter mode, if LIC flag is true, the used LIC parameter is derived implicitly using same methods as in 2.2.7.
   h. In one example, if a boundary block is coded with merge or affine merge mode, for spatial or/and temporal merge candidate, both LIC flag and LIC parameter are inherited from the corresponding neighboring block.
      i. Alternatively, the LIC flag is inherited and the LIC parameters may be signaled explicitly.
      ii. Alternatively, the LIC flag is signaled explicitly and the LIC parameters may be inherited.
      iii. Alternatively, both LIC flag and LIC parameter are signaled explicitly.
   i. In one example, if a block is coded with merge mode, for combined merge candidate or average merge candidate, LIC is always disabled.
      i. Alternatively, if LIC flag of any of the two merge candidates that are used for generating the combined merge candidate or average merge candidate is true, the LIC flag is set to true.
      ii. For an inner block, if both merge candidates that are used for generating the combined merge candidate or average merge candidate use LIC, it may inherit LIC parameters from any of them.
      iii. Alternatively, the LIC flag is inherited and the LIC parameter may be signaled explicitly.
      iv. Alternatively, the LIC flag is signaled explicitly and the LIC parameter may be inherited.
      v. Alternatively, both LIC flag and LIC parameter are signaled explicitly.
   j. In one example, if a block is coded with merge mode from a HMVP merge candidate, LIC is always disabled.
      i. Alternatively, if a block is coded with merge mode from a HMVP merge candidate, LIC is always enabled.
      ii. Alternatively, if LIC flag of the HMVP merge candidate is true, the LIC flag is set to be true.
         1. LIC flag is signaled explicitly.
      iii. Alternatively, if LIC flag of the HMVP merge candidate is true, the LIC flag is set to be true, and the LIP parameters are inherited from the HMVP merge candidate.
         1. Alternatively, LIC parameters are signaled explicitly.
         2. Alternatively, LIC parameters are derived implicitly.

3. It is proposed that hybrid intra and inter prediction (also known as combined intra-inter prediction, CIIP for short), diffusion filter, bilateral filter, transform domain filtering method, OBMC, LIC or any other tools that modify the inter prediction signal or modify the reconstructed block from motion compensation (i.e., causing latency issues) are exclusively used.

a. In one example, if LIC is enabled, all other tools are disabled implicitly. If LIC flag is true (either explicitly signaled or implicitly derived), on/off flag of other tools (if there is any) are not signaled and implicitly derived to be off.
b. In one example, if hybrid intra and inter prediction is enabled, all other tools are disabled implicitly. If hybrid intra and inter prediction flag is true (either explicitly signaled or implicitly derived), on/off flag of other tools (if there is any) are not signaled and implicitly derived to be off.
c. In one example, if diffusion filter is enabled, all other tools are disabled implicitly. If diffusion filter flag is true (either explicitly signaled or implicitly derived), on/off flag of other tools (if there is any) are not signaled and implicitly derived to be off.
d. In one example, if OBMC is enabled, all other tools are disabled implicitly. If OBMC flag is true (either explicitly signaled or implicitly derived), on/off flag of other tools (if there is any) are not signaled and implicitly derived to be off.
e. In one example, if bilateral filter is enabled, all other tools are disabled implicitly. If bilateral filter flag is true (either explicitly signaled or implicitly derived), on/off flag of other tools (if there is any) are not signaled and implicitly derived to be off.
f. Different tools may be checked in order. Alternatively, furthermore, such checking process terminates when one of the above tools is decided to be enabled.
   i. In one example, the checking order is LIC→diffusion filter→hybrid intra and inter prediction→OBMC→bilateral filter.
   ii. In one example, the checking order is LIC→diffusion filter→bilateral filter→hybrid intra and inter prediction→OBMC.
   iii. In one example, the checking order is LIC→OBMC→diffusion filter→bilateral filter→hybrid intra and inter prediction.
   iv. In one example, the checking order is LIC→OBMC→diffusion filter→hybrid intra and inter prediction→bilateral filter.
   v. The order may be adaptively changed based on previously coded information and/or based on coded information of current block (e.g., block size/reference picture/MV information/Low delay check flag/tile/picture/slice types), such as based on the modes of neighboring blocks.
g. For any one of the above mentioned tools (e.g., CIIP, LIC, diffusion filter, bilateral filter, transform domain filtering method), whether to automatically disable it and/or use different ways for decoding the current block may depend on the coded modes of the neighboring or non-adjacent row or columns.
   i. Alternatively, for any one of the above mentioned tools (e.g., CIIP, LIC, diffusion filter, bilateral filter, transform domain filtering method), whether to automatically disable it may depend on all the coded modes of the neighboring or non-adjacent row or columns.
   ii. Alternatively, for any one of the above mentioned tools (e.g., CIIP, LIC, diffusion filter, bilateral filter, transform domain filtering method), whether to enable it may depend on at least one of the samples in the neighboring or non-adjacent row or columns is NOT coded with certain modes.
   iii. In one example, the neighboring or non-adjacent row may include the above row and/or above-right row,
   iv. In one example, the neighboring or non-adjacent column may include the left column and/or below-left column.
   v. In one example, the coded modes/certain modes may include intra mode and/or combined intra-inter mode (CIIP).
   vi. In one example, if any one neighboring/non-adjacent block in the neighboring or non-adjacent row or columns is coded with intra and/or CIIP, such method is disabled.
   vii. In one example, if all of neighboring/non-adjacent blocks in the neighboring or non-adjacent row or columns is coded with intra and/or CIIP, such method is disabled.
   viii. In one example, different methods may include short-tap filters/fewer neighboring samples to be utilized for LIC parameter derivation, padding of reference samples etc. al.
h. For any one of the above mentioned tools (e.g., CIIP, LIC, diffusion filter, bilateral filter, transform domain filtering method), it is disabled when there is at least one above neighboring/non-adjacent above neighboring block in the neighboring or non-adjacent row is intra coded and/or combined intra-inter mode coded.
i. For any one of the above mentioned tools (e.g., CIIP, LIC, diffusion filter, bilateral filter, transform domain filtering method), it is disabled when there is at least one left neighboring/non-adjacent left neighboring block in the neighboring or non-adjacent column is intra coded and/or combined intra-inter mode coded.
j. For any one of the above mentioned tools (e.g., CIIP, LIC, diffusion filter, bilateral filter, transform domain filtering method), it is disabled when all blocks in the neighboring or non-adjacent row/column is intra coded and/or combined intra-inter mode coded.
k. In one example, for LIC coded blocks, the neighboring samples coded with intra mode and/or hybrid intra and inter mode are excluded from derivation of LIC parameters.
l. In one example, for LIC coded blocks, the neighboring samples coded with non-intra mode and/or non-CIIP mode may be included from derivation of LIC parameters.

4. When certain tool is disabled for one block (such as when all neighboring samples are intra coded), such a coding tool may still be applied but in a different way.
   a. In one example, short-tap filters may be applied.
   b. In one example, padding of reference samples may be applied.
   c. In one example, neighboring row/column and/or non-adjacent row/column of blocks in reference pictures (via motion compensation if needed) may be utilized as a replacement of current blocks' neighboring row/column and/or non-adjacent row/column.

5. It is proposed that LIC is used exclusively with combined inter-intra prediction (CIIP). In some implementations, LIC and combined inter-intra prediction (CIIP) are exclusive of each other.

a. In one example, CIIP information may be signaled after LIC information.
   i. In one example, whether to signal CIIP information may depend on the signaled/inferred LIC information.
   ii. Alternatively, furthermore, whether to signal CIIP information may depend on both LIC information and weighted prediction information associated with at least one reference picture of current block or of current tile/tile group/picture containing current block.'
   iii. The information may be signaled in SPS/PPS/slice header/tile group header/tile/CTU/CU
b. Alternatively, LIC information may be signaled after CIIP information.
   i. In one example, whether to signal LIC information may depend on the signaled/inferred CIIP information.
   ii. Alternatively, furthermore, whether to signal LIC information may depend on both CIIP information and weighted prediction information associated with at least one reference picture of current block or of current tile/tile group/picture containing current block.
   iii. The information may be signaled in SPS/PPS/slice header/tile group header/tile/CTU/CU
c. In one example, if LIC flag is true, syntax elements required by CIIP are not signaled.
d. In one example, if CIIP flag is true, syntax elements required by LIC are not signaled.
e. In one example, if CIIP is enabled, syntax elements required by LIC are not signaled.

6. It is proposed that in pairwise prediction or combined-bi prediction or other kinds of virtual/artificial candidates (e.g., zero motion vector candidates), LIC or/and GBI or/and weighted prediction may be disabled.
   a. Alternatively, if one of the two candidates involved in pairwise prediction or combined-bi prediction adopt LIC prediction and none of the two candidates adopt weighted prediction or GBI, LIC may be enabled for the pairwise or combined-bi merge candidate.
   b. Alternatively, if both candidates involved in pairwise prediction or combined-bi prediction adopt LIC prediction, LIC may be enabled for the pairwise or combined-bi merge candidate.
   c. Alternatively, if one of the two candidates involved in pairwise prediction or combined-bi prediction adopt weighted prediction and none of the two candidates adopt LIC prediction or GBI, weighted prediction may be enabled for the pairwise or combined-bi merge candidate.
   d. Alternatively, if both candidates involved in pairwise prediction or combined-bi prediction adopt weighted prediction, weighted prediction may be enabled for the pairwise or combined-bi merge candidate.
   e. Alternatively, if one of the two candidates involved in pairwise prediction or combined-bi prediction adopt GBI and none of the two candidates adopt LIC prediction or weighted prediction, GBI may be enabled for the pairwise or combined-bi merge candidate.
   f. Alternatively, if both candidates involved in pairwise prediction or combined-bi prediction adopt GBI and GBI index are the same for the two candidates, GBI may be enabled for the pairwise or combined-bi merge candidate.

7. It is proposed that LIC prediction or/and weighted prediction or/and GBI may be considered in deblocking filter.
   a. In one example, even two blocks nearby the boundary have same motion but with different LIC parameters/weighted prediction parameters/GBI indices, deblocking filtering process may be applied.
   b. In one example, if two blocks (nearby the boundary) have different GBI index, a stronger boundary filtering strength may be assigned.
   c. In one example, if two blocks have different LIC flag, a stronger boundary filtering strength may be assigned.
   d. In one example, if two blocks adopt different LIC parameters, a stronger boundary filtering strength may be assigned.
   e. In one example, if one block adopts weighted prediction and the other block does not adopt weighted prediction, or two blocks adopt different weighting factor (e.g., predicted from reference pictures with different weighting factor), a stronger boundary filtering strength may be assigned.
   f. In one example, if two blocks nearby the boundary, one is coded with LIC mode and the other not, deblocking filtering may be applied even the motion vectors are same.
   g. In one example, if two blocks nearby the boundary, one is coded with weighted prediction mode and the other not, deblocking filtering may be applied even the motion vectors are same.
   h. In one example, if two blocks nearby the boundary, one is coded with GBI enabled (e.g., unequal weights) and the other not, deblocking filtering may be applied even the motion vectors are same.

8. It is proposed that affine mode/affine parameters/affine type may be considered in deblocking filter.
   a. Whether to and/or how to apply deblocking filter may depend on the affine mode/affine parameters.
   b. In one example, if two blocks (nearby the boundary) have different affine mode, a stronger boundary filtering strength may be assigned.
   c. In one example, if two blocks (nearby the boundary) have different affine parameters, a stronger boundary filtering strength may be assigned.
   d. In one example, if two blocks nearby the boundary, one is coded with affine mode and the other not, deblocking filtering may be applied even the motion vectors are same.

9. For above bullets, they may be also applicable to other kinds of filtering process, 10. When LIC is conducted, the block should be divided into VPDUs (such as 64*64 or 32*32 or 16*16) process-blocks, each block conducts LIC procedure sequentially (that means the LIC procedure of one process-block may depend on the LIC procedure of another process-block), or parallelly (that means the LIC procedure of one process-block cannot depend on the LIC procedure of another process-block).

11. Alternatively, it is proposed that LIC may be used together with multi-hypothesis prediction (as described in 2.2.13, 2.2.14, 2.2.15).
   a. In one example, LIC flag is explicitly signaled for multi-hypothesis AMVP and merge mode (e.g., as described in 2.2.14).
      i. In one example, the explicitly signaled LIC flag is applied to both AMVP mode and merge mode.

ii. In one example, the explicitly signaled LIC flag is applied only to AMVP mode, while the LIC flag for the merge mode is inherited from the corresponding merge candidate. Different LIC flag may be used for AMVP mode and merge mode. Meanwhile, different LIC parameters may be derived/inherited for AMVP mode and merge mode.
  1. Alternatively, LIC is always disabled for the merge mode.
iii. Alternatively, LIC flag is not signaled and LIC is always disabled for AMVP mode. However, for merge mode, LIC flag or/and LIC parameter may be inherited or derived.
b. In one example, LIC flag is inherited from the corresponding merge candidates for multi-hypothesis merge mode (e.g., as described in 2.2.15).
  i. In one example, LIC flag is inherited for each of the two selected merge candidates, therefore, different LIC flag may be inherited for the two selected merge candidates. Meanwhile, different LIC parameter may be derived/inherited for the two selected merge candidates.
  ii. In one example, LIC flag is only inherited for the $1^{st}$ selected merge candidate and LIC is always disabled for the $2^{nd}$ selected merge candidate.
c. In one example, LIC flag is explicitly signaled for multi-hypothesis inter prediction mode (e.g., as described in 2.2.13).
  i. In one example, if the block is predicted with merge mode (or UMVE mode) and additional motion information, the explicitly signaled LIC flag may be applied to both merge mode (or UMVE mode) and the additional motion information.
  ii. In one example, if the block is predicted with merge mode (or UMVE mode) and additional motion information, the explicitly signaled LIC flag may be applied to the additional motion information. While for merge mode, LIC flag or/and LIC parameter may be inherited or derived.
    1. Alternatively, LIC is always disabled for the merge mode.
  iii. In one example, if the block is predicted with merge mode (or UMVE mode) and additional motion information, LIC flag is not signaled and disabled for the additional motion information. While for merge mode, LIC flag or/and LIC parameter may be inherited or derived.
  iv. In one example, if the block is predicted with AMVP mode and additional motion information, the explicitly signaled LIC flag may be applied to both AMVP mode and the additional motion information.
    1. Alternatively, LIC is always disabled for the additional motion information.
  v. Different LIC parameters may be derived/inherited for the merge mode (or UMVE mode)/AMVP mode and the additional motion information.
d. When multi-hypothesis is applied to a block, illumination compensation may be applied to certain prediction signals, instead of all prediction signals.
e. When multi-hypothesis is applied to a block, more than one flag may be signaled/derived to indicate the usage of illumination compensation for prediction signals.
f.
12. The above proposed methods or LIC may be applied under certain conditions, such as block sizes, slice/picture/tile types, or motion information.
  a. In one example, when a block size contains smaller than M*H samples, e.g., 16 or 32 or 64 luma samples, proposed method or LIC are not allowed.
  b. Alternatively, when minimum size of a block's width or/and height is smaller than or no larger than X, proposed method or LIC are not allowed. In one example, X is set to 8.
  c. Alternatively, when a block's width >th1 or >=th1 and/or a block's height >th2 or >=th2, proposed method or LIC are not allowed. In one example, th1 and/or th2 is set to 8.
  d. Alternatively, when a block's width <th1 or <=th1 and/or a block's height <th2 or <a=th2, proposed method or LIC are not allowed. In one example, th1 and/or th2 is set to 8.
  e. In one example, LIC is disabled for affine inter modes or/and affine merge mode.
  f. In one example, LIC is disabled for sub-block coding tools like ATMVP or/and STMVP or/and planar motion vector prediction modes.
  g. In one example, LIC is only applied to some components. For example, LIC is applied to luma component.
    i. Alternatively, LIC is applied to chroma component.
  h. In one example, BIO or/and DMVR is disabled if LIC flag is true.
  i. In one example, LIC is disabled for bi-predicted block.
  j. In one example, LIC is disabled for inner block coded with AMVP mode.
  k. In one example, LIC is only allowed for uni-predicted block.
13. It is proposed that selection of neighboring samples used for deriving LIC parameters may depend on coded information, block shape, etc. al.
  a. In one example, if width >=height or width >height, only above neighboring pixels are used for deriving LIC parameters.
  b. In one example, if width <height, only left neighboring pixels are used for deriving LIC parameters.
14. It is proposed that only one LIC flag may be signaled for a block with geometry portioning structure (such as triangular prediction mode). In this case, all partitions of the block (all PUs) share the same value of LIC enabling flag.
  a. Alternatively, for some PU, the LIC may be always disabled regardless the signaled LIC flag.
  b. In one example, if the block is split from the top-right corner to the bottom-left corner, one set of LIC parameters is derived and used for both PUs.
    i. Alternatively, LIC is always disabled for the bottom PU.
    ii. Alternatively, if the top PU is coded in merge mode, LIC flag is not signaled.
  c. In one example, if the block is split from the top-left corner to the bottom-right corner, LIC parameters are derived for each PU.

i. In one example, above neighboring samples of the block are used for deriving LIC parameters of the top PU and left neighboring sample of the block are used for deriving LIC parameters of the left PU.

ii. Alternatively, one set of LIC parameters is derived and used for both PUs.

d. In one example, if both PUs are code in merge mode, LIC flag is not signaled and may be inherited from merge candidates. LIC parameters may be derived or inherited.

e. In one example, if one PU is coded in AMVP mode and another PU is coded in merge mode, the signaled LIC flag may be applied to PU coded in AMVP mode only. For PU coded in merge mode, LIC flag or/and LIC parameters are inherited.

i. Alternatively, LIC flag is not signaled and is disabled for the PU coded in AMVP mode. While, for PU coded in merge mode, LIC flag or/and LIC parameters are inherited.

ii. Alternatively, LIC is disabled for the PU coded in merge mode.

f. Alternatively, if both PUs are coded in AMVP mode, one LIC flag may be signaled for each PU.

g. In one example, one PU may utilize reconstructed samples from another PU within current block which has been reconstructed to derive LIC parameters.

15. It is proposed that LIC may be performed for partial pixels instead of the whole block.

a. In one example, LIC may be only performed for pixels around block boundaries only, and for other pixels within the block, LIC is not performed.

b. In one example, LIC is performed for the top W×N rows or N×H columns, wherein N is an integer number, W and H denote the width and the height of the block. For example, N is equal to 4.

c. In one example, LIC is performed for the top-left (W−m)×(H−n) region, wherein m and n are integer numbers, W and H denote the width and the height of the block. For example, m and n are equal to 4.

16. Whether to enable or disable the above methods may be signaled in SPS/PPS/VPS/sequence header/picture header/slice header/tile group header/group of CTUs, etc. al.

a. Alternatively, which method to be used may be signaled in SPS/PPS/VPS/sequence header/picture header/slice header/tile group header/group of CTUs, etc. al.

b. Alternatively, whether to enable or disable the above methods and/or which method to be applied may be dependent on block dimension, video processing data unit (VPDU), picture type, low delay check flag, coded information of current block (such as reference pictures, uni or bi-prediction) or previously coded blocks.

6. Additional Embodiments

Method #1:

The PPS syntax element weight_bipred_flag is checked to determine if the LIC_enabled_flag is signaled at the current CU. The syntax signaling is modified as follows in bold text:

TABLE 15

| Example of syntax element | |
|---|---|
| coding_unit( x0, y0, cbWidth, cbHeight, treeType ) { <br> ... <br>   if( sps_LIC_enabled_flag && ( (inter_pred_idc[ x0 ][ y0 ] = = PRED_BI <br> && !weighted_bipred_flag) \|\| (inter_pred_idc[ x0 ][ y0 ] = = PRED_UNI <br> && !weighted_pred_flag)) ) { <br>     LIC_enabled_flag [ x0 ][ y0 ] <br>     ... <br>   } <br> } | Descriptor <br><br><br><br><br><br> ae(v) |

The first alternative will disable LIC for all the reference pictures of the current slice/tile/tile group, for example, 1. if the current slice refers to a PPS for which weighted_bipred_flag is set to 1 and current block is bi-predicted;
2. if the current slice refers to a PPS for which weighted_pred_flag is set to 1 and current block is uni-predicted;

Method #2:

For the bi-prediction case:

LIC is disabled only if both of the reference pictures used in the bi-prediction have turned on weighted prediction, i.e., the (weight, offset) parameters of these reference pictures have non-default values. This allows the bi-predicted CUs that use reference pictures with default WP parameters (i.e. WP is not invoked for these CUs) to still be able to use LIC.

For the uni-prediction case:

LIC is disabled only if the reference picture used in the uni-prediction have turned on weighted prediction, i.e., the (weight, offset) parameters of these reference pictures have non-default values. This allows the uni-predicted CUs that use reference pictures with default WP parameters (i.e. WP is not invoked for these CUs) to still be able to use LIC. The syntax is modified as follows in bold text:

TABLE 16

| Example of syntax element | |
|---|---|
| coding_unit( x0, y0, cbWidth, cbHeight, treeType ) { <br> ... <br>   if( sps_gbi_enabled_flag && <br>   ( (inter_pred_idc[ x0 ][ y0 ] = = PRED_BI && <br>     luma_weight_l0_flag [ ref_idx_l0[ x0 ][ y0 ] ] == 0 <br> && <br>     chroma_weight_l0_flag [ ref_idx_l0[ x0 ][ y0 ] ] == 0 && <br>     luma_weight_l1_flag [ ref_idx_l0[ x0 ][ y0 ] ] == 0 && <br>   chroma_weight_l1_flag [ ref_idx_l0[ x0 ][ y0 ] ] == 0 <br> \|\| <br> (inter_pred_idc[ x0 ][ y0 ] = = PRED_UNI && <br>     luma_weight_lX_flag [ ref_idx_lX[ x0 ][ y0 ] ] == 0 <br> && <br>     chroma_weight_lX_flag [ ref_idx_lX[ x0 ][ y0 ] ] == 0 && <br>   ) <br>     LIC_enabled_flag [ x0 ][ y0 ] <br> ... <br> } | Descriptor <br><br><br><br><br><br><br><br><br><br><br><br><br><br><br> ae(v) |

In above table, X indicates the reference picture list (X being 0 or 1). For above examples, the following may apply:

sps_LIC_enabled_flag which controls the usage of LIC per sequence may be replaced by indications of usage of LIC per picture/view/slice/tile/tile groups/CTU rows/regions/multiple CTUs/CTU.

the control of signalling of LIC_enabled_flag may further depend on block dimensions.

In one example, the control of signalling of LIC_enabled_flag may further depend on gbi index.

In one example, the control of signalling of gbi index may further depend on LIC_enabled_flag.

Figure 39:
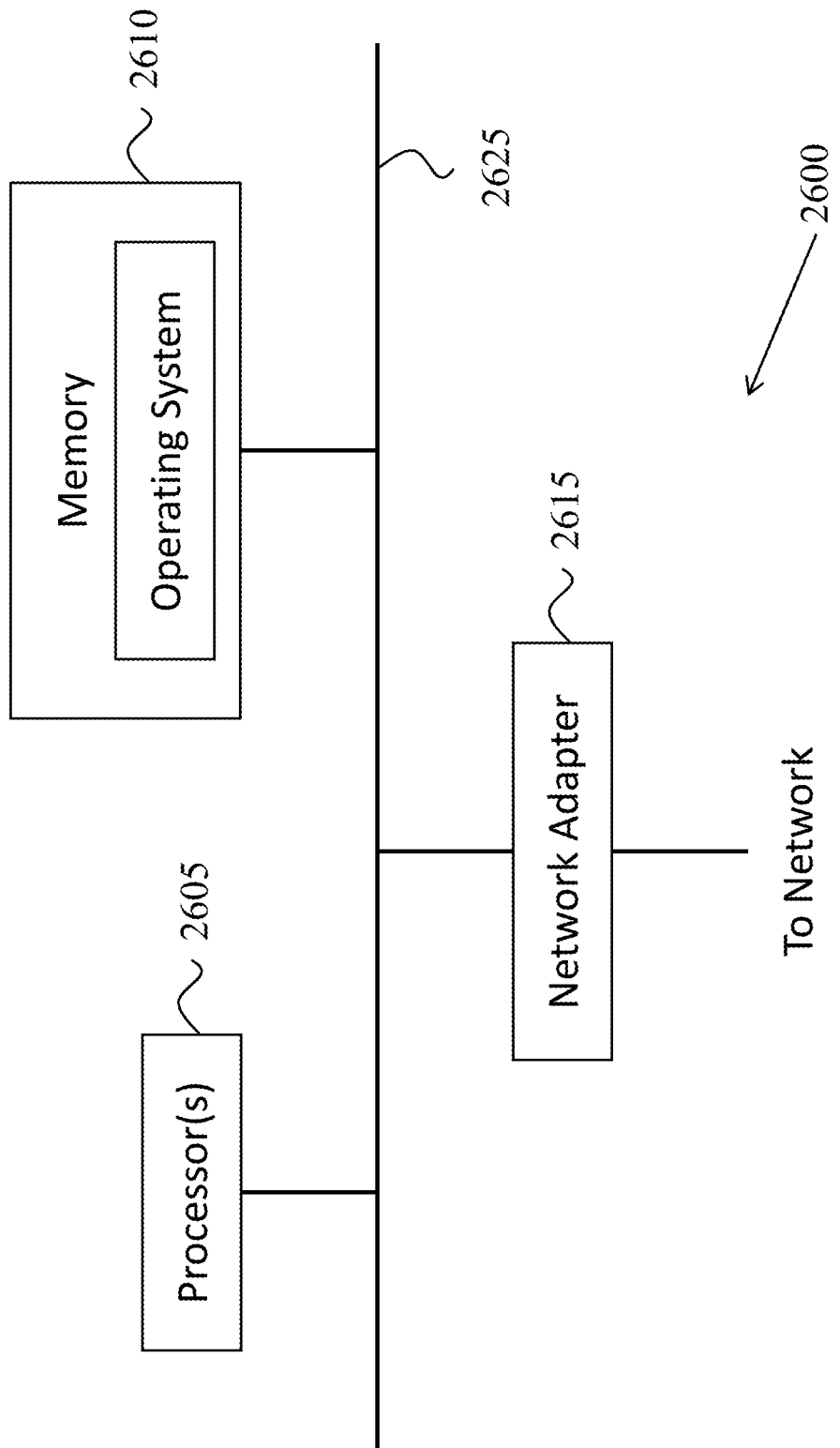
FIG. 39 is a block diagram of a hardware platform for implementing the video coding or decoding techniques described in the present document.

FIG. 39 is a block diagram illustrating an example of the architecture for a computer system or other control device 2600 that can be utilized to implement various portions of the presently disclosed technology. In FIG. 39, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 40A:
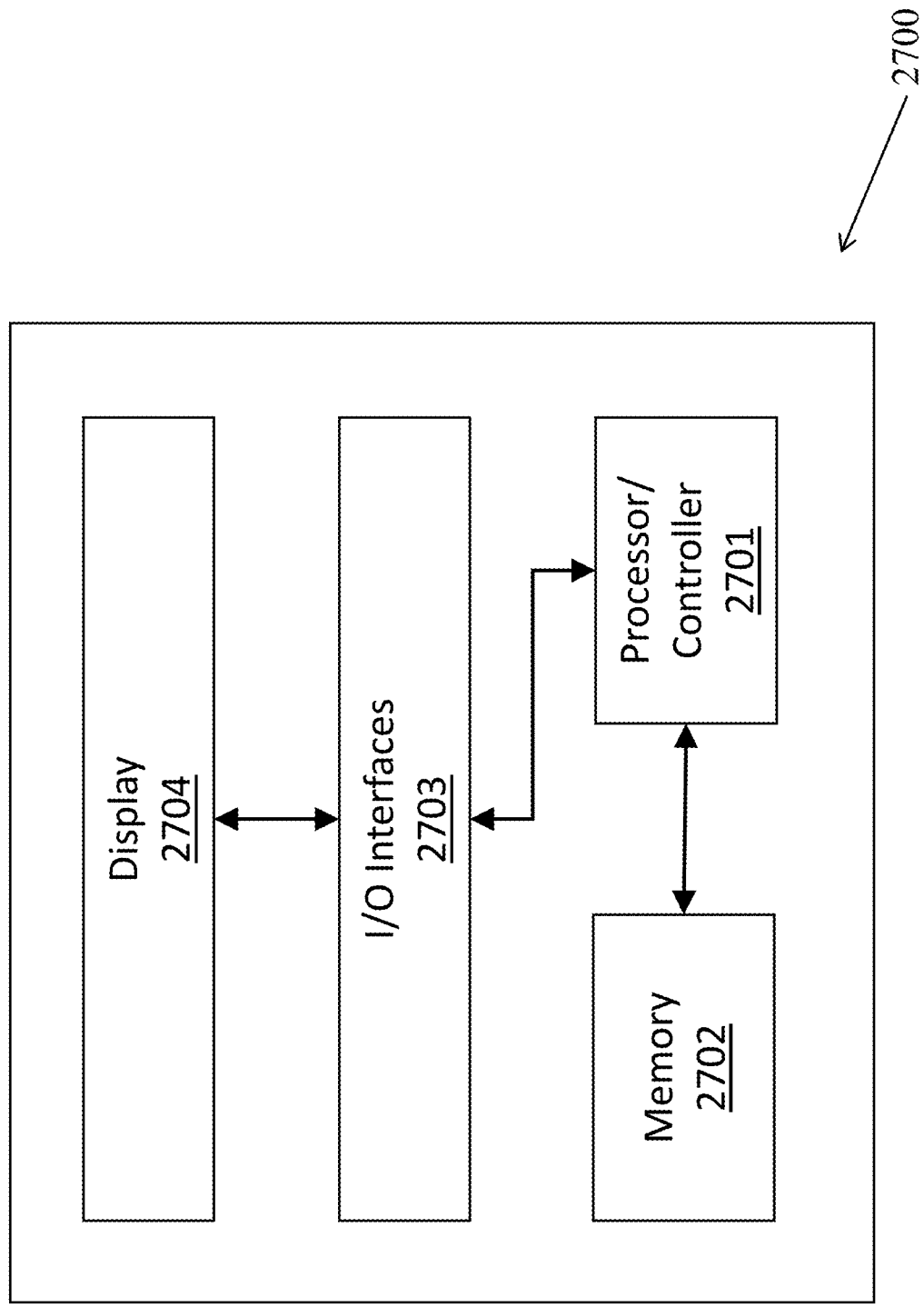
FIG. 40A shows an example of a hardware platform for implementing methods and techniques described in the present document.

FIG. 40 shows a block diagram of an example embodiment of a device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

FIG. 29 is another example of a block diagram of a video processing system in which disclosed techniques may be implemented. FIG. 29 is a block diagram showing an example video processing system 2900 in which various techniques disclosed herein may be implemented. Various implementations may include some or all of the components of the system 2900. The system 2900 may include input 2902 for receiving video content. The video content may be received in a raw or uncompressed format, e.g., 8 or 10 bit multi-component pixel values, or may be in a compressed or encoded format. The input 2902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2900 may include a coding component 2904 that may implement the various coding or encoding methods described in the present document. The coding component 2904 may reduce the average bitrate of video from the input 2902 to the output of the coding component 2904 to produce a coded representation of the video. The coding techniques are therefore sometimes called video compression or video transcoding techniques. The output of the coding component 2904 may be either stored, or transmitted via a communication connected, as represented by the component 2906. The stored or communicated bitstream (or coded) representation of the video received at the input 2902 may be used by the component 2908 for generating pixel values or displayable video that is sent to a display interface 2910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 40B:
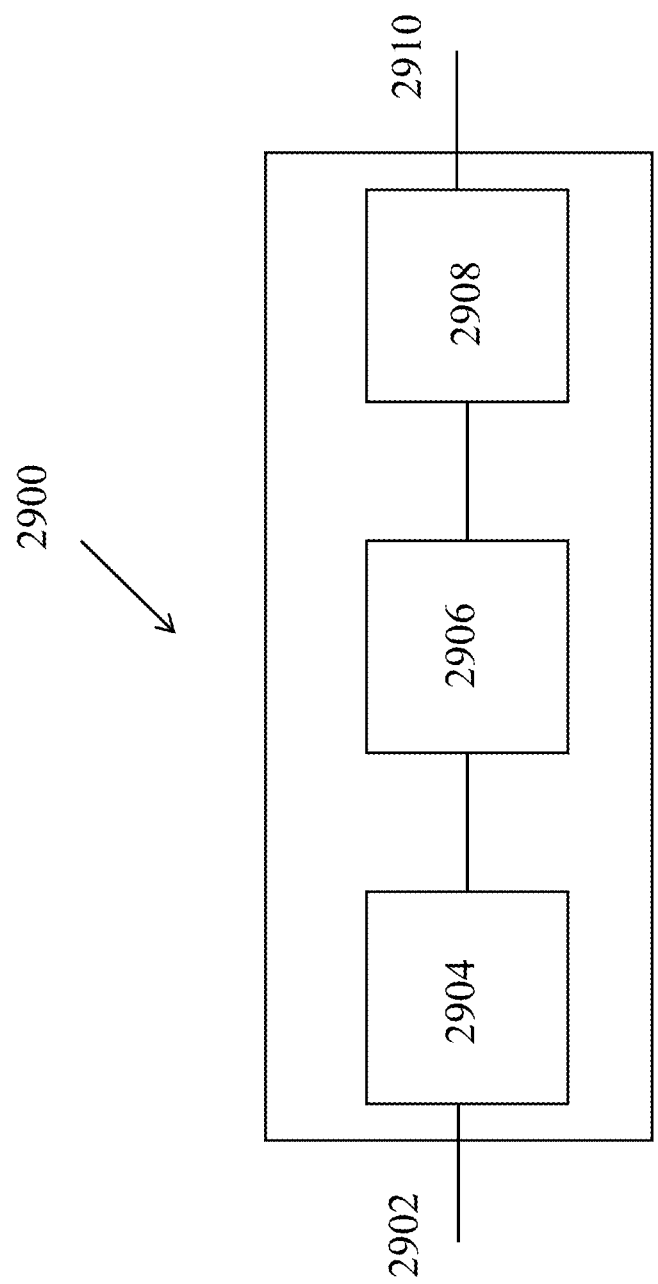
FIG. 40B shows another example of a hardware platform for implementing methods and techniques described in the present document.

In some embodiments, the video coding methods may be implemented using an apparatus that is implemented on a hardware platform as described with respect to FIG. 39, 40 or 40B.

Figure 41A:
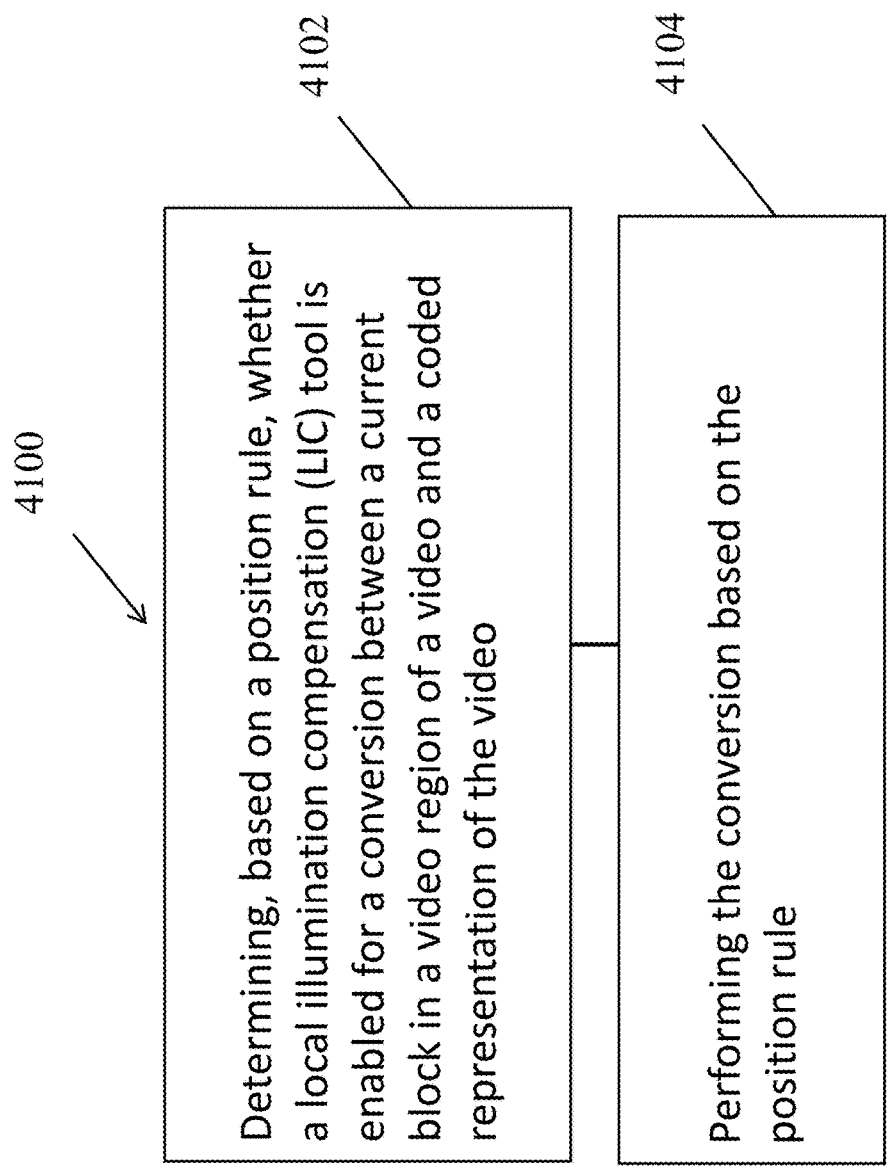
FIGS. 41A-41H are flowcharts of example methods of video processing.

FIG. 41A is a flowchart representation of an example method for video processing. The method 4100 includes, at step 4102, determining, based on a position rule, whether a local illumination compensation (LIC) tool is enabled for a conversion between a current block in a video region of a video and a coded representation of the video. The method 4100 further includes, at step 4104, performing the conversion based on the position rule. In some implementations, the position rule specifies that the LIC tool is enabled for blocks on boundaries of the video region and disabled for blocks inside the video region and the LIC tool includes using a linear model of illumination changes in the current block during the conversion.

Figure 41B:
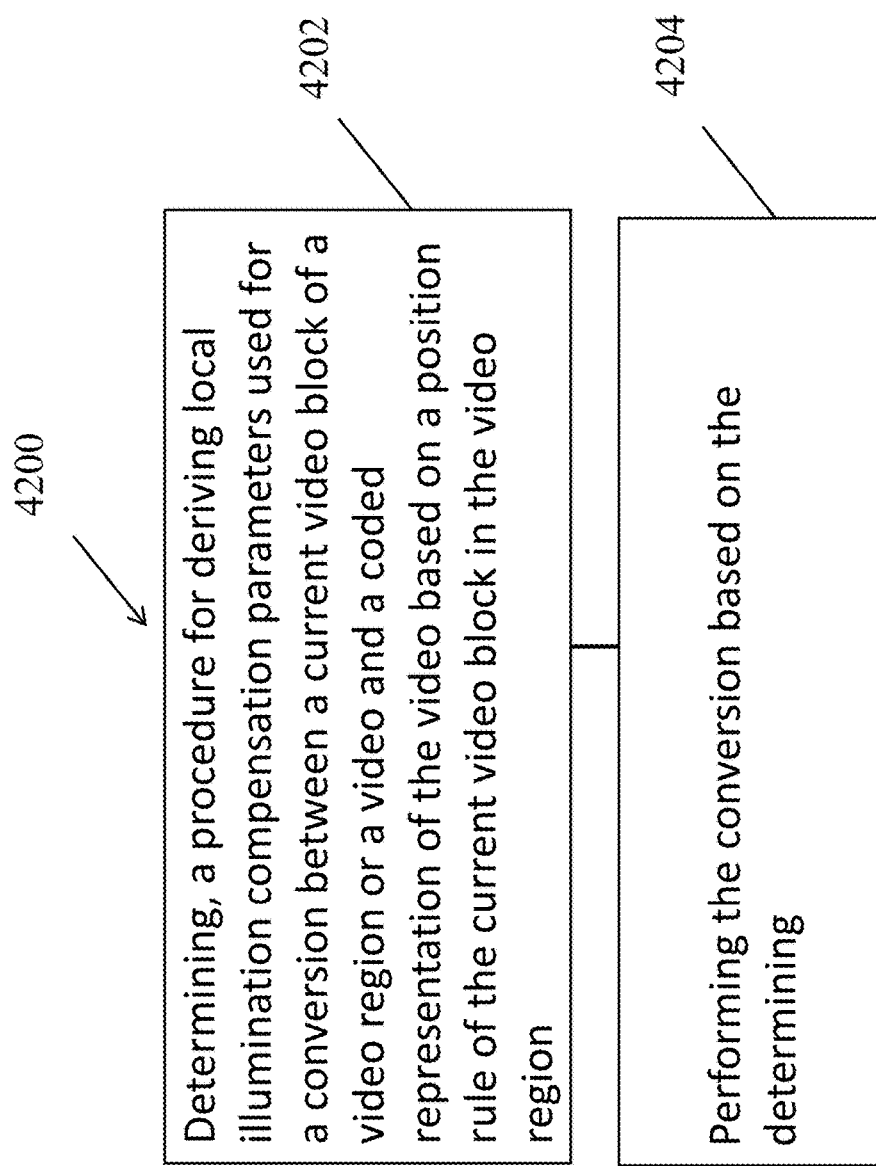

FIG. 41B is a flowchart representation of an example method for video processing. The method 4200 includes, at step 4202, determining, a procedure for deriving local illumination compensation parameters used for a conversion between a current video block of a video region or a video and a coded representation of the video based on a position rule of the current video block in the video region. The method 4200 further includes, at step 4204, performing the conversion based on the determining.

Figure 41C:
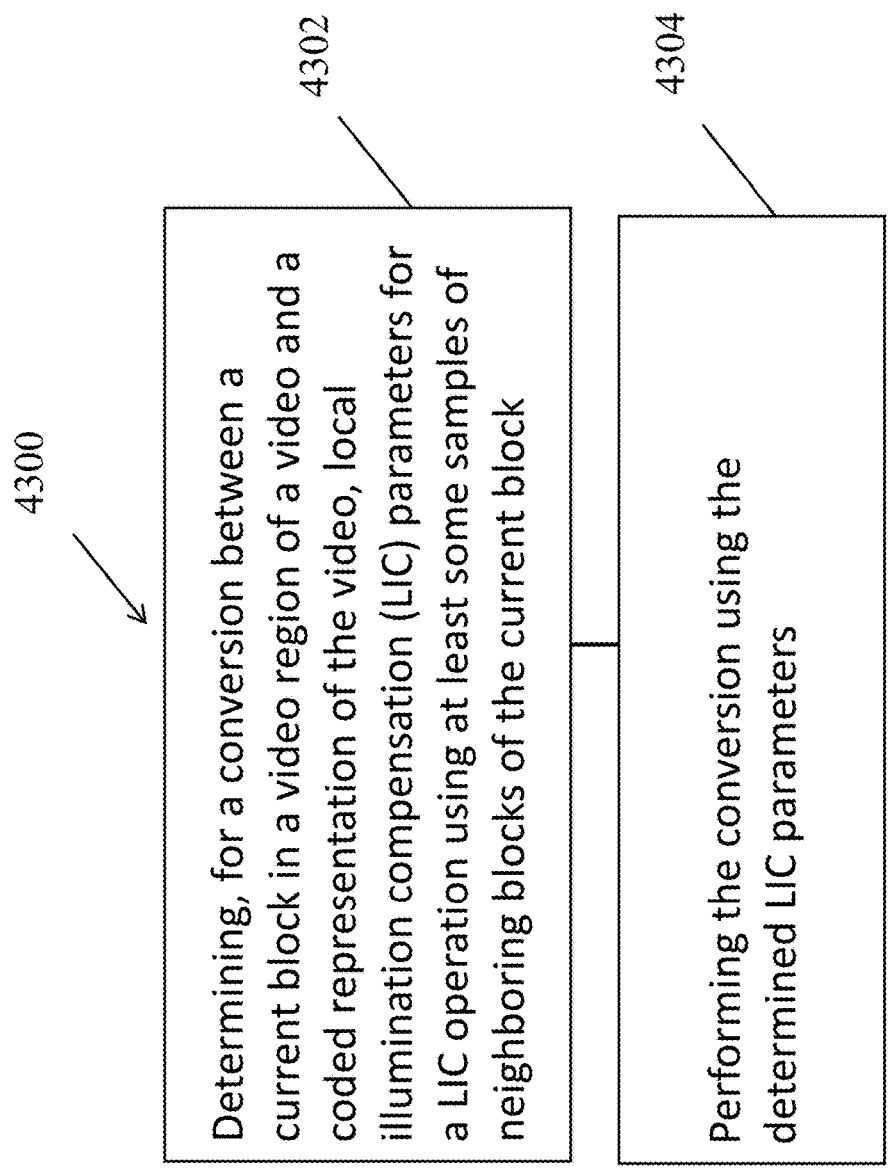

FIG. 41C is a flowchart representation of an example method for video processing. The method 4300 includes, at step 4302, determining, for a conversion between a current block in a video region of a video and a coded representation of the video, local illumination compensation (LIC) parameters for a LIC operation using at least some samples of neighboring blocks of the current block. The method 4300 further includes, at step 4304, performing the conversion using the determined LIC parameters. The LIC operation includes using a linear model of illumination changes in the current block during the conversion.

Figure 41D:
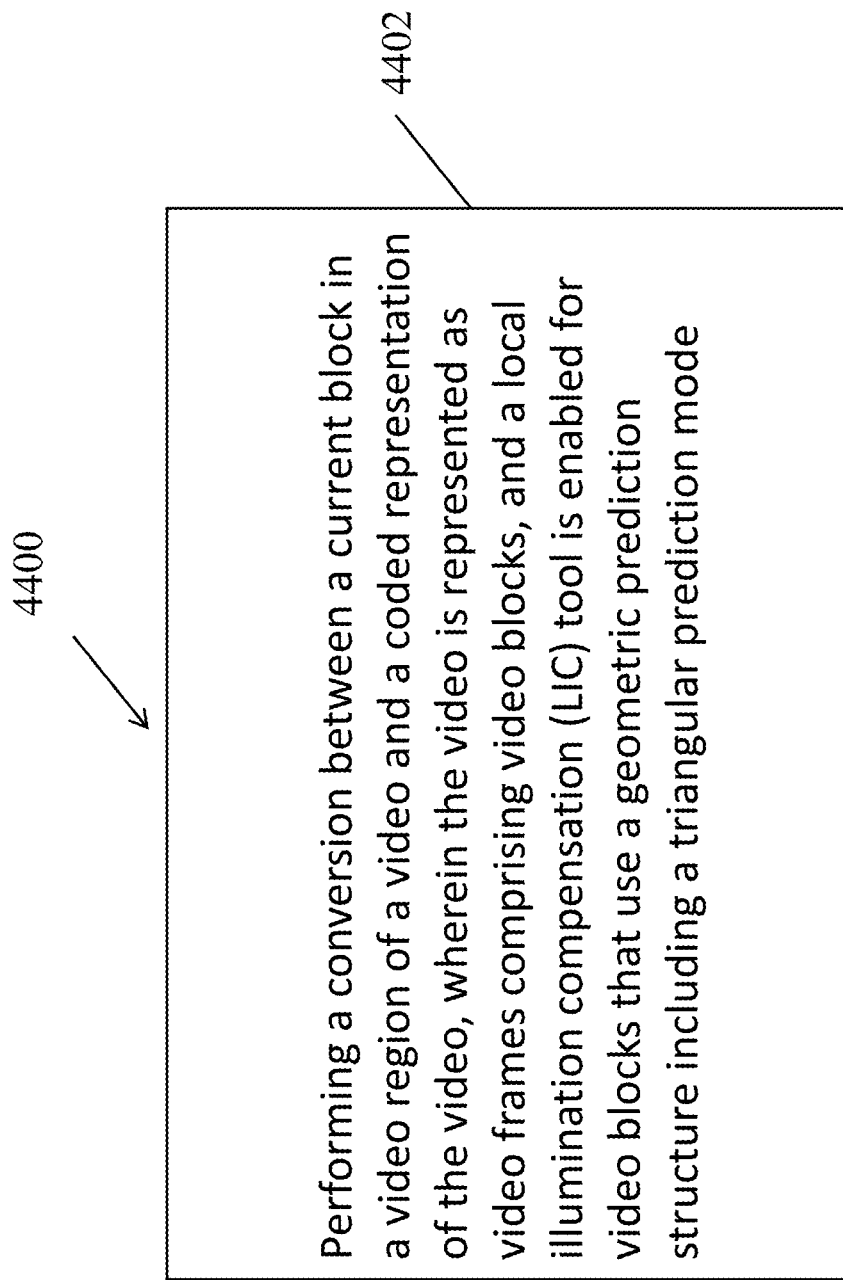

FIG. 41D is a flowchart representation of an example method for video processing. The method 4400 includes, at step 4402, performing a conversion between a current block in a video region of a video and a coded representation of the video, wherein the video is represented as video frames comprising video blocks, and a local illumination compensation (LIC) tool is enabled for video blocks that use a geometric prediction structure including a triangular prediction mode. The LIC tool includes using a linear model of illumination changes in the current block during the conversion.

Figure 41E:
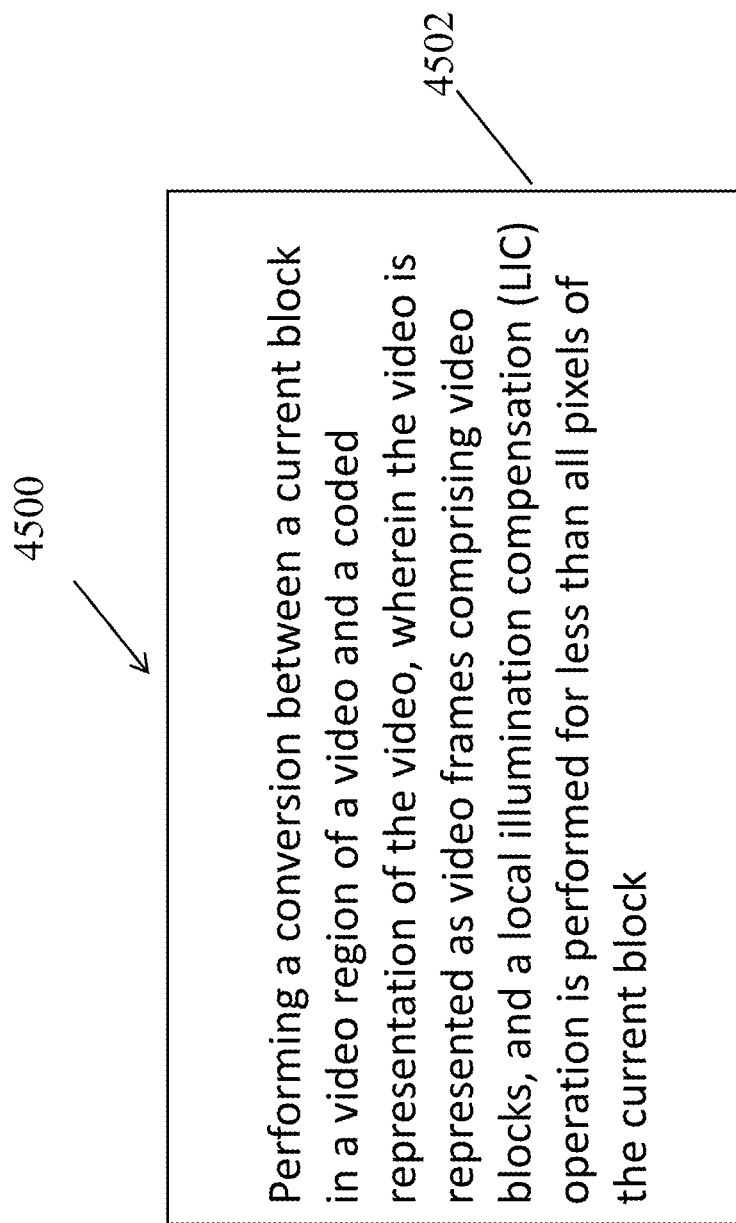

FIG. 41E is a flowchart representation of an example method for video processing. The method 4500 includes, at step 4502, performing a conversion between a current block in a video region of a video and a coded representation of the video, wherein the video is represented as video frames comprising video blocks, and a local illumination compensation (LIC) operation is performed for less than all pixels of the current block. The LIC operation includes using a linear model of illumination changes in the current block during the conversion.

Figure 41F:
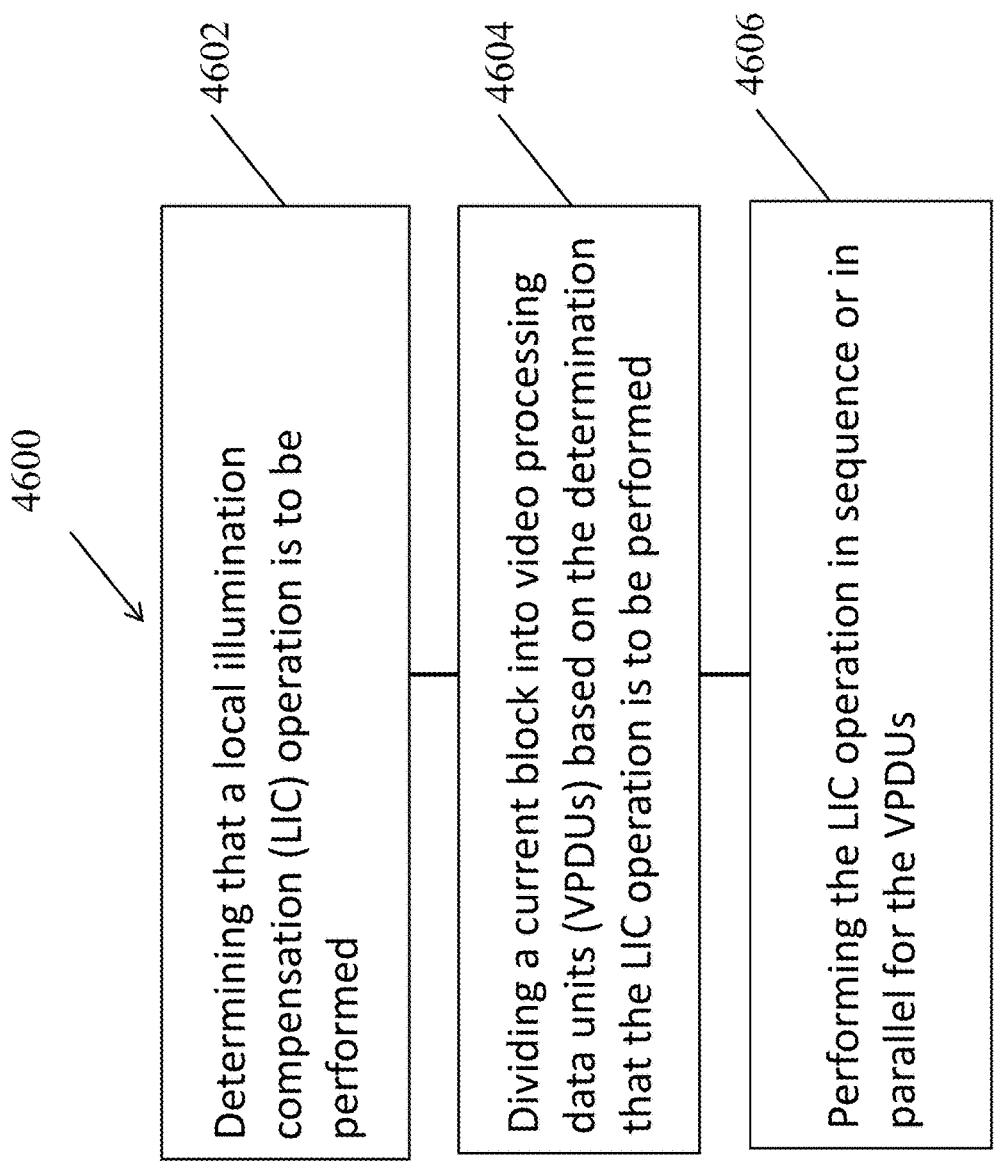

FIG. 41F is a flowchart representation of an example method for video processing. The method 4600 includes, at step 4602, determining that a local illumination compensation (LIC) operation is to be performed. The method 4600 further includes, at step 4604, dividing a current block into video processing data units (VPDUs) based on the determination that the LIC operation is to be performed. The method 4600 further includes, at step 4606, performing the LIC operation in sequence or in parallel for the VPDUs. The LIC operation includes using a linear model of illumination changes in the current block during the conversion.

Figure 41G:
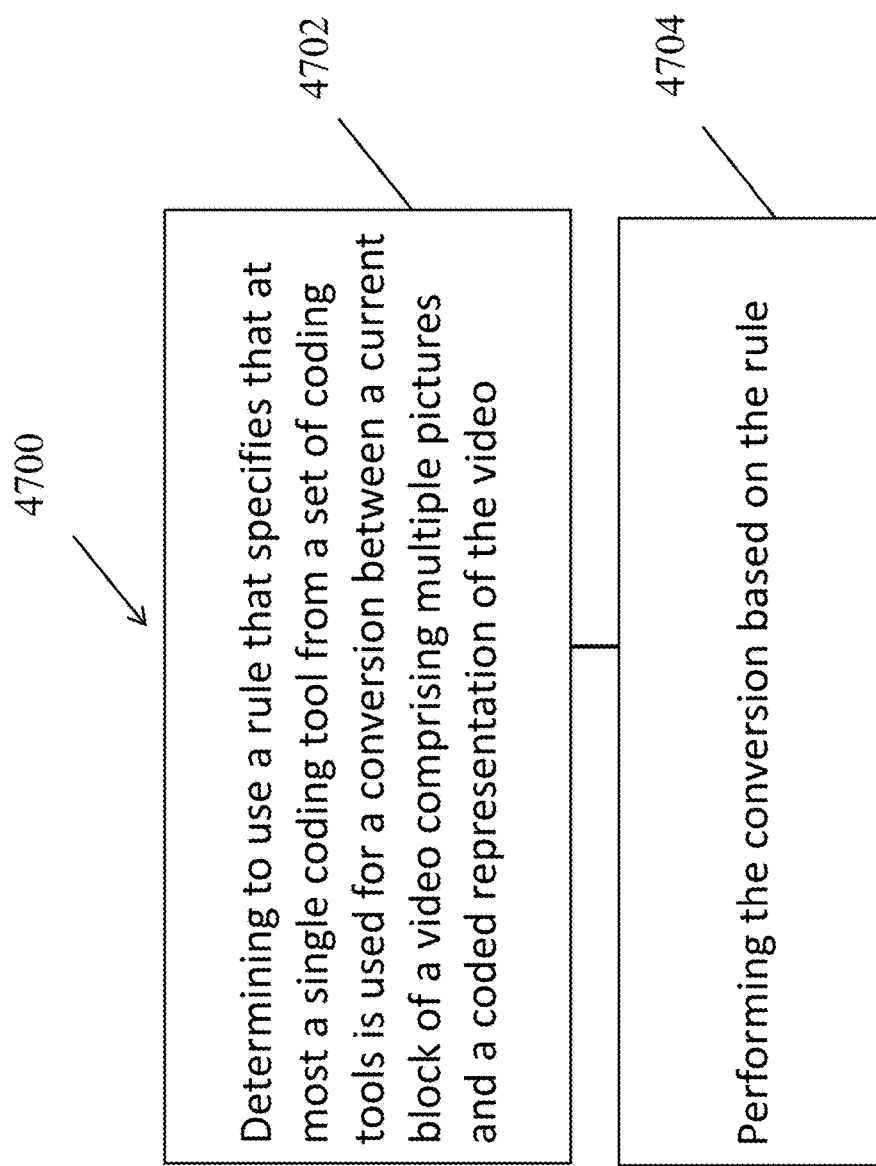

FIG. 41G is a flowchart representation of an example method for video processing. The method 4700 includes, at step 4702, determining to use a rule that specifies that at most a single coding tool from a set of coding tools is used for a conversion between a current block of a video comprising multiple pictures and a coded representation of the video. The method 4700 further includes, at step 4704, performing the conversion based on the rule. In some implementations, the set of coding tools includes coding tools that modify a reconstructed block of the current block generated from motion information from the coded representation or an inter prediction signal generated for the current block during the conversion.

Figure 41H:
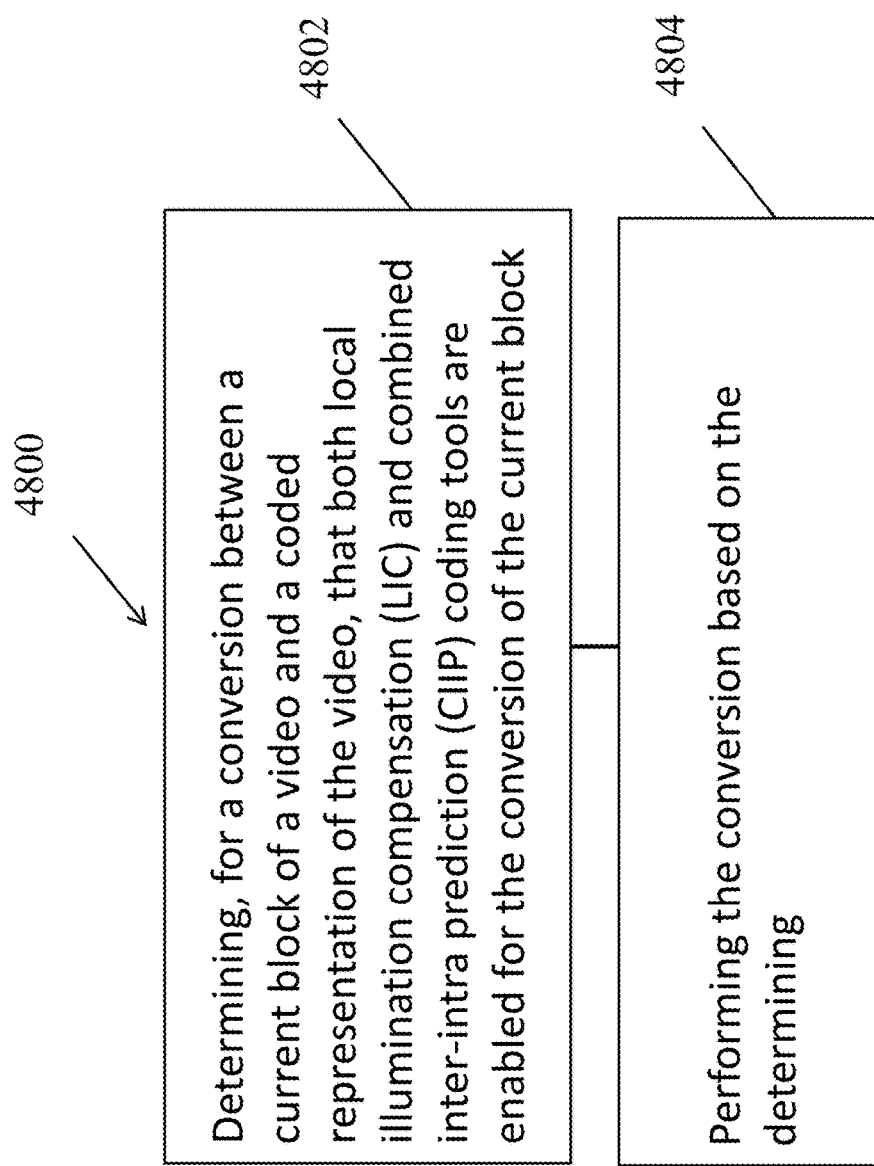

FIG. 41H is a flowchart representation of an example method for video processing. The method 4800 includes, at step 4802, determining, for a conversion between a current block of a video and a coded representation of the video, that both local illumination compensation (LIC) and combined inter-intra prediction (CIIP) coding tools are enabled for the conversion of the current block. The method 4800 further includes, at step 4804, performing the conversion based on the determining.

Various techniques and embodiments preferred by some embodiments may be described using the following clause-based format.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The first set of clauses describe certain features and aspects of the disclosed techniques listed in the previous section, including, for example, items 1, 2, 10, and 12-16.

1. A video processing method, comprising: determining, based on a position rule, whether a local illumination compensation (LIC) tool is enabled for a conversion between a current block in a video region of a video and a coded representation of the video, and performing the conversion based on the position rule, wherein the position rule specifies that the LIC tool is enabled for blocks on boundaries of the video region and disabled for blocks inside the video region, and wherein the LIC tool includes using a linear model of illumination changes in the current block during the conversion.

2. The method of clause 1, wherein the video region is a coding tree unit (CTU) in which the current block is positioned.

3. The method of clause 1, further comprising deriving parameters for LIC of the current block, wherein the deriving uses samples of neighboring blocks depending on a position of the current block within the CTU.

4. The method of clause 3, wherein (1) in case that the position of the current block is at a left boundary of the CTU, the deriving uses only left reconstructed neighboring samples, or (2) in case that the position of the current block is a top boundary of the CTU, the deriving uses only above reconstructed neighboring samples, or (3) in case that the position of the current block is at a top-left corner of the CTU, the deriving uses left and/or above reconstructed neighboring samples, or (4) in case that the position of the current block is at a top-right corner of the CTU, the deriving uses above-right and/or above reconstructed neighboring samples, or (5) in case that the position of the current o block is at a bottom-left corner of the CTU, the deriving uses left and/or below-left reconstructed neighboring samples.

5. A video processing method, comprising: determining, a procedure for deriving local illumination compensation parameters used for a conversion between a current video block of a video region or a video and a coded representation of the video based on a position rule of the current video block in the video region; and performing the conversion based on the determining.

6. The method of clause 5, wherein the procedure for deriving local illumination compensation parameters comprise deriving parameters according to decoded information or inheriting parameters associated with other video blocks.

7. The method of clause 5, wherein the position rule specifies to derive the LIC parameters using a linear model for blocks on a boundary of the video region and inherit the LIC parameters for blocks inside the video region.

8. The method of clause 5, wherein the video region is a coding tree unit (CTU) in which the current block is positioned.

9. The method of clause 6, wherein the inheriting includes: maintaining a number of look-up tables (LUTs) of LIC parameters previously used for other blocks; and deriving LIC parameters for the current block based on one or more LIC parameters from the look-up table.

10. The method of clause 6, wherein the LUT is maintained for each reference picture.

11. The method of clause 9 or 10, wherein the look-table is emptied and rebuilt for each CTU or a row of CTU or a slice or a tile or a tile group or a picture of the current block.

12. The method of clause 5, wherein, for the current block coded with an advanced motion vector prediction (AMVP) mode or an affine inter mode, the coded representation is configured to include a syntax element indicating which LIC parameters are used for the current block.

13. The method of clause 12, wherein the syntax element is indicative of an index to an entry in the LUT.

14. The method of any of clauses 8 to 13, wherein multiple LUTs are used for the CTU.

15. The method of clause 14, wherein the performing conversion uses parameters from LTUs generated by a previously processed coding tree unit.

16. The method of clause 15, wherein at least one LUT is maintained for each reference picture or for each reference picture list used in the conversion of the current block.

17. The method clause 1 or 5, wherein the current block uses a merge mode or affine merge mode for spatial or temporal merge candidate motion vectors, and wherein the inheriting includes inheriting one or both LIC flag and LIC parameters from corresponding neighboring blocks.

18. The method of clause 17, wherein one or both the LIC flag and LIC parameters are signaled, or differences between the LIC parameters and inherited parameters are signaled.

19. The method of clause 5, wherein the current block uses a merge mode or affine merge mode for spatial or temporal merge candidate motion vectors, and wherein the inheriting includes configuring a bitstream with one or more difference values and computing LIC flag or LIC parameters based on the one or more difference values and one or both of a neighboring block's LIC flag and LIC parameters.

20. The method of clause 1, wherein the current block is coded using an advanced motion vector prediction (AMVP) or an affine inter mode, and wherein the parameters are derived using a least square error minimization in which subsamples set of neighboring samples is used for error minimization.

21. The method of clause 5, wherein the current block is coded with a merge mode, the LIC coding tool is disabled for combined merge candidate or average merge candidate.

22. The method of clause 21, wherein an LIC flag of the current block is set as true in case that a LIC flag of any of two merge candidates used for generating the combined merge candidate or the average merge candidate is true.

23. The method of clause 21, wherein LIC parameters are inherited from any of two merge candidates that use LIC and generate the combined merge candidate or the average merge candidate.

24. The method of clause 5, wherein the current block is coded with a merge mode from a HMVP merge candidate, the LIC coding tool is disabled.

25. The method of clause 24, wherein an LIC flag of the current block is set as true in case that a LIC flag of the HMVP (History-based MVP) merge candidate is true.

26. The method of clause 24, wherein an LIC parameters are inherited from the HMVP merge candidate in a case that a LIC flag of the HMVP merge candidate is true.

27. The method of any of clauses 1-26, wherein the LIC tool is used only when the current block meets a condition related to size or a slice type or a tile type or a picture type of the current block or a type of motion information associated with the current block.

28. The method of clause 27, wherein the condition excludes block sizes smaller than M*H samples, where M and H are pre-specified integer values.

29. The method of clause 28, wherein M*H is equal to 16 or 32 or 64.

30. The method of clause 27, wherein the condition specifies that the current block has a width or a height that is smaller than or no larger than X, where X is an integer.

31. The method of clause 30, wherein X=8.

32. The method of clause 27, wherein the condition specifies that the current block has a width or a height that is greater than or no less than X, where X is an integer.

33. The method of clause 32, wherein X=8.

34. The method of clause 27, wherein the condition excludes at least one of an affine inter mode, affine merge mode, sub-block coding tools, or a planar motion vector prediction mode or a bi-predicted mode.

35. The method of clause 27, wherein at least one of a decoder motion vector refinement (DMVR) or bi-directional optical flow (BIO) tool is disallowed when the LIC tool is enabled for the current block.

36. The method of clause 27, wherein the condition specifies that the current block correspond to luma samples.

37. The method of clause 27, wherein the condition specifies that the current block correspond to chroma samples.

38. A video processing method, comprising: determining, for a conversion between a current block in a video region of a video and a coded representation of the video, local illumination compensation (LIC) parameters for a LIC operation using at least some samples of neighboring blocks of the current block; and performing the conversion using the determined LIC parameters, wherein the LIC operation includes using a linear model of illumination changes in the current block during the conversion.

39. The method of clause 38, wherein the at least some samples of neighboring block depend on code information of the current block or a shape of the current block.

40. The method of clause 39, wherein, a width of the current block is greater than or equal to a height of the current block, and therefore only above neighboring pixels are used for deriving LIC parameters.

41. The method of clause 39, wherein, a width of the current block is less than a height of the current block, and only left neighboring pixels are used for deriving LIC parameters.

42. A video processing method, comprising: performing a conversion between a current block in a video region of a video and a coded representation of the video, wherein the video is represented as video frames comprising video blocks, and a local illumination compensation (LIC) tool is enabled for video blocks that use a geometric prediction structure including a triangular prediction mode, wherein the LIC tool includes using a linear model of illumination changes in the current block during the conversion.

43. The method of clause 42, wherein, for the current block for which the LIC is enabled, all prediction units share a same value of a LIC flag.

44. The method of clause 42 or 43, wherein, for the current block that is partitioned from a top-right corner to a bottom-left corner of the video region, a single set of LIC parameters is used for both prediction units.

45. The method of clause 42 or 43, wherein, for the current block that is partitioned from a top-left corner to a bottom-right corner of the video region, a single set of LIC parameters is used for each of the prediction units.

46. The method of clause 42 or 43, wherein, for prediction units coded in a merge mode, a LIC flag is inherited from merge candidates without a signaling.

47. The method of clause 42 or 43, wherein, for prediction units respectively coded in an AMVP mode and a merge mode, a signaled LIC flag is applied to the prediction unit coded in the AMVP mode and one or both of LIC flag and LIC parameters are inherited for the prediction unit coded in the merge mode.

48. The method of clause 42 or 43, wherein, for prediction units coded in an AMVP mode, a LIC flag is signaled for each of the prediction units.

49. A video processing method, comprising: performing a conversion between a current block in a video region of a video and a coded representation of the video, wherein the video is represented as video frames comprising video blocks, and a local illumination compensation (LIC) operation is performed for less than all pixels of the current block, wherein the LIC operation includes using a linear model of illumination changes in the current block during the conversion.

50. The method of clause 49, wherein the LIC operation is performed only for pixels on a boundary of the current block.

51. The method of clause 49, wherein the LIC operation is performed only for pixels in a top portion of the current block.

52. The method of clause 49, wherein the LIC operation is performed only for pixels in a left-side portion of the current block.

53. The method of clause 49, wherein the LIC operation is performed only for pixels in a top-left portion of the current block.

54. The method of any of clauses 1-53, wherein whether to enable or disable performing of the conversion using LIC is signaled in a sequence parameter set (SPS), a picture parameter set (PPS), a video parameter set (VPS), a sequence header, a picture header, a slice header, a tile group head, or a group of coding tree units (CTUs).

55. The method of any of clauses 1-53, wherein information on how to perform the conversion using the LIC tool is signaled in a sequence parameter set (SPS), a picture parameter set (PPS), a video parameter set (VPS), a sequence header, a picture header, a slice header, a tile group head, or a group of coding tree units (CTUs).

56. The method of any of clauses 1-53, wherein at least one of i) whether to enable or disable performing of the conversion or ii) which method is used to perform the conversion using LIC depends on a block dimension, a video processing data unit (VPDU), a picture type, a low delay check flag, or coded information of the current block or previously coded blocks.

57. A video processing method, comprising: determining that a local illumination compensation (LIC) operation is to be performed; dividing a current block into video processing data units (VPDUs) based on the determination that the LIC operation is to be performed; and performing the LIC operation in sequence or in parallel for the VPDUs, wherein the LIC operation includes using a linear model of illumination changes in the current block during the conversion.

58. The method of clause 57, wherein the performing of the LIC operation in sequence allows a LIC operation of a process-block to depend on a LIC operation of another process block.

59. The method of clause 57, wherein the performing of the LIC operation in parallel makes a LIC operation of a process-block not dependent on a LIC operation of another process block.

60. The method of any of clauses 1 to 59, wherein the performing of the conversion includes generating the coded representation from the current block.

61. The method of any of clauses 1 to 59, wherein the performing of the conversion includes generating the current block from the coded representation.

62. An apparatus in a video system comprising a processor and a non-transitory memory with instructions thereon, wherein the instructions upon execution by the processor, cause the processor to implement the method recited in one or more of clauses 1 to 61.

63. A computer program product stored on a non-transitory computer readable media, the computer program product including program code for carrying out the method recited in one or more of clauses 1 to 61.

The second set of clauses describe certain features and aspects of the disclosed techniques listed in the previous section, including, for example, items 3-5.

1. A video processing method, comprising: determining to use a rule that specifies that at most a single coding tool from a set of coding tools is used for a conversion between a current block of a video comprising multiple pictures and a coded representation of the video; and performing the conversion based on the rule, wherein the set of coding tools includes coding tools that modify a reconstructed block of the current block generated from motion information from the coded representation or an inter prediction signal generated for the current block during the conversion.

2. The method of clause 1, wherein the set of coding tools includes a combined intra-inter prediction (CIIP), a diffusion filter, a bilateral filter, a transform domain filter, overlapped block motion compensation (OBMC), or a local illumination compensation (LIC).

3. The method of clause 2, wherein in case that the LIC is enabled, the rule specifies to disable other tools than the LIC.

4. The method of clause 2, wherein in case that the CIIP is enabled, the rule specifies to disable other tools than the CIIP.

5. The method of clause 2, wherein in case that the diffusion filter is enabled, the rule specifies to disable other tools than the diffusion filter.

6. The method of clause 2, wherein in case that the overlapped block motion compensation is enabled, the rule specifies to disable other tools than the overlapped block motion compensation.

7. The method of clause 2, wherein in case that the bilateral filter is enabled, the rule specifies to disable other tools than the bilateral filter.

8. The method of any of clause 2-7, wherein the coded representation excludes any syntax element associated with one or more coding tools that are disabled.

9. The method of clause 2, further comprising: checking at least some of the CIIIP, the diffusion filter, the bilateral filter, the transform domain filter, the OBMC, or the LIC in a certain order.

10. The method of clause 9, wherein the certain order depends on at least one of previously coded information or the coded information of the current block.

11. The method of any of clauses 1-10, further comprising: determining a coded mode of neighboring blocks of the current block, or of blocks within non-adjacent rows or columns in relation to the current block, and wherein applying or performing the LIC, CIIP, diffusion filter, bilateral filter, or transform domain filter is based on the determination of the coded mode.

12. The method of clause 11, wherein the video blocks within non-adjacent rows are above or above-right rows in relation to a row of the video block.

13. The method of clause 11, wherein the video blocks within non-adjacent columns are left or below-left columns in relation to a column of the video block.

14. The method of clause 11, wherein the coded mode includes one or both of intra mode or combined intra-inter mode (CIIP).

15. The method of clause 11, wherein the coded mode is not intra or CIIP.

16. The method of clause 11, wherein applying or performing includes short-tap filters, fewer neighboring samples to be utilized for LIC parameter derivation, or padding of reference samples.

17. The method of any of clauses 1-10, further comprising: determining a coded mode of neighboring video blocks of the current block, or of video blocks within non-adjacent rows or columns in relation to the current block, and wherein applying or performing the LIC, CIIP, diffusion filter, bilateral filter, or transform domain filter is disabled based on the determination of the coded mode.

18. The method of clause 17, wherein the neighboring blocks include one or more of: (1) an above neighboring or non-adjacent above neighboring video block in a neighboring or non-adjacent row is intra coded or combined intra-inter mode coded, (2) a left neighboring or non-adjacent left neighboring video block in a neighboring or non-adjacent column is intra coded or combined intra-inter mode coded, or (3) all blocks in the neighboring or non-adjacent row or column is intra coded or combined intra-inter mode coded.

19. The method of clause 17, wherein the video block is LIC coded, and neighboring samples coded with intra mode or combined intra-inter mode are excluded from derivation of LIC parameters.

20. The method of clause 17, wherein neighboring samples coded with non-intra mode or non-CIIP mode are included for derivation of LIC parameters.

21. The method of clause 17, wherein one or both of short-tap filtering or padding of reference samples are applied based on the LIC, CIIP, diffusion filter, bilateral filter, or transform domain filter being disabled.

22. The method of clause 17, wherein video blocks within neighboring rows or columns in relation to the current block or video blocks within non-adjacent rows or columns in relation to the current block in a reference picture are used as a replacement of the current block's neighboring row or column or non-adjacent row or column.

23. A method for video processing, comprising: determining, for a conversion between a current block of a video and a coded representation of the video, that both local illumination compensation (LIC) and combined inter-intra prediction (CIIP) coding tools are enabled for the conversion of the current block; and performing the conversion based on the determining.

24. The method of clause 23, wherein information associated with the CIIP coding tool is signaled after information associated with the LIC coding tool.

25. The method of clause 23, wherein information associated with the LIC coding tool is signaled after information associated with the CIIP coding tool.

26. The method of clause 24 or 25, wherein the information is signaled in a sequence parameter set (SPS), a picture parameter set (PPS), a slice header, a tile group header, a tile, a coding unit (CU) or a coding tree unit (CTU).

27. The method of clause 23, wherein an LIC flag is true, and wherein the coded representation excludes one or more syntax elements associated with the CIIP coding tool.

28. The method of clause 27, wherein the CIIP coding tool is disabled.

29. The method of clause 23, wherein a CIIP flag is true, and wherein the coded representation excludes one or more syntax elements associated with the LIC coding tool.

30. The method of clause 29, wherein LIC is disabled.

31. The method of clause 23, wherein a CIIP is enabled, and wherein the coded representation excludes one or more syntax elements associated with the LIC coding tool.

32. The method of any of clauses 1 to 31, wherein the performing of the conversion includes generating the coded representation from the current block.

33. The method of any of clauses 1 to 32, wherein the performing of the conversion includes generating the current block from the coded representation.

34. An apparatus in a video system comprising a processor and a non-transitory memory with instructions thereon, wherein the instructions upon execution by the processor, cause the processor to implement the method recited in one or more of clauses 1 to 33.

35. A computer program product stored on a non-transitory computer readable media, the computer program product including program code for carrying out the method recited in one or more of clauses 1 to 33.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A video processing method, comprising:
    determining to use a rule that specifies that at most a single coding tool from a set of coding tools is used for a conversion between a current block of a video comprising multiple pictures and a coded representation of the video;
    performing the conversion based on the rule; and
    determining a coded mode of neighboring video blocks of the current block, or of video blocks within non-adjacent rows or columns in relation to the current block, and wherein applying or performing the LIC, CIIP, diffusion filter, bilateral filter, or transform domain filter is disabled based on the determination of the coded mode, wherein the set of coding tools includes coding tools that modify a reconstructed block of the current block generated from motion information from the coded representation or an inter prediction signal generated for the current block during the conversion, wherein the set of coding tools includes a combined intra-inter prediction (CIIP), a diffusion filter, a bilateral filter, a transform domain filter, overlapped block motion compensation (OBMC), or a local illumination compensation (LIC), wherein in case that the LIC is enabled, the rule specifies to disable other tools than the LIC, or in case that the CIIP is enabled, the rule specifies to disable other tools than the CIIP, or in case that the diffusion filter is enabled, the rule specifies to disable other tools than the diffusion filter, or in case that the overlapped block motion compensation is enabled, the rule specifies to disable other tools than the overlapped block motion compensation, or in case that the bilateral filter is enabled, the rule specifies to disable other tools than the bilateral filter, and wherein the coded representation excludes any syntax element associated with one or more coding tools that are disabled.

2. The method of claim 1, further comprising: checking at least some of the CIIIP, the diffusion filter, the bilateral filter, the transform domain filter, the OBMC, or the LIC in a certain order, wherein the certain order depends on at least one of previously coded information or the coded information of the current block.

3. The method of claim 1, further comprising:

determining a coded mode of neighboring blocks of the current block, or of blocks within non-adjacent rows or columns in relation to the current block, and wherein applying or performing the LIC, CIIP, diffusion filter, bilateral filter, or transform domain filter is based on the determination of the coded mode.

4. The method of claim 3, wherein the video blocks within non-adjacent rows are above or above-right rows in relation to a row of the video block.

5. The method of claim 3, wherein the video blocks within non-adjacent columns are left or below-left columns in relation to a column of the video block.

6. The method of claim 3, wherein the coded mode includes one or both of intra mode or combined intra-inter mode (CIIP).

7. The method of claim 3, wherein the coded mode is not intra or CIIP.

8. The method of claim 3, wherein applying or performing includes short-tap filters, fewer neighboring samples to be utilized for LIC parameter derivation, or padding of reference samples.

9. The method of claim 1, wherein the neighboring blocks include one or more of: (1) an above neighboring or non-adjacent above neighboring video block in a neighboring or non-adjacent row is intra coded or combined intra-inter mode coded, (2) a left neighboring or non-adjacent left neighboring video block in a neighboring or non-adjacent column is intra coded or combined intra-inter mode coded, or (3) all blocks in the neighboring or non-adjacent row or column is intra coded or combined intra-inter mode coded.

10. The method of claim 1, wherein the video block is LIC coded, and neighboring samples coded with intra mode or combined intra-inter mode are excluded from derivation of LIC parameters.

11. The method of claim 1, wherein neighboring samples coded with non-intra mode or non-CIIP mode are included for derivation of LIC parameters.

12. The method of claim 1, wherein one or both of short-tap filtering or padding of reference samples are applied based on the LIC, CIIP, diffusion filter, bilateral filter, or transform domain filter being disabled.

13. The method of claim 1, wherein video blocks within neighboring rows or columns in relation to the current block or video blocks within non-adjacent rows or columns in relation to the current block in a reference picture are used as a replacement of the current block's neighboring row or column or non-adjacent row or column.

14. The method claim 1, wherein the performing of the conversion includes generating the coded representation from the current block.

15. The method of claim 1, wherein the performing of the conversion includes generating the current block from the coded representation.

16. An apparatus in a video system comprising a processor and a non-transitory memory with instructions thereon, wherein the instructions upon execution by the processor, cause the processor to:

determine to use a rule that specifies that at most a single coding tool from a set of coding tools is used for a conversion between a current block of a video comprising multiple pictures and a coded representation of the video;

perform the conversion based on the rule; and determine a coded mode of neighboring video blocks of the current block, or of video blocks within non-adjacent rows or columns in relation to the current block, and wherein applying or performing the LIC, CIIP, diffusion filter, bilateral filter, or transform domain filter is disabled based on the determination of the coded mode, wherein the set of coding tools includes coding tools that modify a reconstructed block of the current block generated from motion information from the coded representation or an inter prediction signal generated for the current block during the conversion, wherein the set of coding tools includes a combined intra-inter prediction (CIIP), a diffusion filter, a bilateral filter, a transform domain filter, overlapped block motion compensation (OBMC), or a local illumination compensation (LIC), wherein in case that the LIC is enabled, the rule specifies to disable other tools than the LIC, or in case that the CIIP is enabled, the rule specifies to disable other tools than the CIIP, or in case that the diffusion filter is enabled, the rule specifies to disable other tools than the diffusion filter, or in case that the overlapped block motion compensation is enabled, the rule specifies to disable other tools than the overlapped block motion compensation, or in case that the bilateral filter is enabled, the rule specifies to disable other tools than the bilateral filter, and wherein the coded representation excludes any syntax element associated with one or more coding tools that are disabled.

17. The apparatus of claim 16, wherein the instructions upon execution by the processor, further cause the processor to:
  check at least some of the CIIIP, the diffusion filter, the bilateral filter, the transform domain filter, the OBMC, or the LIC in a certain order, wherein the certain order depends on at least one of previously coded information or the coded information of the current block.

18. The apparatus of claim 16, wherein the instructions upon execution by the processor, further cause the processor to:
  determine a coded mode of neighboring blocks of the current block, or of blocks within non-adjacent rows or columns in relation to the current block, and wherein applying or performing the LIC, CIIP, diffusion filter, bilateral filter, or transform domain filter is based on the determination of the coded mode.

19. The apparatus of claim 18, wherein the video blocks within non-adjacent rows are above or above-right rows in relation to a row of the video block.

20. A non-transitory computer-readable recording medium storing a bitstream of a video which is generated by a method performed by a video processing apparatus, wherein the method comprises:
  determining to use a rule that specifies that at most a single coding tool from a set of coding tools is used for a conversion between a current block of a video comprising multiple pictures and a coded representation of the video;
  generating the bitstream based on the rule; and
  determining a coded mode of neighboring video blocks of the current block, or of video blocks within non-adjacent rows or columns in relation to the current block, and wherein applying or performing the LIC, CIIP, diffusion filter, bilateral filter, or transform domain filter is disabled based on the determination of the coded mode,
  wherein the set of coding tools includes coding tools that modify a reconstructed block of the current block generated from motion information from the coded representation or an inter prediction signal generated for the current block during the conversion,
wherein the set of coding tools includes a combined intra-inter prediction (CIIP), a diffusion filter, a bilateral filter, a transform domain filter, overlapped block motion compensation (OBMC), or a local illumination compensation (LIC),
wherein
  in case that the LIC is enabled, the rule specifies to disable other tools than the LIC, or
  in case that the CIIP is enabled, the rule specifies to disable other tools than the CIIP, or
  in case that the diffusion filter is enabled, the rule specifies to disable other tools than the diffusion filter, or
    in case that the overlapped block motion compensation is enabled, the rule specifies to disable other tools than the overlapped block motion compensation, or
    in case that the bilateral filter is enabled, the rule specifies to disable other tools than the bilateral filter, and
  wherein the coded representation excludes any syntax element associated with one or more coding tools that are disabled.

* * * * *